US012676974B2

(12) United States Patent
Kim et al.

(10) Patent No.: US 12,676,974 B2
(45) Date of Patent: Jul. 7, 2026

(54) VIDEO SIGNAL PROCESSING METHOD AND APPARATUS THEREFOR

(71) Applicant: WILUS INSTITUTE OF STANDARDS AND TECHNOLOGY INC., Gyeonggi-do (KR)

(72) Inventors: Kyungyong Kim, Gyeonggi-do (KR); Dongcheol Kim, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 60 days.

(21) Appl. No.: 18/687,097

(22) PCT Filed: Aug. 29, 2022

(86) PCT No.: PCT/KR2022/012901
§ 371 (c)(1),
(2) Date: Oct. 4, 2024

(87) PCT Pub. No.: WO2023/033486
PCT Pub. Date: Mar. 9, 2023

(65) Prior Publication Data
US 2025/0039371 A1 Jan. 30, 2025

(30) Foreign Application Priority Data

| Aug. 28, 2021 | (KR) | .......................... 10-2021-0114308 |
| Sep. 17, 2021 | (KR) | .......................... 10-2021-0124987 |
| Dec. 10, 2021 | (KR) | .......................... 10-2021-0176660 |

(51) Int. Cl.
*H04N 19/119* (2014.01)
*H04N 19/137* (2014.01)
(Continued)

(52) U.S. Cl.
CPC ......... *H04N 19/119* (2014.11); *H04N 19/137* (2014.11); *H04N 19/176* (2014.11);
(Continued)

(58) Field of Classification Search
CPC .. H04N 19/119; H04N 19/137; H04N 19/176; H04N 19/196; H04N 19/521; H04N 19/70
See application file for complete search history.

(56) References Cited

U.S. PATENT DOCUMENTS 11,070,797 B2 7/2021 Park et al.
11,234,016 B2 * 1/2022 Tamse .................. H04N 19/186
(Continued)

FOREIGN PATENT DOCUMENTS

KR 10-2020-0064153 6/2020
KR 10-2020-0100656 8/2020
(Continued)

OTHER PUBLICATIONS

International Search Report for PCT/KR2022/012901 mailed on Dec. 13, 2022 and its English translation from WIPO (now published as WO2023/033486).
(Continued)

*Primary Examiner* — Jonathan R Messmore
(74) *Attorney, Agent, or Firm* — WOMBLE BOND DICKINSON (US) LLP

(57) ABSTRACT
A video signal decoding apparatus comprises a processor, wherein the processor: obtains first motion information for the current block; obtains second motion information for the current block; configures a first template set including adjacent blocks of the current block; obtain a first cost value by comparing the first template set with a second template set including adjacent blocks of a first reference block corresponding to the first motion information; obtains a
(Continued)

Reference picture          Current picture second cost value by comparing the first template with a third template set including adjacent blocks of a second reference block corresponding to the second motion information; configures motion information corresponding to a smaller cost value from among the first cost value and the second cost value as final motion information; and generates a prediction block for the current block on the basis of the final motion information.

15 Claims, 25 Drawing Sheets

(51) Int. Cl.
| | | |
|---|---|---|
| *H04N 19/176* | (2014.01) | |
| *H04N 19/196* | (2014.01) | |
| *H04N 19/513* | (2014.01) | |
| *H04N 19/70* | (2014.01) | |

(52) U.S. Cl.
CPC ......... *H04N 19/196* (2014.11); *H04N 19/521* (2014.11); *H04N 19/70* (2014.11)

(56) References Cited

U.S. PATENT DOCUMENTS

| | | | |
|---|---|---|---|
| 2021/0037238 A1* | 2/2021 | Park | H04N 19/105 |
| 2023/0231992 A1 | 7/2023 | Chen et al. | |
| 2024/0155149 A1* | 5/2024 | Zhang | H04N 19/176 |

FOREIGN PATENT DOCUMENTS

| | | |
|---|---|---|
| KR | 10-2020-0125687 | 11/2020 |
| KR | 10-2021-0021971 | 3/2021 |

OTHER PUBLICATIONS

Written Opinion of the International Searching Authority for PCT/KR2022/012901 mailed on Dec. 13, 2022 and its English translation by Google Translate (now published as WO2023/033486).
Won, Dong-Jae et al.: "Advanced Template Matching Prediction Using a Motion Boundary", ICIGP 2019, Singapore, Feb. 23-25, 2019, pp. 110-113.
Office Action (1st) dated Apr. 9, 2026 for Indian Patent Application No. 202417023926.
Won., et al. "Advanced Template Matching Prediction Using a Motion Boundary", ICIGP, Feb. 23, 2019.

* cited by examiner

| mvd_coding( x0, y0, refList ,cpIdx ) { | Descriptor |
|---|---|
| mvd_zero_flag | ae(v) |
| if( mvd_zero_flag == 0) { | |
| abs_mvd_greater0_flag[ 0 ] | ae(v) |
| if( abs_mvd_greater0_flag[ 0 ] == 1) | |
| abs_mvd_greater0_flag[ 1 ] | ae(v) |
| if( abs_mvd_greater0_flag[ 0 ]) | |
| abs_mvd_greater1_flag[ 0 ] | ae(v) |
| if( abs_mvd_greater0_flag[ 1 ]) | |
| abs_mvd_greater1_flag[ 1 ] | ae(v) |
| if( abs_mvd_greater0_flag[ 0 ]) { | |
| if( abs_mvd_greater1_flag[ 0 ]) | |
| abs_mvd_minus2[ 0 ] | ae(v) |
| mvd_sign_flag[ 0 ] | ae(v) |
| } | |
| if( abs_mvd_greater0_flag[ 1 ]) { | |
| if( abs_mvd_greater1_flag[ 1 ]) | |
| abs_mvd_minus2[ 1 ] | ae(v) |
| mvd_sign_flag[ 1 ] | ae(v) |
| } | |
| } | |
| } | |

Fig. 16

| Initialization variable | ctxIdx of mvd_zero_flag | | | | | | | | |
|---|---|---|---|---|---|---|---|---|---|
| | 0 | 1 | 2 | 3 | 4 | 5 | 6 | 7 | 8 |
| initValue | 17 | 42 | 36 | 0 | 57 | 44 | 0 | 43 | 45 |
| shiftIdx | 1 | 5 | 8 | 1 | 5 | 8 | 1 | 5 | 8 |

(a)

| Syntax element | initType | | |
|---|---|---|---|
| | 0(I Slice) | 1(P Slice) | 2 (B Slice) |
| mvd_zero_flag | 0..2 | 3..5 | 6..8 |

| merge_data( x0, y0, cbWidth, cbHeight, chType ) { | Descriptor |
|---|---|
| ... | |
| regular_merge_flag[ x0 ][ y0 ] | ae(v) |
| if( regular_merge_flag[ x0 ][ y0 ] == 1 ) { | |
| if( sps_mmvd_enabled_flag ) | |
| mmvd_merge_flag[ x0 ][ y0 ] | ae(v) |
| if( mmvd_merge_flag[ x0 ][ y0 ] == 1 ) { | |
| if( MaxNumMergeCand > 1 ) | |
| mmvd_cand_flag[ x0 ][ y0 ] | ae(v) |
| mmvd_one_distance_direction_idx[ x0 ][ y0 ] | ae(v) |
| if(mmvd_one_distance_direction_idx == 4) { | |
| mmvd_distance_idx[ x0 ][ y0 ] | ae(v) |
| mmvd_direction_idx[ x0 ][ y0 ] | ae(v) |
| } | |
| } else if( MaxNumMergeCand > 1 ) | |
| merge_idx[ x0 ][ y0 ] | ae(v) |
| ... | |

Fig. 18

| mmvd_one_distance_direction_idx[ x0 ][ y0 ] | MmvdSign [ x0 ][ y0 ][ 0 ] | MmvdSign [ x0 ][ y0 ][ 1 ] |
|---|---|---|
| 0 | +1 | 0 |
| 1 | −1 | 0 |
| 2 | 0 | +1 |
| 3 | 0 | −1 |
| 4 | ESCAPE | |

Fig. 19

| Initialization variable | ctxIdx of mmvd_one_distance_direction_idx | | | | | | | | | |
|---|---|---|---|---|---|---|---|---|---|---|
| | 0 | 1 | 2 | 3 | 4 | 5 | 6 | 7 | 8 | 9 |
| initValue | 43 | 42 | 29 | 27 | 44 | 43 | 35 | 37 | 34 | 52 |
| shiftIdx | 9 | 8 | 9 | 8 | 5 | 9 | 8 | 9 | 8 | 5 |

(a)

| Syntax element | initType | | |
|---|---|---|---|
| | | 0 (P Slice) | 1 (B Slice) |
| mmvd_one_distance_direction_idx | | 0..4 | 5..9 |

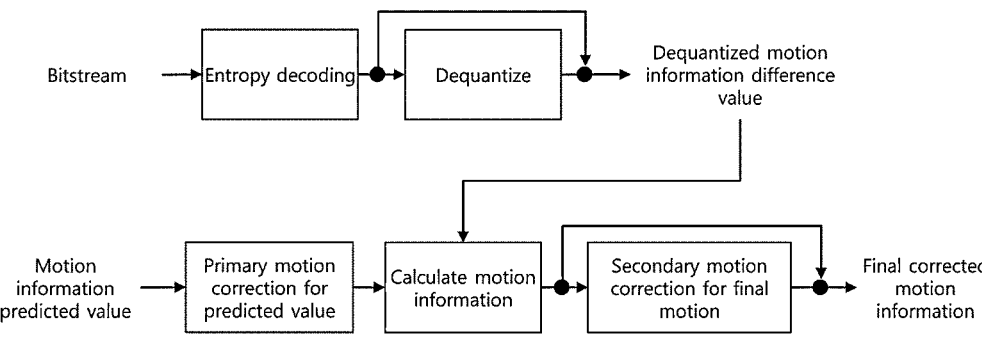

Fig. 26

| mvd_coding( x0, y0, refList ,cpIdx ) { | Descriptor |
|---|---|
|   if (sps_mvd_quant_enabled_flag) | |
|     mvd_quant_minus1 | ae(v) |
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) | |
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
| } | |

Fig. 27

| mvd_coding( x0, y0, refList ,cpIdx ) { | Descriptor |
|---|---|
|   if (sps_mvd_quant_enabled_flag) | |
|     mvd_quant_minus1 | ae(v) |
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) { | |
|       abs_mvd_minus2[ 0 ] | ae(v) |
|       abs_dmvd_minus2[0] | ae(v) |
|       dmvd_sign_flag[ 0 ] | ae(v) |
|     } | |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) { | |
|       abs_mvd_minus2[ 1 ] | ae(v) |
|       abs_dmvd_minus2[1] | ae(v) |
|       dmvd_sign_flag[ 1 ] | ae(v) |
|     } | |
|     mvd_sign_flag[ 1 ] | ae(v) |
|   } | |
| } | |

| i | CPMV$_0$ | | CPMV$_1$ | | CPMV$_2$ | | Cost |
| | Hor | Ver | Hor | Ver | Hor | Ver | |
|---|---|---|---|---|---|---|---|
| 0 | 4 | 4 | -4 | 0 | 0 | 0 | 12093 |
| 1 | -4 | -4 | 4 | 0 | 0 | 0 | 12865 |
| 2 | -4 | -4 | -4 | 0 | 0 | 0 | 14303 |
| 3 | 4 | 4 | 4 | 0 | 0 | 0 | 15527 |
| 4 | -4 | 4 | 4 | 0 | 0 | 0 | 33929 |
| 5 | -4 | 4 | -4 | 0 | 0 | 0 | 37662 |
| 6 | 4 | -4 | -4 | 0 | 0 | 0 | 39036 |
| 7 | 4 | -4 | 4 | 0 | 0 | 0 | 44093 |

Fig. 35

| Initialization variable | ctxIdx of sign_pred_flag | | | | | | | | |
|---|---|---|---|---|---|---|---|---|---|
| | 0 | 1 | 2 | 3 | 4 | 5 | 6 | 7 | 8 |
| initValue | 20 | 43 | 12 | 35 | 51 | 27 | 38 | 26 | 60 |
| shiftIdx | 4 | 5 | 0 | 4 | 5 | 0 | 4 | 5 | 0 |

(a)

| Syntax element | initType | | |
|---|---|---|---|
| | 0 (I Slice) | 1 (P Slice) | 2 (B Slice) |
| sign_pred_flag | 0..2 | 3..5 | 6..8 |

| Initialization variable | ctxIdx of sign_diff_1_flag | | | | | | | | |
|---|---|---|---|---|---|---|---|---|---|
| | 0 | 1 | 2 | 3 | 4 | 5 | 6 | 7 | 8 |
| initValue | 48 | 57 | 44 | 25 | 58 | 45 | 34 | 20 | 18 |
| shiftIdx | 4 | 0 | 0 | 4 | 0 | 0 | 4 | 0 | 0 |

(a)

| Syntax element | initType | | |
|---|---|---|---|
| | 0 (I Slice) | 1 (P Slice) | 2 (B Slice) |
| sign_diff_1_flag | 0..2 | 3..5 | 6..8 |

(b)

Fig. 37
| Initialization variable | ctxIdx of sign_diff_idx | | | | | | | | |
|---|---|---|---|---|---|---|---|---|---|
| | 0 | 1 | 2 | 3 | 4 | 5 | 6 | 7 | 8 |
| initValue | 17 | 42 | 36 | 0 | 57 | 44 | 0 | 43 | 45 |
| shiftIdx | 1 | 5 | 8 | 1 | 5 | 8 | 1 | 5 | 8 |
(a)
| Syntax element | initType | | |
|---|---|---|---|
| | 0 (I Slice) | 1 (P Slice) | 2 (B Slice) |
| sign_diff_idx | 0..2 | 3..5 | 6..8 |
(b)
Fig. 38
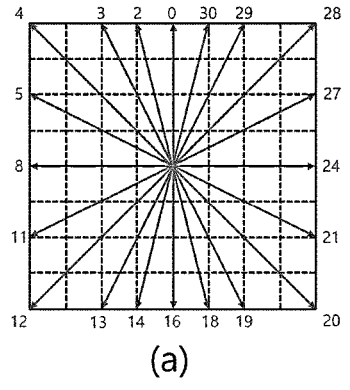
(a)
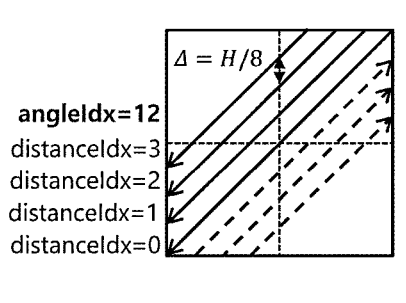
(b)
| merge_gpm_pred_flag [ x0 ][ y0 ] | ae(v) |
|---|---|
| if( !merge_gpm_pred_flag [ x0 ][ y0 ] ) | |
|   merge_gpm_partition_idx[ x0 ][ y0 ] | ae(v) |
| merge_gpm_idx0[ x0 ][ y0 ] | ae(v) |
| if( MaxNumGpmMergeCand > 2 ) | |
|   merge_gpm_idx1[ x0 ][ y0 ] | ae(v) |
(c)

Fig. 39

| Initialization variable | ctxIdx of merge_gpm_pred_flag | | | | | | | | |
|---|---|---|---|---|---|---|---|---|---|
| | 0 | 1 | 2 | 3 | 4 | 5 | 6 | 7 | 8 |
| initValue | 17 | 42 | 36 | 0 | 57 | 44 | 0 | 43 | 45 |
| shiftIdx | 1 | 5 | 8 | 1 | 5 | 8 | 1 | 5 | 8 |

(a)

| Syntax element | initType | | |
|---|---|---|---|
| | 0 (I Slice) | 1 (P Slice) | 2 (B Slice) |
| merge_gpm_pred_flag | 0..2 | 3..5 | 6..8 |

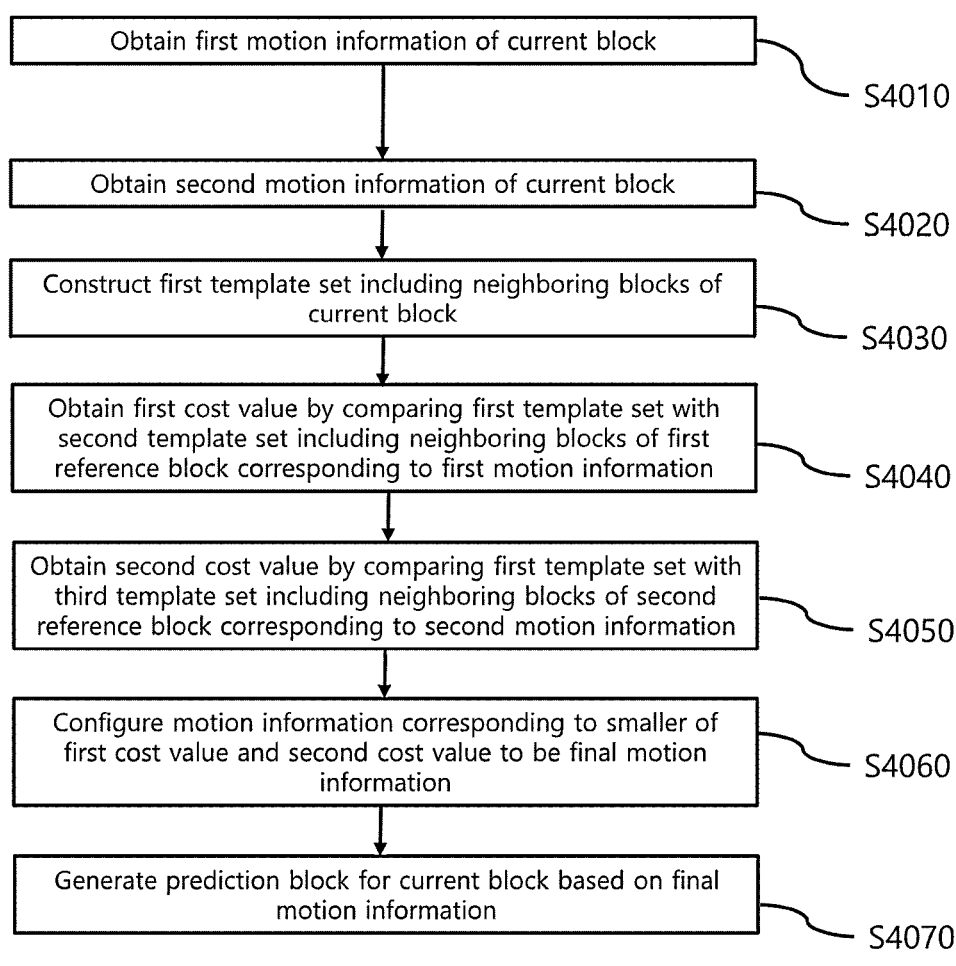

| Obtain first motion information of current block | ⟋ S4010 |

| Obtain second motion information of current block | ⟋ S4020 |

| Construct first template set including neighboring blocks of current block | ⟋ S4030 |

| Obtain first cost value by comparing first template set with second template set including neighboring blocks of first reference block corresponding to first motion information | ⟋ S4040 |

| Obtain second cost value by comparing first template set with third template set including neighboring blocks of second reference block corresponding to second motion information | ⟋ S4050 |

| Configure motion information corresponding to smaller of first cost value and second cost value to be final motion information | ⟋ S4060 |

| Generate prediction block for current block based on final motion information | ⟋ S4070 |

VIDEO SIGNAL PROCESSING METHOD AND APPARATUS THEREFOR

CROSS-REFERENCE TO RELATED APPLICATIONS

This application is the U.S. National Phase of pending International Patent Application No. PCT/KR2022/012901, which was filed on Aug. 29, 2022, and which claims priority under 35 U.S.C 119 (a) to Korean Patent Application No. 10-2021-0114308 filed with the Korean Intellectual Property Office on Aug. 28, 2021, Korean Patent Application No. 10-2021-0124987 filed with the Korean Intellectual Property Office on Sep. 17, 2021, and Korean Patent Application No. 10-2021-0176660 filed with the Korean Intellectual Property Office on Dec. 10, 2021. The disclosures of the above patent applications are incorporated herein by reference in their entirety.

TECHNICAL FIELD

The present disclosure relates to a video signal processing method and device and, more specifically, to a video signal processing method and device by which a video signal is encoded or decoded.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF INVENTION

Technical Problem

An aspect of the present specification is to provide a video signal processing method and a device therefor to increase the coding efficiency of a video signal.

Solution to Problem

The present specification provides a video signal processing method and an apparatus therefor.

In the present specification, a video signal decoding apparatus includes a processor, wherein the processor is configured to acquire first motion information of a current block, acquire a second motion information of the current block, construct a first template set including neighboring blocks of the current block, acquire a first cost value by comparing the first template set with a second template set including neighboring blocks of a first reference block corresponding to the first motion information, acquire a second cost value by comparing the first template set with a third template set including neighboring blocks of a second reference block corresponding to the second motion information, configure motion information corresponding to a smaller cost value among the first cost value and the second cost value as final motion information, and generate a prediction block for the current block based on the final motion information. The processor is configured to acquire a difference value of the final motion information by parsing a syntax element included in a bitstream, and the prediction block for the current block is generated by additionally considering the difference value. The current block is partitioned into a first block and a second block based on a first reference line, the first template set is partitioned into a third template and a fourth template based on the first reference line, the current block is partitioned into a third block and a fourth block based on a second reference line, and the first template set is partitioned into a fifth template and a sixth template based on the second reference line. The processor may be configured to acquire a third cost value by comparing the third template with a template, which corresponds to the third template, in the second template set partitioned based on the first reference line, acquire a fourth cost value by comparing the fourth template with a template, which corresponds to the fourth template, in the third template set partitioned based on the first reference line, acquire a first intermediate cost value based on the third cost value and the fourth cost value, acquire a fifth cost value by comparing the fifth template with a template, which corresponds to the fifth template, in the second template set partitioned based on the second reference line, acquire a sixth cost value by comparing the sixth template with a template, which corresponds to the sixth template, in the third template set partitioned based on the second reference line, and acquire a second intermediate cost value based on the fifth cost value and the sixth cost value, wherein the prediction block for the current block is acquired based on templates partitioned by a reference line corresponding to a smaller cost value among the first intermediate cost value and the second intermediate cost value. The processor is configured to parse a syntax element indicating whether the reference line corresponding to the smaller cost value matches a preconfigured reference line, and in case that the reference line corresponding to the smaller cost value matches the preconfigured reference line, the prediction block for the current block is acquired based on the templates partitioned by the reference line corresponding to the smaller cost value among the first intermediate cost value and the second intermediate cost value.

In the present specification, a video signal encoding apparatus includes a processor, the processor is configured to acquire a bitstream decoded by a decoding method, and the decoding method includes: acquiring first motion information of a current block; acquiring a second motion information of the current block; constructing a first template set including neighboring blocks of the current block; acquiring a first cost value by comparing the first template set with a second template set including neighboring blocks of a first reference block corresponding to the first motion information; acquiring a second cost value by comparing the first template set with a third template set including neighboring blocks of a second reference block corresponding to the second motion information; configuring motion information corresponding to a smaller cost value among the first cost value and the second cost as value final motion information; and generating a prediction block for the current block based on the final motion information. The decoding method may further include acquiring a difference value of the final motion information by parsing a syntax element included in the bitstream, and the prediction block for the current block is generated by additionally considering the difference value. The current block is partitioned into a first block and a second block based on a first reference line, the first template set is partitioned into a third template and a fourth template based on the first reference line, the current block is partitioned into a third block and a fourth block based on a second reference line, and the first template set is partitioned into a fifth template and a sixth template based on the second reference line. The decoding method may further include: acquiring a third cost value by comparing the third template with a template, which corresponds to the third template, in the second template set partitioned based on the first reference line; acquiring a fourth cost value by comparing the fourth template with a template, which corresponds to the fourth template, in the third template set partitioned based on the first reference line; acquiring a first intermediate cost value based on the third cost value and the fourth cost value; acquiring a fifth cost value by comparing the fifth template with a template, which corresponds to the fifth template, in the second template set partitioned based on the second reference line; acquiring a sixth cost value by comparing the sixth template with a template, which corresponds to the sixth template, in the third template set partitioned based on the second reference line; and acquiring a second intermediate cost value based on the fifth cost value and the sixth cost value, wherein the prediction block for the current block may be acquired based on templates partitioned by a reference line corresponding to a smaller cost value among the first intermediate cost value and the second intermediate cost value. The decoding method may further include parsing a syntax element indicating whether the reference line corresponding to the smaller cost value matches a preconfigured reference line, wherein in case that the reference line corresponding to the smaller cost value matches the preconfigured reference line, the prediction block for the current block is acquired based on the templates partitioned by the reference line corresponding to the smaller cost value among the first intermediate cost value and the second intermediate cost value.

In the present specification, in a computer-readable non-transitory storage medium configured to store a bitstream, the bitstream is decoded by a decoding method, and the decoding method includes: acquiring first motion information of a current block; acquiring a second motion information of the current block; constructing a first template set including neighboring blocks of the current block; acquiring a first cost value by comparing the first template set with a second template set including neighboring blocks of a first reference block corresponding to the first motion information; acquiring a second cost value by comparing the first template set with a third template set including neighboring blocks of a second reference block corresponding to the second motion information; configuring motion information corresponding to a smaller cost value among the first cost value and the second cost value as final motion information; and generating a prediction block for the current block based on the final motion information. The decoding method may further include acquiring a difference value of the final motion information by parsing a syntax element included in the bitstream, and the prediction block for the current block is generated by additionally considering the difference value. The current block is partitioned into a first block and a second block based on a first reference line, the first template set is partitioned into a third template and a fourth template based on the first reference line, the current block is partitioned into a third block and a fourth block based on a second reference line, and the first template set is partitioned into a fifth template and a sixth template based on the second reference line. The decoding method may further include: acquiring a third cost value by comparing the third template with a template, which corresponds to the third template, in the second template set partitioned based on the first reference line; acquiring a fourth cost value by comparing the fourth template with a template, which corresponds to the fourth template, in the third template set partitioned based on the first reference line; acquiring a first intermediate cost value based on the third cost value and the fourth cost value; acquiring a fifth cost value by comparing the fifth template with a template, which corresponds to the fifth template, in the second template set partitioned based on the second reference line; acquiring a sixth cost value by comparing the sixth template with a template, which corresponds to the sixth template, in the third template set partitioned based on the second reference line; and acquiring a second intermediate cost value based on the fifth cost value and the sixth cost value, wherein the prediction block for the current block may be acquired based on templates partitioned by a reference line corresponding to a smaller cost value among the first intermediate cost value and the second intermediate cost value. The decoding method may further include parsing a syntax element indicating whether the reference line corresponding to the smaller cost value matches a preconfigured reference line, wherein in case that the reference line corresponding to the smaller cost value matches the preconfigured reference line, the prediction block for the current block is acquired based on the templates partitioned by the reference line corresponding to the smaller cost value among the first intermediate cost value and the second intermediate cost value.

In the present specification, the syntax element includes information about a difference value in a horizontal direction and a difference value in a vertical direction of the final motion information.

In the present specification, both the difference value in the horizontal direction and the difference value in the vertical direction of the final motion information are 0.

In the present specification, an encoding mode of the current block is an AMVP mode.

In the present specification, the first reference block and the second reference block are blocks in pictures included in different picture lists.

In the present specification, in case that the smaller cost value is the first intermediate cost value, the prediction block for the current block is acquired based on the first reference line, and in case that the smaller cost value is the second intermediate cost value, the prediction block for the current block is acquired based on the second reference line.

In the present specification, the first intermediate cost value is a value obtained by summing the third cost value and the fourth cost value, and the second intermediate cost value is a value obtained by summing the fifth cost value and the sixth cost value.

In the present specification, the first cost value is a value related to a similarity between the first template set and the second template set, and the second cost value is a value related to a similarity between the first template set and the third template set.

In the present specification, the third cost value is a value related to a similarity between the third template and a template, which corresponds to the third template, in the second template set partitioned based on the first reference line, the fourth cost value is a value related to a similarity between the fourth template and a template, which corresponds to the fourth template, in the third template set partitioned based on the first reference line, the fifth cost value is a value related to a similarity between the fifth template and a template, which corresponds to the fifth template, in the second template set partitioned based on the second reference line, and the sixth cost value is a value related to a similarity between the sixth template and a template, which corresponds to the sixth template, in the third template set partitioned based on the second reference line.

Advantageous Effects of Invention

The present disclosure provides a method for efficiently processing a video signal.

The effects from the obtainable present specification are not limited to the effects mentioned above, and other effects not mentioned may be clearly understood by to those skilled in the art, to which the present disclosure belongs, from the description below.

BRIEF DESCRIPTION OF DRAWINGS

FIG. 1 is a schematic block diagram of a video signal encoding apparatus according to an embodiment of the present invention.

FIG. 15 illustrates a method for signaling a difference value of motion information according to an embodiment of the present disclosure.

FIG. 16 illustrates the result of entropy coding of "mvd_zero_flag" using CABAC according to an embodiment of the present disclosure.

FIG. 17 illustrates a method for signaling an MMVD difference value according to an embodiment of the present disclosure.

FIG. 18 illustrates signs for the horizontal and vertical directions of an MMVD difference value according to an index of a syntax element indicating the MMVD difference value according to an embodiment of the present disclosure.

FIG. 19 illustrates probability initialization information according to an embodiment of the present disclosure.

FIG. 25 illustrates a method for acquiring a predicted value of motion information according to an embodiment of the present disclosure.

FIGS. 26 and 27 illustrate a method for signaling information about a difference value of motion information according to an embodiment of the present disclosure.

FIGS. 35, 36, and 37 illustrate a context model of syntax elements related to encoding motion information according to an embodiment of the present disclosure.

FIG. 38 illustrates partitioning of a current block in a GPM mode according to an embodiment of the present disclosure.

FIG. 39 illustrates a context model in a GPM mode according to an embodiment of the present disclosure.

FIG. 40 illustrates a method for generating a prediction block for a current block based on the methods described with reference to FIGS. 1 to 39.

BEST MODE FOR CARRYING OUT THE INVENTION

Figure 2:
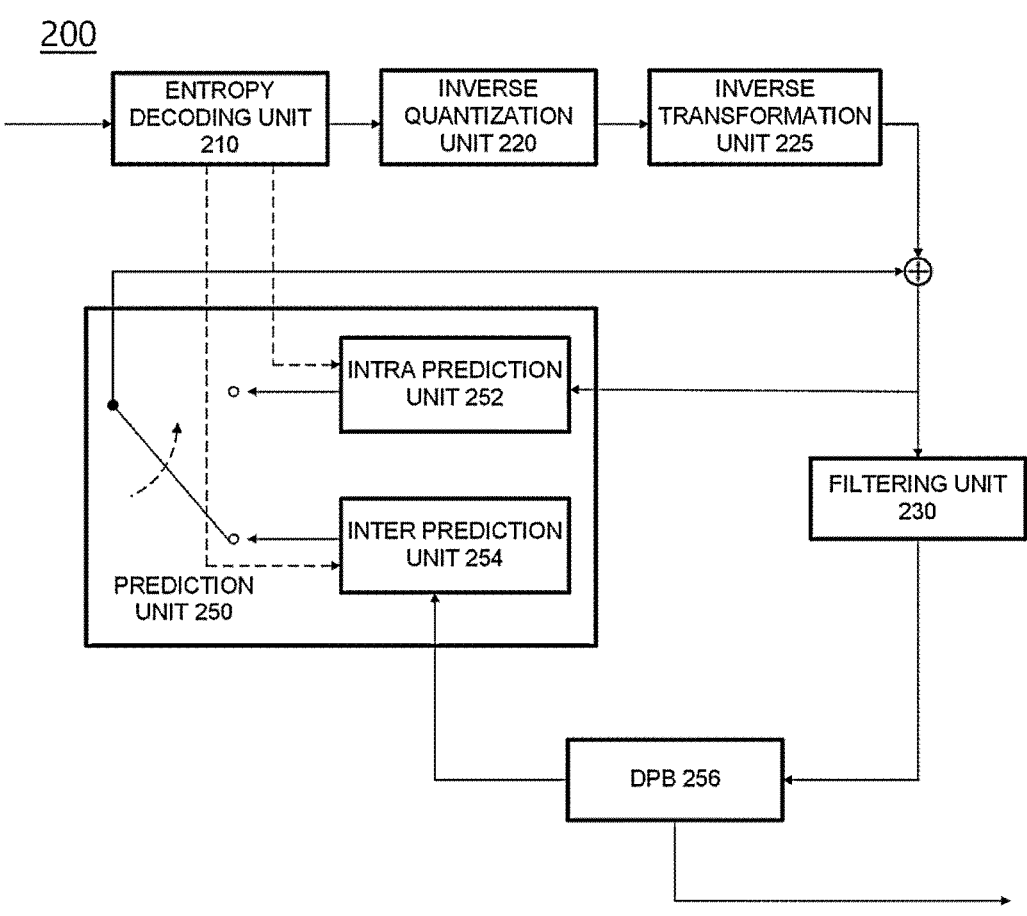
FIG. 2 is a schematic block diagram of a video signal decoding apparatus according to an embodiment of the present invention.

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, 'A and/or B' may be interpreted as meaning 'including at least one of A or B.'

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. Furthermore, a "block" refers to a region of an image that includes a particular component of a luma component and chroma components (i.e., Cb and Cr). However, depending on the embodiment, the terms "unit", "block", "partition", "signal", and "region" may be used interchangeably. Also, in the present specification, the term "current block" refers to a block that is currently scheduled to be encoded, and the term "reference block" refers to a block that has already been encoded or decoded and is used as a reference in a current block. In addition, the terms "luma", "luminance", "Y", and the like may be used interchangeably in this specification. Additionally, in the present specification, the terms "chroma", "chrominance", "Cb or Cr", and the like may be used interchangeably, and chroma components are classified into two components, Cb and Cr, and thus each chroma component may be distinguished and used. Additionally, in the present specification, the term "unit" may be used as a concept that includes a coding unit, a prediction unit, and a transform unit. A "picture" refers to a field or a frame, and depending on embodiments, the terms may be used interchangeably. Specifically, when a captured video is an interlaced video, a single frame may be separated into an odd (or cardinal or top) field and an even (or even-numbered or bottom) field, and each field may be configured in one picture unit and encoded or decoded. If the captured video is a progressive video, a single frame may be configured as a picture and encoded or decoded. In addition, in the present specification, the terms "error signal", "residual signal", "residue signal", "remaining signal", and "difference signal" may be used interchangeably. Also, in the present specification, the terms "intra-prediction mode", "intra-prediction directional mode", "intra-picture prediction mode", and "intra-picture prediction directional mode" may be used interchangeably. In addition, in the present specification, the terms "motion", "movement", and the like may be used interchangeably. Also, in the present specification, the terms "left", "left above", "above", "right above", "right", "right below", "below", and "left below" may be used interchangeably with "leftmost", "top left", "top", "top right", "right", "bottom right", "bottom", and "bottom left". Also, the terms "element" and "member" may be used interchangeably. Picture order count (POC) represents temporal position information of pictures (or frames), and may be the playback order in which displaying is performed on a screen, and each picture may have unique POC.

Figure 1:
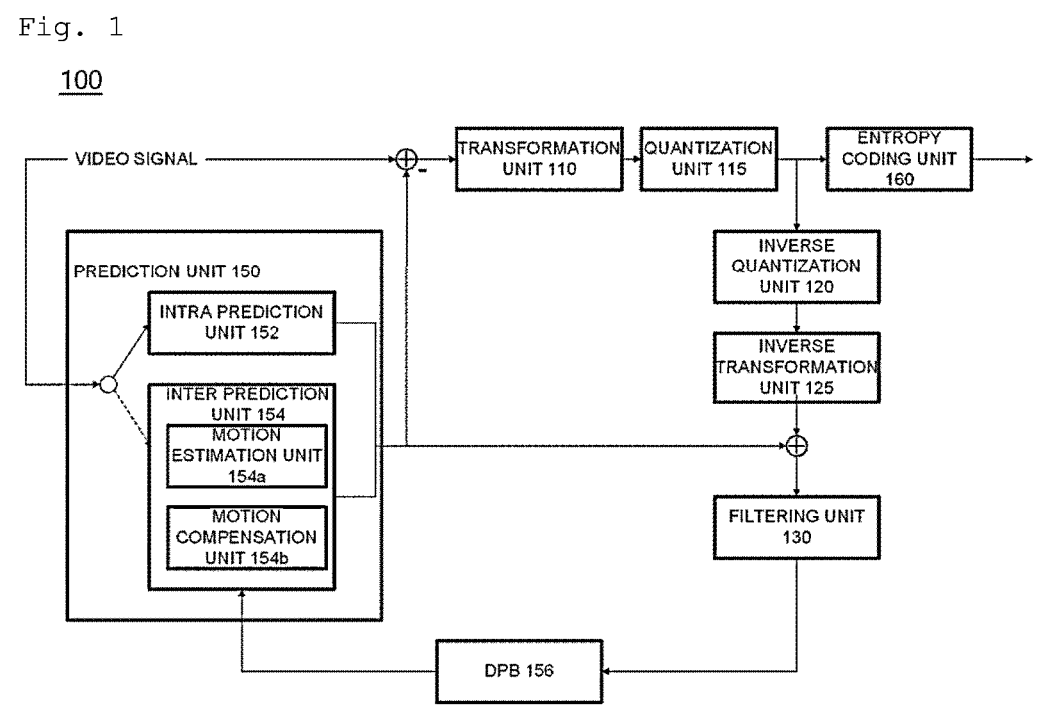

FIG. 1 is a schematic block diagram of a video signal encoding apparatus according to an embodiment of the present invention. Referring to FIG. 1, the encoding present apparatus 100 of invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. A transform kernel used for the transform of a residual block may has characteristics that allow a vertical transform and a horizontal transform to be separable. In this case, the transform of the residual block may be performed separately as a vertical transform and a horizontal transform. For example, an encoder may perform a vertical transform by applying a transform kernel in the vertical direction of a residual block. In addition, the encoder may perform a horizontal transform by applying the transform kernel in the horizontal direction of the residual block. In the present disclosure, the transform kernel may be used to refer to a set of parameters used for the transform of a residual signal, such as a transform matrix, a transform array, a transform function, or transform. For example, a transform kernel may be any one of multiple available kernels. Also, transform kernels based on different transform types may be used for the vertical transform and the horizontal transform, respectively.

The transform coefficients are distributed with higher coefficients toward the top left of a block and coefficients closer to "0" toward the bottom right of the block. As the size of a current block increases, there are likely to be many coefficients of "0" in the bottom-right region of the block. To reduce the transform complexity of a large-sized block, only a random top-left region may be kept and the remaining region may be reset to "0".

In addition, error signals may be present in only some regions of a coding block. In this case, the transform process may be performed on only some random regions. In an embodiment, in a block having a size of 2N×2N, an error signal may be present only in the first 2N×N block, and the transform process may be performed on the first 2N×N block. However, the second 2N×N block may not be transformed and may not be encoded or decoded. Here, N may be any positive integer.

The encoder may perform an additional transform before transform coefficients are quantized. The above-described transform method may be referred to as a primary transform, and the additional transform may be referred to as a secondary transform. The secondary transform may be selective for each residual block. According to an embodiment, the encoder may improve coding efficiency by performing a secondary transform for regions where it is difficult to focus energy in a low-frequency region by using a primary transform alone. For example, a secondary transform may be additionally performed for blocks where residual values appear large in directions other than the horizontal or vertical direction of a residual block. Unlike a primary transform, a secondary transform may not be performed separately as a vertical transform and a horizontal transform. Such a secondary transform may be referred to as a low frequency non-separable transform (LENST).

The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

The deblocking filter is a filter for removing intra-block distortions generated at the boundaries between blocks in a reconstructed picture. Through the distribution of pixels included in several columns or rows based on random edges in a block, the encoder may determine whether to apply a deblocking filter to the edges. When applying a deblocking filter to the block, the encoder may apply a long filter, a strong filter, or a weak filter depending on the strength of deblocking filtering. Additionally, horizontal filtering and vertical filtering may be processed in parallel. The sample adaptive offset (SAO) may be used to correct offsets from an original video on a pixel-by-pixel basis with respect to a residual block to which a deblocking filter has been applied. To correct offset for a particular picture, the encoder may use a technique that divides pixels included in the picture into a predetermined number of regions, determines a region in which the offset correction is to be performed, and applies the offset to the region (Band Offset). Alternatively, the encoder may use a method for applying an offset in consideration of edge information of each pixel (Edge Offset). The adaptive loop filter (ALF) is a technique of dividing pixels included in a video into predetermined groups and then determining one filter to be applied to each group, thereby performing filtering differently for each group. Information about whether to apply ALF may be signaled on a per-coding unit basis, and the shape and filter coefficients of an ALF to be applied may vary for each block. In addition, an ALF filter having the same shape (a fixed shape) may be applied regardless of the characteristics of a target block to which the ALF filter is to be applied.

The prediction unit 150 includes an intra-prediction unit 152 and an inter-prediction unit 154. The intra-prediction unit 152 performs intra prediction within a current picture, and inter-prediction unit 154 performs inter prediction to predict the current picture by using a reference picture stored in the decoded picture buffer 156. The intra-prediction unit 152 performs intra prediction from reconstructed regions in the current picture and transmits intra encoding information to the entropy coding unit 160. The intra encoding information may include at least one of an intra-prediction mode, a most probable mode (MPM) flag, an MPM index, and information regarding a reference sample. The inter-prediction unit 154 may again include a motion estimation unit 154*a* and a motion compensation unit 154*b*. The motion estimation unit 154*a* finds a part most similar to a current region with reference to a specific region of a reconstructed reference picture, and obtains a motion vector value which is the distance between the regions. Reference region-related motion information (reference direction indication information (L0 prediction, L1 prediction, or bidirectional prediction), a reference picture index, motion vector information, etc.) and the like, obtained by the motion estimation unit 154*a*, are transmitted to the entropy coding unit 160 so as to be included in a bitstream. The motion compensation unit 154B performs inter-motion compensation by using the motion information transmitted by the motion estimation unit 154*a*, to generate a prediction block for the current block. The inter-prediction unit 154 transmits the inter encoding information, which includes motion information related to the reference region, to the entropy coding unit 160.

According to additional an embodiment, the prediction unit 150 may include an intra block copy (IBC) prediction unit (not shown). The IBC prediction unit performs IBC prediction from reconstructed samples in a current picture and transmits IBC encoding information to the entropy coding unit 160. The IBC prediction unit references a specific region within a current picture to obtain a block vector value that indicates a reference region used to predict a current region. The IBC prediction unit may perform IBC prediction by using the obtained block vector value. The IBC prediction unit transmits the IBC encoding information to the entropy coding unit 160. The IBC encoding information may include at least one of reference region size information and block vector information (index information for predicting the block vector of a current block in a motion candidate list, and block vector difference information).

When the above picture prediction is performed, the transform unit 110 transforms a residual value between an original picture and a predictive picture to obtain a transform coefficient value. At this time, the transform may be performed on a specific block basis in the picture, and the size of the specific block may vary within a predetermined range. The quantization unit 115 quantizes the transform coefficient value generated by the transform unit 110 and transmits the quantized transform coefficient to the entropy coding unit 160.

The quantized transform coefficients in the form of a two-dimensional array may be rearranged into a one-dimensional array for entropy coding. In relation to methods for scanning a quantized transform coefficient, the size of a transform block and an intra-picture prediction mode may determine which scanning method is used. In an embodiment, diagonal, vertical, and horizontal scans may be applied. This scan information may be signaled on a block-by-block basis, and may be derived based on predetermined rules.

The entropy coding unit 160 generates a video signal bitstream by entropy coding information indicating a quantized transform coefficient, intra encoding information, and inter encoding information. The entropy coding unit 160 may use variable length coding (VLC) and arithmetic coding. The variable length coding (VLC) is a technique of transforming input symbols into consecutive codewords, wherein the length of the codewords is variable. For example, frequently occurring symbols are represented by shorter codewords, while less frequently occurring symbols are represented by longer codewords. As the variable length coding, context-based adaptive variable length coding (CAVLC) may be used. The arithmetic coding uses the probability distribution of each data symbol to transform consecutive data symbols into a single decimal number. The arithmetic coding allows acquisition of the optimal decimal bits needed to represent each symbol. As the arithmetic coding, context-based adaptive binary arithmetic coding (CABAC) may be used.

CABAC is a binary arithmetic coding technique using multiple context models generated based on probabilities obtained from experiments. First, when symbols are not in binary form, the encoder binarizes each symbol by using exp-Golomb, etc. The binarized value, 0 or 1, may be described as a bin. A CABAC initialization process is divided into context initialization and arithmetic coding initialization. The context initialization is the process of initializing the probability of occurrence of each symbol, and is determined by the type of symbol, a quantization parameter (QP), and slice type (I, P, or B). A context model having the initialization information may use a probability-based value obtained through an experiment. The context model provides information about the probability of occurrence of Least Probable Symbol (LPS) or Most Probable Symbol (MPS) for a symbol to be currently coded and about which of bin values 0 and 1 corresponds to the MPS (valMPS). One of multiple context models is selected via a context index (ctxIdx), and the context index may be derived from information in a current block to be encoded or from information about neighboring blocks. Initialization for binary arithmetic coding is performed based on a probability model selected from the context models. In the binary arithmetic coding, encoding is performed through the process in which division into probability intervals is made through the probability of occurrence of 0 and 1, and then a probability interval corresponding to a bin to be processed becomes the entire probability interval for the next bin to be processed. Information about a position within the last bin in which the last bin has been processed is output. However, the probability interval cannot be divided indefinitely, and thus, when the probability interval is reduced to a certain size, a renormalization process is performed to widen the probability interval and the corresponding position information is output. In addition, after each bin is processed, a probability update process may be performed, wherein information about a processed bin is used to set a new probability for the next to be processed.

The generated bitstream is encapsulated in network abstraction layer (NAL) unit as basic units. The NAL units are classified into video a coding layer (VCL) NAL unit, which includes video data, and a non-VCL NAL unit, which includes parameter information for decoding video data. There are various types of VCL or non-VCL NAL units. A NAL unit includes NAL header information and raw byte sequence payload (RBSP) which is data. The NAL header information includes summary information about the RBSP. The RBSP of a VCL NAL unit includes an integer number of encoded coding tree units. In order to decode a bitstream in a video decoder, it is necessary to separate the bitstream into NAL units and then decode each of the separate NAL units. Information required for decoding a video signal bitstream may be included in a picture parameter set (PPS), a sequence parameter set (SPS), a video parameter set (VPS), etc., and transmitted.

The block diagram of FIG. 1 illustrates the encoding device 100 according to an embodiment of the present disclosure, wherein the separately shown blocks logically distinguish the elements of the encoding device 100. Accordingly, the above-described elements of the encoding device 100 may be mounted as a single chip or multiple chips, depending on the design of the device. According to an embodiment, the above-described operation of each element of the encoding device 100 may be performed by a processor (not shown).

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy unit 210 obtains decoding a quantized transform coefficient by inverse-binarizing a binary code. The inverse quantization unit 220 inverse-quantizes the quantized transform coefficient, and the inverse transformation unit 225 restores a residual value by using the inverse-quantized transform coefficient. The video signal processing device 200 restores an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that can perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction using intra information and block the encoding reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures are pictures located temporally before or after the current picture, and may be pictures for which reconstruction has already been completed. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an IBC prediction unit (not shown). The IBC prediction unit may reconstruct the current region by referring to a specific region including reconstructed samples in the current picture. The IBC prediction unit obtains IBC encoding information for the current region from the entropy decoding unit 210. The IBC prediction unit obtains a block vector value of the current region indicating the specific region in the current picture. The IBC prediction unit may perform IBC prediction by using the obtained block vector value. The IBC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

The technology proposed in the present specification may be applied to a method and a device for both an encoder and a decoder, and the wording signaling and parsing may be for convenience of description. In general, signaling may be described as encoding each type of syntax from the perspective of the encoder, and parsing may be described as interpreting each type of syntax from the perspective of the decoder. In other words, each type of syntax may be included in a bitstream and signaled by the encoder, and the decoder may parse the syntax and use the syntax in a reconstruction process. In this case, the sequence of bits for each type of syntax arranged according to a prescribed hierarchical configuration may be called a bitstream.

One picture may be partitioned into sub-pictures, slices, tiles, etc. and encoded. A sub-picture may include one or more slices or tiles. When one picture is partitioned into multiple slices or tiles and encoded, all the slices or tiles within the picture must be decoded before the picture can be output a screen. On the other hand, when one picture is encoded into multiple subpictures, only a random subpicture may be decoded and output on the screen. A slice may include multiple tiles or subpictures. Alternatively, a tile may include multiple subpictures or slices. Subpictures, slices, and tiles may be encoded or decoded independently of each other, and thus are advantageous for parallel processing and processing speed improvement. However, there is the disadvantage in that a bit rate increases because encoded information of other adjacent subpictures, slices, and tiles is not available. A subpicture, a slice, and a tile may be partitioned into multiple coding tree units (CTUs) and encoded.

Figure 3:
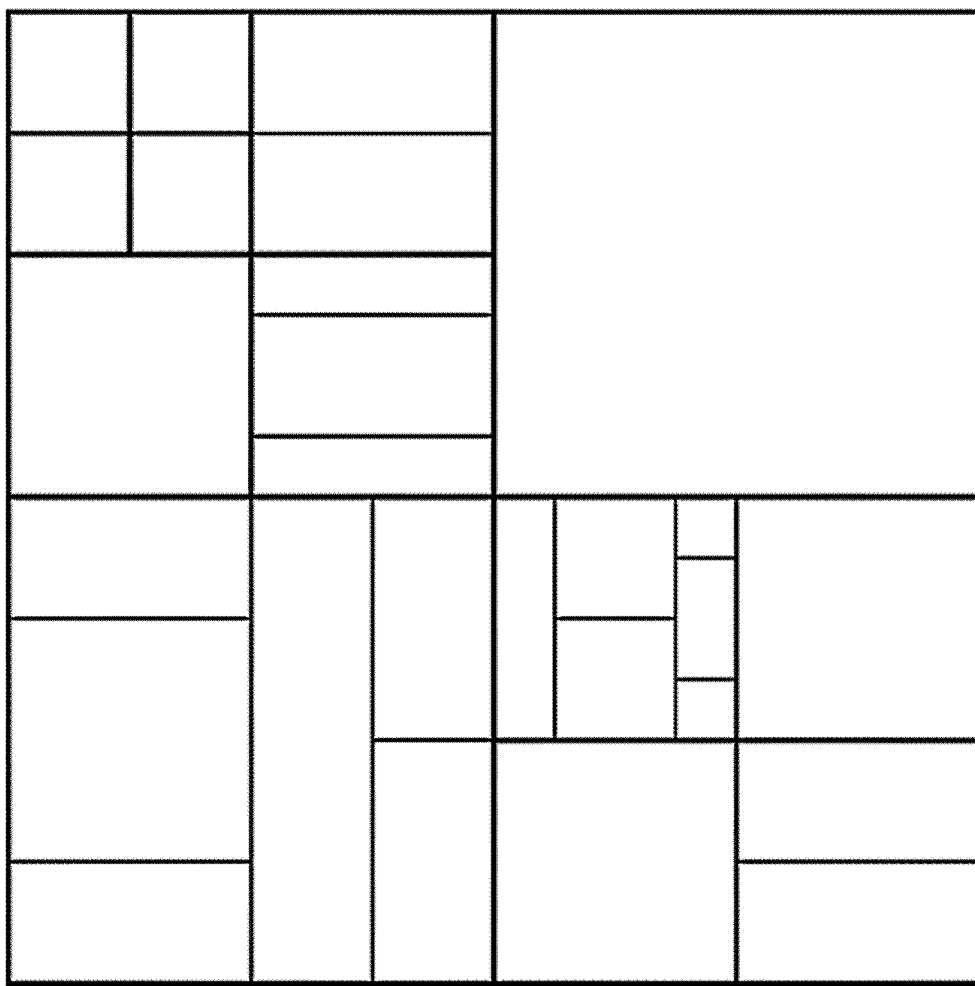
FIG. 3 shows an embodiment in which a coding tree unit is divided into coding units in a picture.

FIG. 3 illustrates an embodiment in which a coding tree unit (CTU) is divided into coding units (CUs) within a picture. In the process of coding a video signal, a picture may be divided into a sequence of coding tree units (CTUs). A coding tree unit may include a luma Coding Tree Block (CTB), two chroma coding tree blocks, and encoded syntax information thereof. One coding tree unit may include one coding unit, or one coding tree unit may be divided into multiple coding units. One coding unit may include a luma coding block (CB), two chroma coding blocks, and encoded syntax information thereof. One coding block may be partitioned into multiple sub-coding blocks. One coding unit may include one transform unit (TU), or one coding unit may be partitioned into multiple transform units. A transform unit may include a luma transform block (TB), two chroma transform blocks, and encoded syntax information thereof. A coding tree unit may be partitioned into multiple coding units. A coding tree unit may become a leaf node without being partitioned. In this case, the coding tree unit itself may be a coding unit.

The coding unit refers to a basic unit for processing a picture in the process of processing the video signal described is, intra/inter prediction, above, that transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

A leaf node of the multi-type tree can be a coding unit. When the coding unit is not greater than the maximum transform length, the coding unit can be used as a unit of prediction and/or transform without further splitting. As an embodiment, when the width or height of the current coding unit is greater than the maximum transform length, the current coding unit can be split into a plurality of transform units without explicit signaling regarding splitting. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
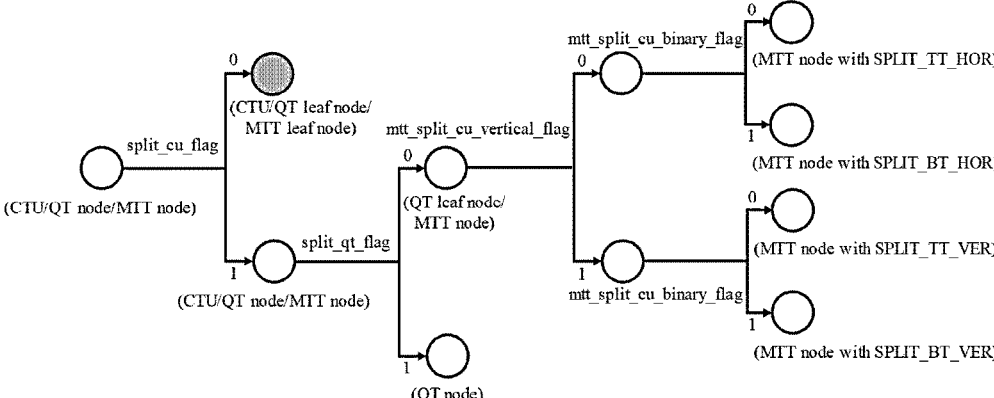
FIG. 4 shows an embodiment of a method for signaling a division of a quad tree and a multi-type tree.

FIG. 4 illustrates an embodiment of a method of signaling splitting of the quad tree and multi-type tree. Preset flags can be used to signal the splitting of the quad tree and multi-type tree described above. Referring to FIG. 4, at least one of a flag 'split_cu_flag' indicating whether or not to split a node, a flag 'split_qt_flag' indicating whether or not to split a quad tree node, a flag 'mtt_split_cu_vertical_flag' indicating a splitting direction of the multi-type tree node, or a flag 'mtt_split_cu_binary_flag' indicating a splitting shape of the multi-type tree node can be used.

According to an embodiment of the present invention, 'split_cu_flag', which is a flag indicating whether or not to split the current node, can be signaled first. When the value of 'split_cu_flag' is 0, it indicates that the current node is not split, and the current node becomes a coding unit. When the current node is the coating tree unit, the coding tree unit includes one unsplit coding unit. When the current node is a quad tree node 'QT node', the current node is a leaf node 'QT leaf node' of the quad tree and becomes the coding unit. When the current node is a multi-type tree node 'MTT node', the current node is a leaf node 'MTT leaf node' of the multi-type tree and becomes the coding unit.

When the value of 'split_cu_flag' is 1, the current node can be split into nodes of the quad tree or multi-type tree according to the value of 'split_qt_flag'. A coding tree unit is a root node of the quad tree, and can be split into a quad tree structure first. In the quad tree structure, 'split_qt_flag' is signaled for each node 'QT node'. When the value of 'split_qt_flag' is 1, the corresponding node is split into 4 square nodes, and when the value of 'qt_split_flag' is 0, the corresponding node becomes the 'QT leaf node' of the quad tree, and the corresponding node is split into multi-type nodes. According to an embodiment of the present invention, quad tree splitting can be limited according to the type of the current node. Quad tree splitting can be allowed when the current node is the coding tree unit (root node of the quad tree) or the quad tree node, and quad tree splitting may not be allowed when the current node is the multi-type tree node. Each quad tree leaf node 'QT leaf node' can be further split into a multi-type tree structure. As described above, when 'split_qt_flag' is 0, the current node can be split into multi-type nodes. In order to indicate the splitting direction and the splitting shape, 'mtt_split_cu_vertical_flag' and 'mtt_split_cu_binary_flag' can be signaled. When the value of 'mtt_split_cu_vertical_flag' is 1, vertical splitting of the node 'MTT node' is indicated, and when the value of 'mtt_split_cu_vertical_flag' is 0, horizontal splitting of the node 'MTT node' is indicated. In addition, when the value of 'mtt_split_cu_binary_flag' is 1, the node 'MTT node' is split into two rectangular nodes, and when the value of 'mtt_split_cu_binary_flag' is 0, the node 'MTT node' is split into three rectangular nodes.

In the tree partitioning structure, a luma block and a chroma block may be partitioned in the same form. That is, a chroma block may be partitioned by referring to the partitioning form of a luma block. When a current chroma block is less than a predetermined size, a chroma block may not be partitioned even if a luma block is partitioned.

In the tree partitioning structure, a luma block and a chroma block may have different forms. In this case, luma block partitioning information and chroma block partitioning information may be signaled separately. Furthermore, in addition to the partitioning information, luma block encoding information and chroma block encoding information may also be different from each other. In one example, the luma block and the chroma block may be different in at least one among intra encoding mode, encoding information for motion information, etc.

A node to be split into the smallest units may be treated as one coding block. When a current block is a coding block, the coding block may be partitioned into several sub-blocks (sub-coding blocks), and the sub-blocks may have the same prediction information or different pieces of prediction information. In one example, when a coding unit is in an intra mode, intra-prediction modes of sub-blocks may be the same or different from each other. Also, when the coding unit is in an inter mode, sub-blocks may have the same motion information or different pieces of the motion information. Furthermore, the sub-blocks may be encoded or decoded independently of each other. Each sub-block may be distinguished by a sub-block index (sbIdx). Also, when a coding unit is partitioned into sub-blocks, the coding unit may be partitioned horizontally, vertically, or diagonally. In an intra mode, a mode in which a current coding unit is partitioned into two or four sub-blocks horizontally or vertically is called intra sub-partitions (ISP). In an inter mode, a mode in which a current coding block is partitioned diagonally is called a geometric partitioning mode (GPM). In the GPM mode, the position and direction of a diagonal line are derived using a predetermined angle table, and index information of the angle table is signaled.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
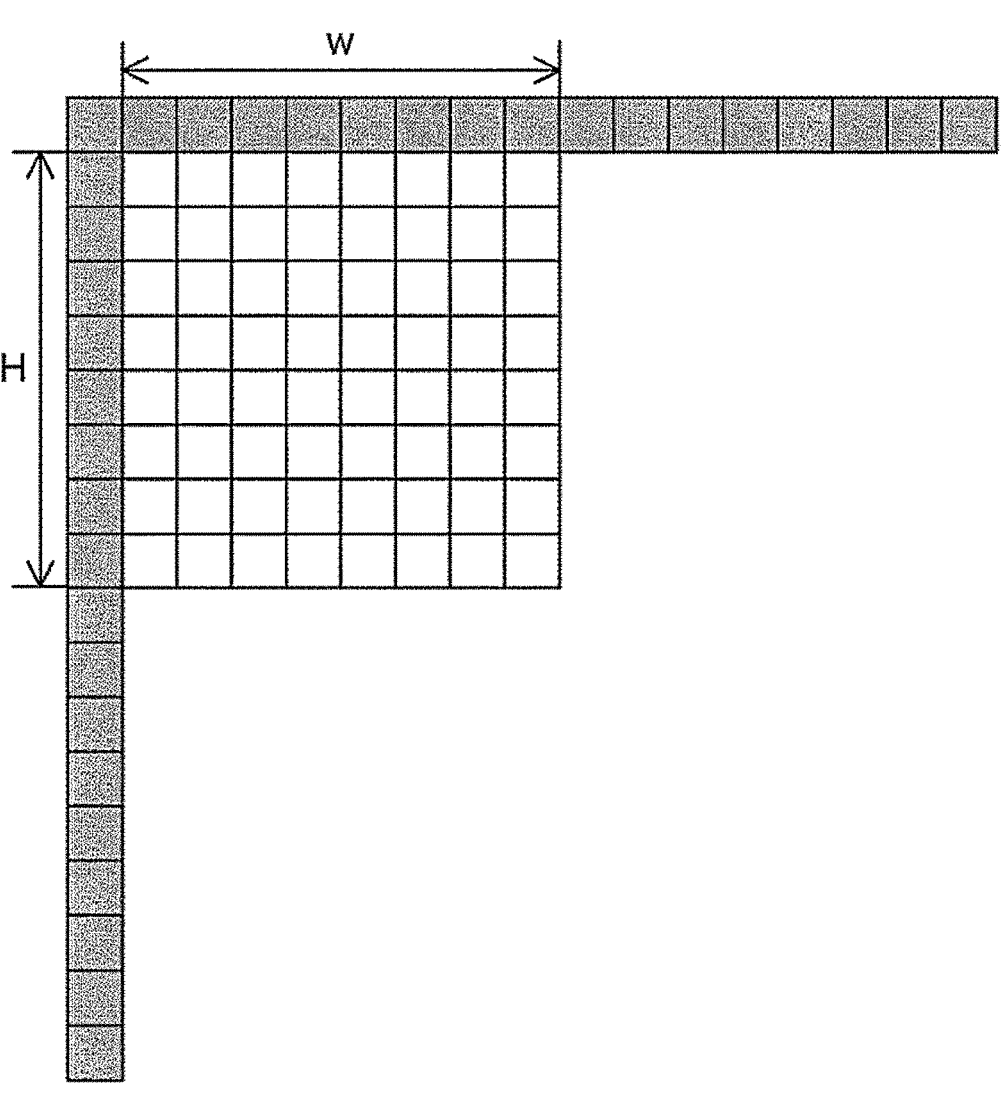
FIGS. 5 and 6 illustrate an intra-prediction method in more detail according to an embodiment of the present disclosure.
Figure 6:
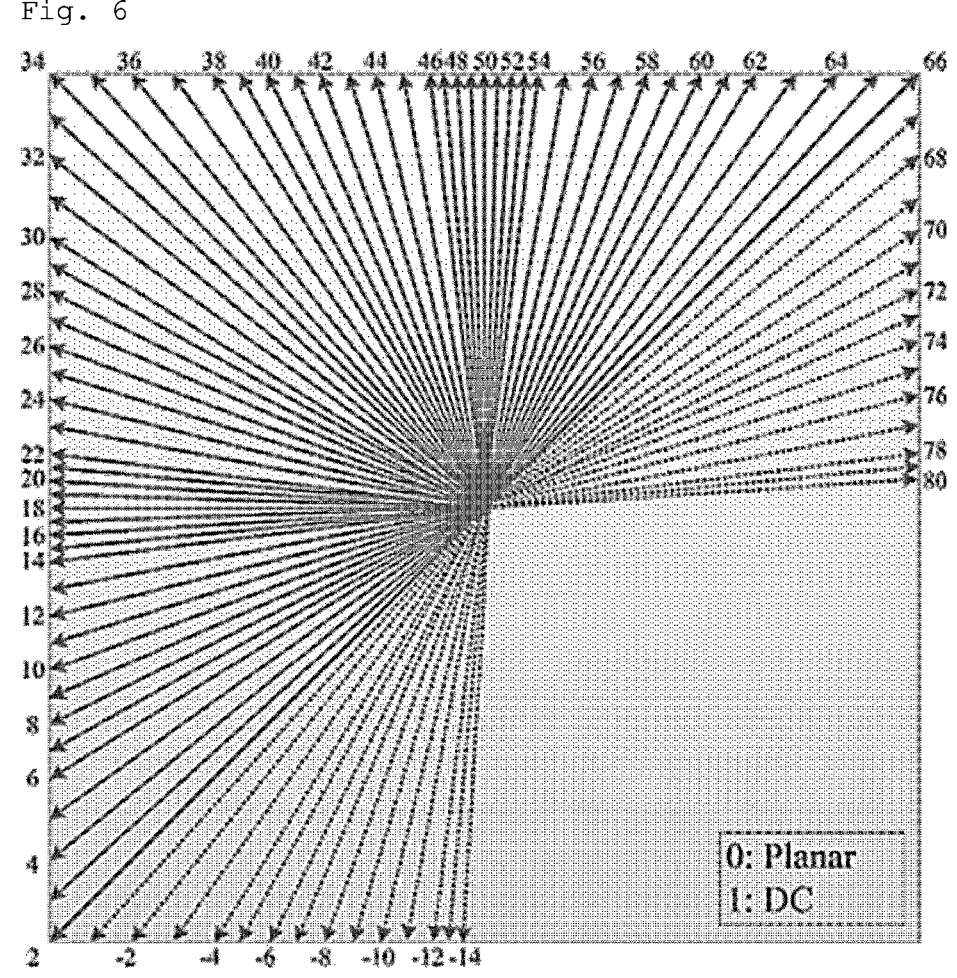

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2 W+2H+1 neighboring samples located on the left and/or upper side of the current block.

Pixels from multiple reference lines may be used for intra prediction of the current block. The multiple reference lines may include n lines located within a predetermined range from the current block. According to an embodiment, when pixels from multiple reference lines are used for intra prediction, separate index information that indicates lines to be set as reference pixels may be signaled, and may be named a reference line index.

When at least some samples to be used as reference samples have not yet been restored, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, the preset angle range can be set differently depending on a shape of the current block. For example, if the current block is a rectangular block, a wide angle mode indicating an angle exceeding 45 degrees or less than −135 degrees in a clockwise direction can be additionally used. When the current block is a horizontal block, an angle mode can indicate an angle within an angle range (i.e., a second angle range) between (45+ offset1) degrees and (−135+ offset1) degrees in a clockwise direction. In this case, angle modes 67 to 76 outside the first angle range can be additionally used. In addition, if the current block is a vertical block, the angle mode can indicate an angle within an angle range (i.e., a third angle range) between (45-offset2) degrees and (−135-offset2) degrees in a clockwise direction. In this case, angle modes −10 to −1 outside the first angle range can be additionally used. According to an embodiment of the present disclosure, values of offset1 and offset2 can be determined differently depending on a ratio between the width and height of the rectangular block. In addition, offset1 and offset2 can be positive numbers.

According to a further embodiment of the present invention, a plurality of angle modes configuring the intra prediction mode set can include a basic angle mode and an extended angle mode. In this case, the extended angle mode can be determined based on the basic angle mode.

According to an embodiment, the basic angle mode is a mode corresponding to an angle used in intra prediction of the existing high efficiency video coding (HEVC) standard, and the extended angle mode can be a mode corresponding to an angle newly added in intra prediction of the next generation video codec standard. More specifically, the basic angle mode can be an angle mode corresponding to any one of the intra prediction modes {2, 4, 6, . . . , 66}, and the extended angle mode can be an angle mode corresponding to any one of the intra prediction modes {3, 5, 7, . . . , 65}. That is, the extended angle mode can be an angle mode between basic angle modes within the first angle range. Accordingly, the angle indicated by the extended angle mode can be determined on the basis of the angle indicated by the basic angle mode.

According to another embodiment, the basic angle mode can be a mode corresponding to an angle within a preset first angle range, and the extended angle mode can be a wide angle mode outside the first angle range. That is, the basic angle mode can be an angle mode corresponding to any one of the intra prediction modes {2, 3, 4, . . . , 66}, and the extended angle mode can be an angle mode corresponding to any one of the intra prediction modes {−14, −13, −12, . . . , −1} and {67, 68, . . . , 80}. The angle indicated by the extended angle mode can be determined as an angle on a side opposite to the angle indicated by the corresponding basic angle mode. Accordingly, the angle indicated by the extended angle mode can be determined on the basis of the angle indicated by the basic angle mode. Meanwhile, the number of extended angle modes is not limited thereto, and additional extended angles can be defined according to the size and/or shape of the current block. Meanwhile, the total number of intra prediction modes included in the intra prediction mode set can vary depending on the configuration of the basic angle mode and extended angle mode described above In the embodiments described above, the spacing between the extended angle modes can be set on the basis of the spacing between the corresponding basic angle modes. For example, the spacing between the extended angle modes {3, 5, 7, . . . , 65} can be determined on the basis of the spacing between the corresponding basic angle modes {2, 4, 6, . . . , 66}. In addition, the spacing between the extended angle modes {−14, −13, . . . , −1} can be determined on the basis of the spacing between corresponding basic angle modes {53, 54, . . . , 66} on the opposite side, and the spacing between the extended angle modes {67, 68, . . . , 80} can be determined on the basis of the spacing between the corresponding basic angle modes {2, 3, 4, . . . , 15} on the opposite side. The angular spacing between the extended angle modes can be set to be the same as the angular spacing between the corresponding basic angle modes. In addition, the number of extended angle modes in the intra prediction mode set can be set to be less than or equal to the number of basic angle modes.

According to an embodiment of the present invention, the extended angle mode can be signaled based on the basic angle mode. For example, the wide angle mode (i.e., the extended angle mode) can replace at least one angle mode (i.e., the basic angle mode) within the first angle range. The basic angle mode to be replaced can be a corresponding angle mode on a side opposite to the wide angle mode. That is, the basic angle mode to be replaced is an angle mode that corresponds to an angle in an opposite direction to the angle indicated by the wide angle mode or that corresponds to an angle that differs by a preset offset index from the angle in the opposite direction. According to an embodiment of the present invention, the preset offset index is 1. The intra prediction mode index corresponding to the basic angle mode to be replaced can be remapped to the wide angle mode to signal the corresponding wide angle mode. For example, the wide angle modes {−14, −13, . . . , −1} can be signaled by the intra prediction mode indices {52, 53, . . . , 66}, respectively, and the wide angle modes {67, 68, . . . , 80} can be signaled by the intra prediction mode indices {2, 3, . . . , 15}, respectively. In this way, the intra prediction mode index for the basic angle mode signals the extended angle mode, and thus the same set of intra prediction mode indices can be used for signaling the intra prediction mode even if the configuration of the angle modes used for intra prediction of each block are different from each other. Accordingly, signaling overhead due to a change in the intra prediction mode e configuration can be minimized.

Meanwhile, whether or not to use the extended angle mode can be determined on the basis of at least one of the shape and size of the current block. According to an embodiment, when the size of the current block is greater than a preset size, the extended angle mode can be used for intra prediction of the current block, otherwise, only the basic angle mode can be used for intra prediction of the current block. According to another embodiment, when the current block is a block other than a square, the extended angle mode can be used for intra prediction of the current block, and when the current block is a square block, only the basic angle mode can be used for intra prediction of the current block.

The intra-prediction unit determines reference samples and/or interpolated reference samples to be used for intra prediction of the current block, based on the intra-prediction mode information of the current block. When the intra-prediction mode index indicates a specific angular mode, a reference sample corresponding to the specific angle or an interpolated reference sample from current samples in the current block is used for prediction of a current pixel. Thus, different sets of reference samples and/or interpolated reference samples may be used for intra prediction depending on the intra-prediction mode. After the intra prediction of the current block is performed using the reference samples and the intra-prediction mode information, the decoder reconstructs sample values of the current block by adding the residual signal of the current block, which has been obtained from the inverse transform unit, to the intra-prediction value of the current block.

Motion information used for inter prediction may include reference direction indication information (inter_pred_idc), reference picture index (ref_idx_10, ref_idx 11), and motion vector (mvL0, mvL1). Reference picture list utilization information (predFlagL0, predFlagL1) may be set based on the reference direction indication information. In one example, for a unidirectional prediction using an L0 reference picture, predFlagL0=1 and predFlagL1=0 may be set. For a unidirectional prediction using an L1 reference picture, predFlagL0=0 and predFlagL1=1 may be set. For bidirectional prediction using both the L0 and L1 reference pictures, predFlagL0=1 and predFlagL1=1 may be set.

When the current block is a coding unit, the coding unit may be partitioned into multiple sub-blocks, and the sub-blocks have the same prediction information or different pieces of prediction information. In one example, when the coding unit is in an intra mode, intra-prediction modes of the sub-blocks may be the same or different from each other. Also, when the coding unit is in an inter mode, the subblocks may have the same motion information or different pieces of motion information. Furthermore, the sub-blocks may be encoded or decoded independently of each other. Each sub-block may be distinguished by a sub-block index (sbIdx).

The motion vector of the current block is likely to be similar to the motion vector of a neighboring block. Therefore, the motion vector of the neighboring block may be used as a motion vector predictor (MVP), and the motion vector of the current block may be derived using the motion vector of the neighboring block. Furthermore, to improve the accuracy of the motion vector, the motion vector difference (MVD) between the optimal motion vector of the current block and the motion vector predictor found by the encoder from an original video may be signaled.

The motion vector may have various resolutions, and the resolution of the motion vector may vary on a block-by-block basis. The motion vector resolution may be expressed in integer units, half-pixel units, ¼ pixel units, 1/16 pixel units, 4-integer pixel units, etc. A video, such as screen content, has a simple graphical form such as text, and does not require an interpolation filter to be applied. Thus, integer units and 4-integer pixel units may be selectively applied on a block-by-block basis. A block encoded using an affine mode, which represent rotation and scale, exhibit significant changes in form, so integer units, ¼ pixel units, and 1/16 pixel units may be applied selectively on a block-by-block basis. Information about whether to selectively apply motion vector resolution on a block-by-block basis is signaled by amvr_flag. If applied, information about a motion vector resolution to be applied to the current block is signaled by amvr_precision_idx.

In the case of blocks to which bidirectional prediction is applied, weights applied between two prediction blocks may be equal or different when applying the weighted average, and information about the weights is signaled via BCW_IDX.

In order to improve the accuracy of the motion vector predictor, a merge or AMVP (advanced motion vector prediction) method may be selectively used on a block-by-block basis. The merge method is a method that configures motion information of a current block to be the same as motion information of a neighboring block adjacent to the current block, and is advantageous in that the motion information is spatially propagated without change in a motion region with homogeneity, and thus the encoding efficiency of the motion information is increased. On the other hand, the AMVP method is a method for predicting motion information in L0 and L1 prediction directions respectively and signaling the most optimal motion information in order to represent accurate motion information. The decoder derives motion information for a current block by using the AMVP or merge method, and then uses a reference block, located in the motion information in a reference picture, as a prediction block for the current block.

A method of deriving motion information in Merge or AMVP involves a method for constructing a motion candidate list using motion vector predictors derived from neighboring blocks of the current block, and then signaling index information for the optimal motion candidate. In the case of AMVP, motion candidate lists are derived for L0 and L1, respectively, so the most optimal motion candidate indexes (mvp_10_flag, mvp_11_flag) for L0 and L1 are signaled, respectively. In the case of Merge, a single move candidate list is derived, so a single merge index (merge_idx) is signaled. There may be various motion candidate lists derived from a single coding unit, and a motion candidate index or a merge index may be signaled for each motion candidate list. In this case, a mode in which there is no information about residual blocks in blocks encoded using the merge mode may be called a MergeSkip mode.

Symmetric MVD (SMVD) is a method which makes motion vector difference (MVD) values in the L0 and L1 directions symmetrical in the case of bi-directional prediction, thereby reducing the bit rate of motion information transmitted. The MVD information in the L1 direction that is symmetrical to the L0 direction is not transmitted, and reference picture information in the L0 and L1 directions is also not transmitted, but is derived during decoding.

Overlapped block motion compensation (OBMC) is a method in which, when blocks have different pieces of motion information, prediction blocks for a current block are generated by using motion information of neighboring blocks, and the prediction blocks are then weighted averaged to generate a final prediction block for the current block. This has the effect of reducing the blocking phenomenon that occurs at the block edges in a motion-compensated video.

Generally, a merged motion candidate has low motion accuracy. To improve the accuracy of the merge motion candidate, a merge mode with MVD (MMVD) method may be used. The MMVD method is a method for correcting motion information by using one candidate selected from several motion difference value candidates. Information about a correction value of the motion information obtained by the MMVD method (e.g., an index indicating one candidate selected from the motion among difference value candidates, etc.) may be included in a bitstream and transmitted to the decoder. By including the information about the correction value of the motion information in the bitstream, a bit rate may be saved compared to including an existing motion information difference value in a bitstream.

A template matching (TM) method is a method of configuring a template through a neighboring pixel of a current block, searching for a matching area most similar to the template, and correcting motion information. Template matching (TM) is a method of performing motion prediction by a decoder without including motion information in a bitstream so as to reduce the size of an encoded bitstream. The decoder does not have an original image, and thus may schematically derive motion information of a current block by using a pre-reconstructed neighboring block.

A Decoder-side Motion Vector Refinement (DMVR) method is a method for correcting motion information through the correlation of already restored reference videos in order to find more accurate motion information. The DMVR method is a method which uses the bidirectional motion information of a current block to use, within predetermined regions of two reference pictures, a point with the best matching between reference blocks in the reference pictures as a new bidirectional motion. When the DMVR method is performed, the encoder may perform DMVR on one block to correct motion information, and then partition the block into sub-blocks and perform DMVR on each sub-block to correct motion information of the sub-block again, and this may be referred to as multi-pass DMVR (MP-DMVR).

A local illumination compensation (LIC) method is a method for compensating for changes in luma between blocks, and is a method which derives a linear model by using neighboring pixels adjacent to a current block, and then compensate for luma information of the current block by using the linear model.

Existing video encoding methods perform motion compensation by considering only parallel movements in upward, downward, leftward, and rightward directions, thus reducing the encoding efficiency when encoding videos that include movements such as zooming, scaling, and rotation that are commonly encountered in real life. To express the movements such as zooming, scaling, and rotation, affine model-based motion prediction techniques using four (rotation) or six (zooming, scaling, rotation) parameter models may be applied.

Bi-directional optical flow (BDOF) is used to correct a prediction block by estimating the amount of change in pixels on an optical-flow basis from a reference block of blocks with bi-directional motion. Motion information derived by the BDOF of VVC may be used to correct the motion of a current block.

Prediction refinement with optical flow (PROF) is a technique for improving the accuracy of affine motion prediction for each sub-block so as to be similar to the accuracy of motion prediction for each pixel. Similar to BDOF, PROF is a technique that obtains a final prediction signal by calculating a correction value for each pixel with respect to pixel values in which affine motion is compensated for each sub-block based on optical-flow.

The combined inter-/intra-picture prediction (CIIP) method is a method for generating a final prediction block by performing weighted averaging of a prediction block generated by an intra-picture prediction method and a prediction block generated by an inter-picture prediction method when generating a prediction block for the current block.

The intra block copy (IBC) method is a method for finding a part, which is most similar to a current block, in an already reconstructed region within a current picture and using the reference block as a prediction block for the current block. In this case, information related to a block vector, which is the distance between the current block and the reference block, may be included in a bitstream. The decoder can parse the information related to the block vector contained in the bitstream to calculate or set the block vector for the current block.

The bi-prediction with CU-level weights (BCW) method is a method in which with respect to two motion-compensated prediction blocks from different reference pictures, weighted averaging of the two prediction blocks is performed by adaptively applying weights on a block-by-block basis without generating the prediction blocks using an average.

The multi-hypothesis prediction (MHP) method is a method for performing weighted prediction through various prediction signals by transmitting additional motion information in addition to unidirectional and bidirectional motion information during inter-picture prediction.

The cross-component linear model (CCLM) is a method that constructs a linear model by using the high correlation between a luma signal and a chroma signal at the same position as the luma signal, and then predict the chroma signal by using the linear model. A template is constructed using a block, which has been completely reconstructed, among neighboring blocks adjacent to a current block, and parameters for the linear model are derived through the template. Next, a current luma block, selectively reconstructed based on video formats so as to fit the size of a chroma block, is downsampled. Finally, the downsampled luma block and the corresponding linear model are used to predict a chroma block of the current block. In this case, a method using two or more linear models is referred to as multi-model linear mode (MMLM).

In independent scalar quantization, a reconstructed coefficient $t'_k$ for an input coefficient $t_k$ depends only on a related quantization index $q_k$. That is, a quantization index for a random reconstructed coefficient has a different value from quantization indexes for other reconstructed coefficients. Here, $t'_k$ may be a value that includes a quantization error in $t_k$, and may be different or the same depending on quantization parameters. Here, $t'_k$ may be called a reconstructed transform coefficient or a dequantized transform coefficient, and the quantization index may be called a quantized transform coefficient.

In uniform reconstruction quantization (URQ), reconstructed coefficients have the characteristic of being arrangement at equal intervals. The distance between two adjacent reconstructed values may be called a quantization step size. The reconstructed values may include 0, and the entire set of available reconstructed values may be uniquely defined based on the quantization step size. The quantization step size may vary depending on quantization parameters.

In the existing methods, quantization reduces the set of acceptable reconstructed transform coefficients, and elements of the set may be finite. Thus, there are limitation in minimizing the average error between an original video and a reconstructed video. Vector quantization may be used as a method for minimizing the average error.

A simple form of vector quantization used in video encoding is sign data hiding. This is a method in which the encoder does not encode a sign for one non-zero coefficient and the decoder determines the sign for the coefficient based on whether the sum of absolute values of all the coefficients is even or odd. To this end, in the encoder, at least one coefficient may be incremented or decremented by "1", and the at least one coefficient may be selected and have a value adjusted so as to be optimal from the perspective of rate-distortion cost. In one example, a coefficient with a value close to the boundary e quantization intervals may be selected.

Another vector quantization method is trellis-coded quantization, and, in video encoding, is used as an optimal path-searching technique to obtain optimized quantization values in dependent quantization. On a block-by-block basis, quantization candidates for all coefficients in a block are placed in a trellis graph, and the optimal trellis path between optimized quantization candidates is found by considering rate-distortion cost. Specifically, the dependent quantization applied to video encoding may be designed such that a set of acceptable reconstructed transform coefficients with respect to transform coefficients depends on the value of a transform coefficient that precedes a current transform coefficient in the reconstruction order. At this time, by selectively using multiple quantizers according to the transform coefficients, the average error between the original video and the reconstructed video is minimized, thereby increasing the encoding efficiency.

Among intra prediction encoding techniques, the matrix intra prediction (MIP) method is a matrix-based intra prediction method, and obtains a prediction signal by using a predefined matrix and offset values through pixels on the left and top of a neighboring block, unlike a prediction method having directionality from pixels of neighboring blocks adjacent to a current bloc.

To derive an intra-prediction mode for a current block, on the basis of a template which is a random reconstructed region adjacent to the current block, an intra-prediction mode for a template derived through neighboring pixels of the template may be used to reconstruct the current block. First, the decoder may generate a prediction template for the template by using neighboring pixels (references) adjacent to the template, and may use an intra-prediction mode, which has generated the most similar prediction template to an already reconstructed template, to reconstruct the current block. This method may be referred to as template intra mode derivation (TIMD).

In general, the encoder may determine a prediction mode for generating a prediction block and generate a bitstream including information about the determined prediction mode. The decoder may parse a received bitstream to set an intra-prediction mode. In this case, the bit rate of information about the prediction mode may be approximately 10% of the total bitstream size. To reduce the bit rate of information about the prediction mode, the encoder may not include information about an intra-prediction mode in the bitstream. Accordingly, the decoder may use the characteristics of neighboring blocks to derive (determine) an intra-prediction mode for reconstruction of a current block, and may use the derived intra-prediction mode to reconstruct the current block. In this case, to derive the intra-prediction mode, the decoder may apply a Sobel filter horizontally and vertically to each neighboring pixel adjacent to the current block to infer directional information, and then map the directional information to the intra-prediction mode. The method by which the decoder derives the intra-prediction mode using neighboring blocks may be described as decoder side intra mode derivation (DIMD).

Figure 7:
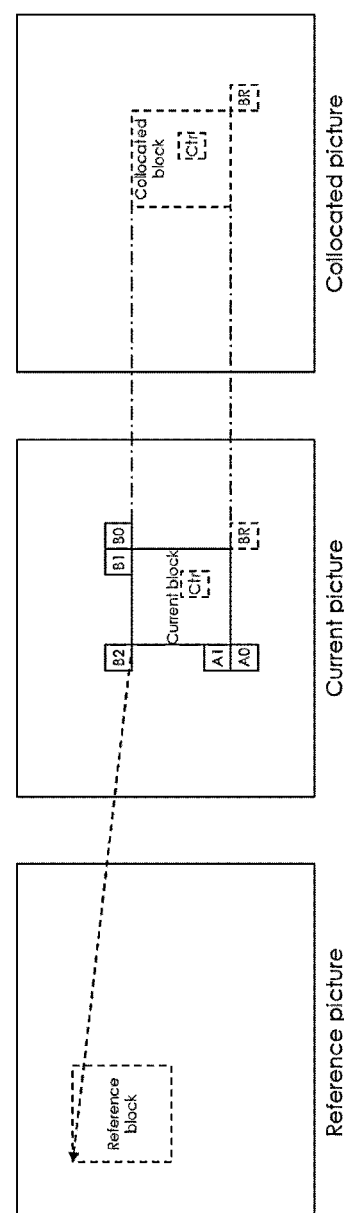
FIG. 7 illustrates the position of neighboring blocks used to construct a motion candidate list in inter prediction.

FIG. 7 illustrates the position of neighboring blocks used to construct a motion candidate list in inter prediction.

The neighboring blocks may be spatially located blocks or temporally located blocks. A neighboring block that is spatially adjacent to a current block may be at least one among a left (A1) block, a left below (A0) block, an above (B1) block, an above right (B0) block, or an above left (B2) block. A neighboring block that is temporally adjacent to the current block may be a block in a collocated picture, which includes the position of a top left pixel of a bottom right (BR) block of the current block. When a neighboring block temporally adjacent to the current block is encoded using an intra mode, or when the neighboring block temporally adjacent to the current block is positioned not to be used, a block, which includes a horizontal and vertical center (Ctr) pixel position in the current block, in the collocated picture corresponding to the current picture may be used as a temporal neighboring block. Motion candidate information derived from the collocated picture may be referred to as a temporal motion vector predictor (TMVP). Only one TMVP may be derived from one block. One block may be partitioned into multiple sub-blocks, and a TMVP candidate may be derived for each sub-block. A method for deriving TMVPs on a sub-block basis may be referred to as sub-block temporal motion vector predictor (sbTMVP).

Whether methods described in the present specification are to be applied may be determined on the basis of at least one of pieces of information relating to slice type information (e.g., whether a slice is an I slice, a P slice, or a B slice), whether the current block is a tile, whether the current block is a subpicture, the size of a current block, the depth of a coding unit, whether a current block is a luma block or a chroma block, whether a frame is a reference frame or a non-reference frame, and a temporal layer corresponding a reference sequence and a layer. Pieces of information used to determine whether methods described in the present specification are to be applied may be pieces of information promised between a decoder and an encoder in advance. In addition, such pieces of information may be determined according to a profile and a level. Such pieces of information may be expressed by a variable value, and a bitstream may include information on a variable value. That is, a decoder may parse information on a variable value included in a bitstream to determine whether the above methods are applied. For example, whether the above methods are to be applied may be determined on the basis of the width length or the height length of a coding unit. If the width length or the height length is equal to or greater than 32 (e.g., 32, 64, or 128), the above methods may be applied. If the width length or the height length is smaller than 32 (e.g., 2, 4, 8, or 16), the above methods may be applied. If the width length or the height length is equal to 4 or 8, the above methods may be applied.

Figure 8:
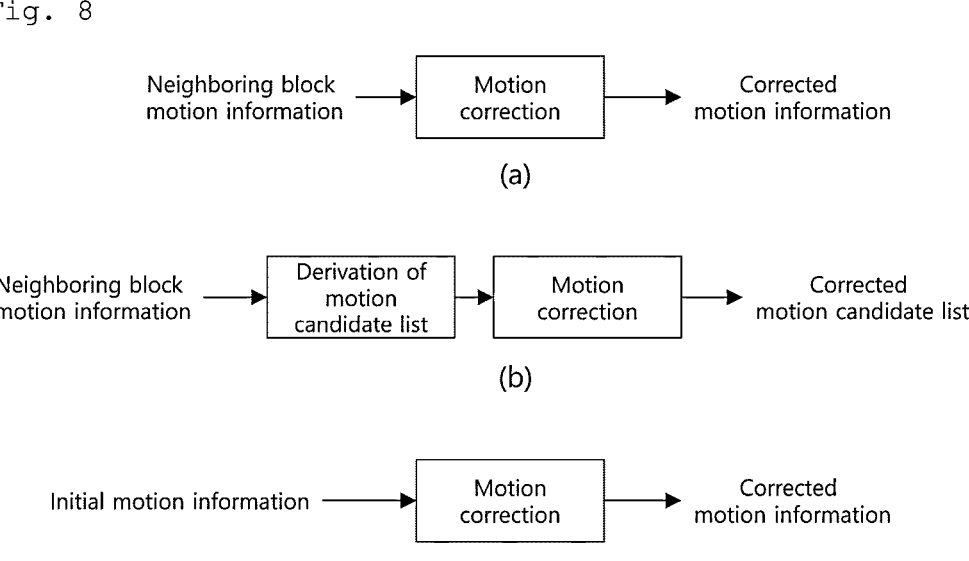
FIG. 8 is diagrams illustrating a method of correcting motion information according to an embodiment of the present disclosure.

FIG. 8A, FIG. 8B, and FIG. 8C are diagrams illustrating a method of correcting motion information according to an embodiment of the present disclosure.

FIG. 8A illustrates a process of correcting (revising) motion information derived from a neighboring block of a current block to output new motion information. Referring to FIG. 8A, a decoder may correct motion information of a neighboring block of a current block by various motion correction methods to obtain the corrected motion information. Referring to FIG. 8B, a decoder may derive a motion candidate list from a neighboring block of a current block and then correct one or more motion candidates in the derived motion candidate list by various motion correction methods to obtain the corrected motion candidate list. The motion candidate list may be configured using motion information derived from the neighboring block of the current block. The decoder may perform a motion correction process individually or entirely for the one or more motion candidates in the motion candidate list to obtain the corrected motion candidate list including the corrected one or more motion candidates. Referring to FIG. 8C, a decoder may correct initial motion information of a current block by various motion correction methods to obtain the corrected motion information.

Figure 9:
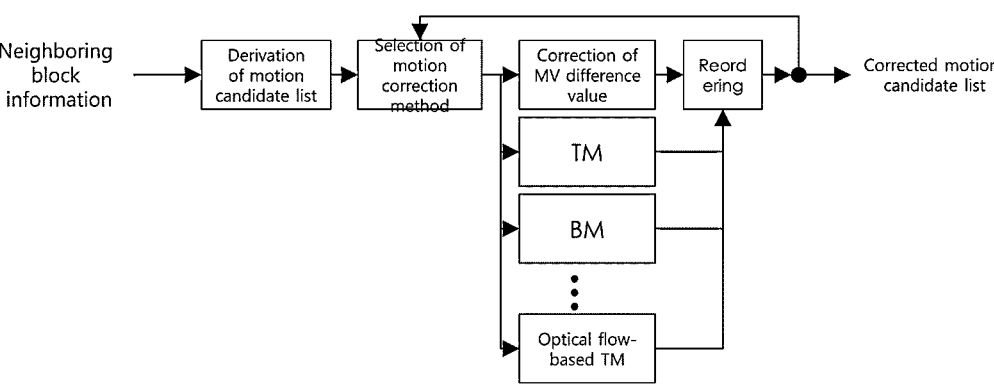
FIG. 9 is a diagram illustrating a method of correcting motion information of a current block by a recursively performing motion correction method according to an embodiment of the present disclosure.

FIG. 9 illustrates a method for correcting motion information of a current block by recursively performing a motion correction method according to an embodiment of the present disclosure.

Referring to FIG. 9A, a decoder may construct a motion candidate list for a current block by using neighboring block information, correct motion candidates in the motion candidate list by use one or more motion correction methods, and resort the corrected motion candidates, thereby acquiring a corrected motion candidate list. The motion candidate correction method may be performed recursively. Referring to FIG. 9B, a decoder may acquire initial motion information, and correct the motion information by using one or more motion correction methods to acquire corrected motion information. The motion candidate correction method may be performed recursively.

A decoder may correct initial motion information of a current block by recursively performing a motion correction method. The decoder may configure a motion candidate list for a current block by using neighboring blocks of the current block, and correct motion information by recursively performing one or more motion correction methods. The one or more motion correction methods may be motion vector difference (MVD), template matching (TM), bilateral matching (BM), merge mode with MVD (MMVD), merge mode with MVD (MMVD)-based TM, optical flow-based TM, and multi-pass DMVR. MVD is a method in which an encoder generates a correction value for motion information included in a bitstream, and a decoder obtains the correction value for the motion information from the bitstream to correct the motion information (MV difference value correction of FIG. 9). TM may be a method in which a decoder configures a template on the basis of a neighboring pixel of a current block, searches for a matching area most similar to the configured template, and corrects motion information. BM may be a method in which a decoder corrects motion information of a current block on the basis of the similarity between a reference block in a picture included in an L0 picture list derived on the basis of the motion information and a reference block in a picture included in an L1 picture list. The MMVD method is a method of correcting motion information by using one of one or more motion difference value candidates. An encoder may generate a bitstream including information on an index indicating one of one or more motion difference value candidates. A decoder may parse the information on the index included in the bitstream to obtain a difference value candidate indicated by the index, and correct motion information on the basis of the obtained difference value candidate. The MMVD-based TM method is a method in which an expanded motion candidate list configured using a motion candidate list and one or more motion difference value candidates is rearranged on the basis of a TM cost value, and motion information of a current block is corrected using a motion candidate in the rearranged list. An encoder may generate a bitstream including information on an index indicating one of candidates in a rearranged list. A decoder may parse the information on the index included in the bitstream and use a motion correction candidate indicated by the index as a correction value of motion information of a current block. The optical flow-based TM method may be a method in which a decoder configures a template of an area adjacent to a current block in an optical flow map, searches for an area similar to that of an optical flow map of a reference picture, and corrects motion information.

One or more motion correction methods may be applied to a merge or AMVP mode. Referring to FIG. 9, a decoder may derive (configure) a motion candidate list (e.g., merge candidate list) for a current block. The decoder may individually or entirely correct motion information (e.g., merge candidates) in the motion candidate list by using one or more motion correction methods. The decoder may rearrange the motion candidate list on the basis of a cost value of the corrected motion information. As described above, the decoder may perform the above correction method individually or entirely for motion candidates in the rearranged motion candidate list and rearrange the motion candidate list. That is, the decoder may recursively perform correction of the motion candidates and rearrangement of the motion candidate list. If this method is applied, the accuracy of motion information of a motion candidate in a motion candidate list is increased and thus residual signals are reduced so that the bit amount of residual signals can be reduced. The decoder may receive a separate signaling including an index indicating one of motion candidates in the rearranged motion list, candidate and predict (reconstruct) the current block on the basis of the motion candidate indicated by the index. Alternatively, the decoder may select a motion candidate having the lowest cost value, and predict (reconstruct) the current block on the basis of the motion candidate having the lowest cost value.

In order to increase the accuracy of a merge candidate, an encoder may generate a bitstream including information on an index indicating one of correction values of motion information obtained using a merge mode with MVD (MMVD) method, and a decoder may obtain the correction value of the motion information through the index obtained parsing the information on the index included in the bitstream, and use the correction value of the motion information to predict (reconstruct) a current block. The MMVD method is a method of selecting one of multiple motion difference value candidates, and may exhibit a lack of accuracy compared to a conventional method enabling sending a precise motion information difference value, but can save the amount of bits. In order to increase accuracy slightly, a decoder may obtain second corrected motion information by additionally applying at least one method among TM, BM, merge mode with MVD (MMVD), merge mode with MVD (MMVD)-based TM, optical flow-based TM, and multi-pass DMVR methods to first corrected motion information obtained through correction based on a correction value of motion information obtained using the MMVD method. Alternatively, an encoder may apply at least one method among TM, BM, merge mode with MVD (MMVD), merge mode with MVD (MMVD)-based TM, optical flow-based TM, and multi-pass DMVR methods to correct motion information, and then generate a bitstream additionally including information on a correction value of the motion information obtained applying the at least one method.

For AMVP, a difference value of motion information may be included in a bitstream. A decoder may generate a prediction block of a current block by using the difference value of the motion information included in the bitstream. The difference value of the motion information is included in the bitstream, and thus there is a problem in that the amount of bits is increased. To solve the problem, the above method may also be applied to an AMVP candidate list. That is, each or all of one or more candidates in a candidate list obtained using AMVP may be corrected on the basis of at least one method among TM, BM, merge mode with MVD (MMVD), merge mode with MVD (MMVD)-based TM, optical flow-based TM, and multi-pass DMVR. Corrected motion information is used, and thus the bit amount of a difference value of motion information actually included in a bitstream can be reduced.

A MVD is first performed, and a correction method using at least one of TM, BM, merge mode with MVD (MMVD), merge mode with MVD (MMVD)-based TM, optical flow-based TM, and multi-pass DMVR may be performed. Alternatively, an encoder may generate a bitstream including a correction value of initial motion information by using MVD. A decoder may perform the above motion correction method on the basis of the correction value of the initial motion information included in the bitstream.

Hereinafter, a method of applying motion vector difference (MVD), template matching (TM), bilateral matching (BM), merge mode with MVD (MMVD), merge mode with MVD (MMVD)-based TM, optical flow-based TM, and multi-pass DMVR is described.

A motion correction method to be used may be determined on the basis of an encoding mode (prediction mode) of a current block. For example, if a current block is encoded in a GPM mode, at least one of TM, BM, and optical flow-based TM methods may be first performed for a MV difference value corrected using MMVD. For example, if a current block is encoded in an AMVP mode, at least one of TM, BM, and optical flow-based TM methods may be first performed for a MV difference value having been corrected using MMVD of a merge mode. Here, MVD of an AMVP mode may not be applied.

For example, if pieces of motion information of neighboring blocks adjacent to a current block are identical or similar to each other, correction of an MV difference value is not performed and at least one of TM, BM, and optical flow-based TM methods may be performed therefor. This is because there is a high possibility that the motion of the current block may be similar to the motion of the neighboring blocks. If pieces of motion information of neighboring blocks adjacent to a current block are not similarly distributed, at least one of TM, BM, and optical flow-based TM methods may be performed for a MV difference value having been corrected using MVD or MMVD. This is because the motion of the current block may be different from those of the neighboring blocks.

For example, a motion correction method (e.g., motion vector difference (MVD), template matching (TM), bilateral matching (BM), MMVD (Merge mode with MVD), MMVD (Merge mode with MVD)-based TM, optical flow-based TM, and multi-pass DMVR) may be selected on the basis of at least one of the size of a current block, whether a current block is a luma component block or a chroma component block, quantization parameter information on a current block, pieces of motion resolution information on a current block, whether a differential signal is present in a current block, and the sum or the number of absolute values of quantization indexes other than 0 from differential signals of a current block. If the size of a current block is equal to or greater than a random size or the motion resolution of the current block is a $\frac{1}{16}$ pixel unit, the TM method may not be selected. This is because the TM method has high complexity. If a current block is a chroma component block, the TM method may not be performed and motion information having been corrected through the TM method may be used in a luma component block of the current block. For example, the motion information having been corrected through the TM method in the luma component block of the current block may be scaled and then be used in the chroma block of the current block.

For example, a motion correction method (e.g., motion vector difference (MVD), template matching (TM), bilateral matching (BM), merge mode with MVD (MMVD), merge mode with MVD (MMVD)-based TM, optical flow-based TM, and multi-pass DMVR) may be selected according to the characteristic of a current block. This is because there is a trade-off between the complexity and accuracy of each motion correction method. For example, TM has high complexity and disabled parallel processing, but exhibits the highest performance, BM has lower performance than TM, but has enabled parallel processing, and optical flow has low complexity and enabled parallel processing, but has a shortage of low performance. A selected motion correction method may be separately signaled. For example, a decoder may determine a motion correction method through a syntax element included in a bitstream. The syntax element may be signaled in an SPS level, a PPS level, a picture level, a slice level, and a coding unit (CU) level.

Figure 10:
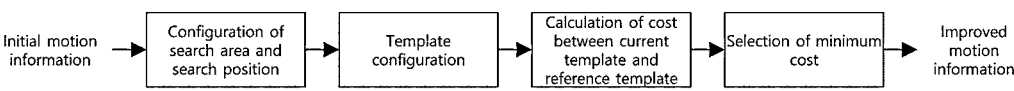
FIG. 10 is a diagram illustrating a sequence in which a TM method is performed according to an embodiment of the present disclosure.

FIG. 10 is a diagram illustrating a sequence in which a TM method is performed according to an embodiment of the present disclosure.

Referring to FIG. 10, a decoder may obtain initial motion information (initial MV and reference index) derived from neighboring block. The decoder may configure a search area in a reference image on the basis of the initial motion information. The decoder may select several candidate positions in the search areas according to a pre-defined search pattern. The decoder may configure a template for a current block by using a neighboring block of the current block, and configure a reference image template having the same size as the template for the current block on the basis of the candidate positions. The decoder may obtain a cost value between the template for the current block and the reference image template. The cost value may be obtained through sum of absolute differences (SAD) or mean-removed SAD (MRSAD). The decoder may obtain cost values for all the candidate positions in the search area, and use information of a motion candidate at a position corresponding to the smallest cost value as final motion information (e.g., improved motion information in FIG. 10). The meaning of obtaining a cost value in the present specification may be the same as that of calculating a cost value by a decoder.

Figure 11:
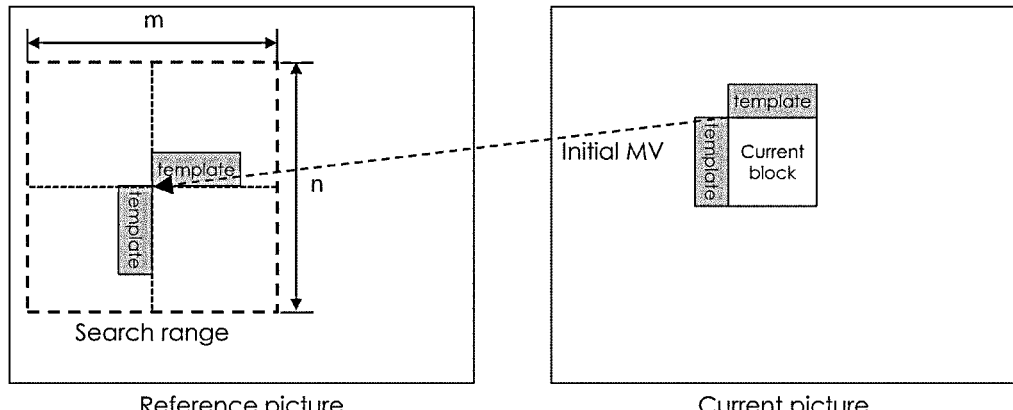
FIG. 11 is a diagram illustrating a method of configuring a search area for a TM method on the basis of initial motion information according to an embodiment of the present disclosure.

FIG. 11 is a diagram illustrating a method of configuring a search area for a TM method on the basis of initial motion information according to an embodiment of the present disclosure.

Referring to FIG. 11, in order to search for a reference block corresponding to a current block in a reference picture, a decoder may configure, as the position of the reference block, a position after movement by a value indicated by initial motion information (initial MV) from the upper left position of the current block. The decoder may configure a search range having a random (m×n) size on the basis of the upper left position of the reference block. The formula m×n may be equal to 16×16. For example, the search area may have a range from −8 to 8 in the horizontal direction on the basis of a position of the initial motion information, and a range from −8 to 8 in the vertical direction. Specifically, the position indicated by the initial motion information may be (x, y) if represented by coordinates in the horizontal and vertical directions. The coordinate of the search area in the horizontal direction may have a range from x−8 to x+8, and the coordinate in the vertical direction may have a range from y−8 to y+8. Thereafter, the decoder may configure a left template of the current block and an above template of the current block by using blocks adjacent to the current block. In addition, the decoder configures a left template of the reference block and an above template of the reference block in the reference picture on the basis of the configured position of the reference block. The left template of the current block and the left template of the reference block may have the same size, and the above template of the current block and the above template of the reference block may have the same size.

Figure 12:
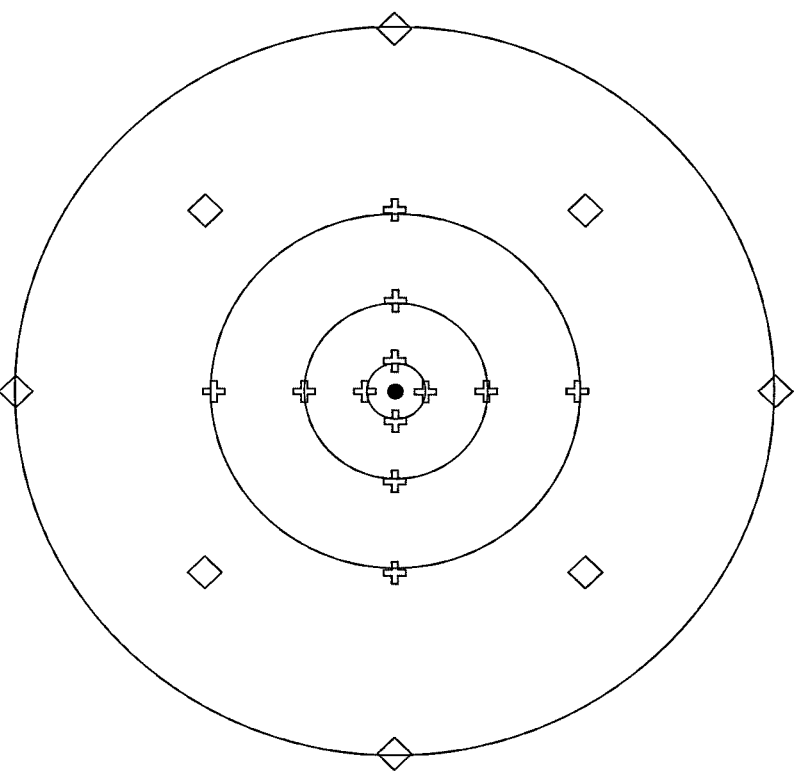
FIG. 12 is a diagram illustrating the position of a motion candidate at which same is searched for in a search area according to an embodiment of the present disclosure.

FIG. 12 is a diagram illustrating the position of a motion candidate at which same is searched for in a search area according to an embodiment of the present disclosure.

Referring to FIG. 12, the position of a motion candidate at which same is searched for in a search area for a TM method may be configured on the basis of a position (e.g., a center point of FIG. 12) related to initial motion information. The position at which a motion candidate is searched for may change according to a search pattern. The search pattern may be a diamond pattern or a cross pattern. In FIG. 12, ◇ denotes a position at which a motion candidate is searched for according to a diamond pattern, and + may denote a position at which a motion candidate is searched for according to a cross pattern. The gap of a pattern may be configured to be widened or narrowed in a direction going away from initial motion information.

Figure 13:
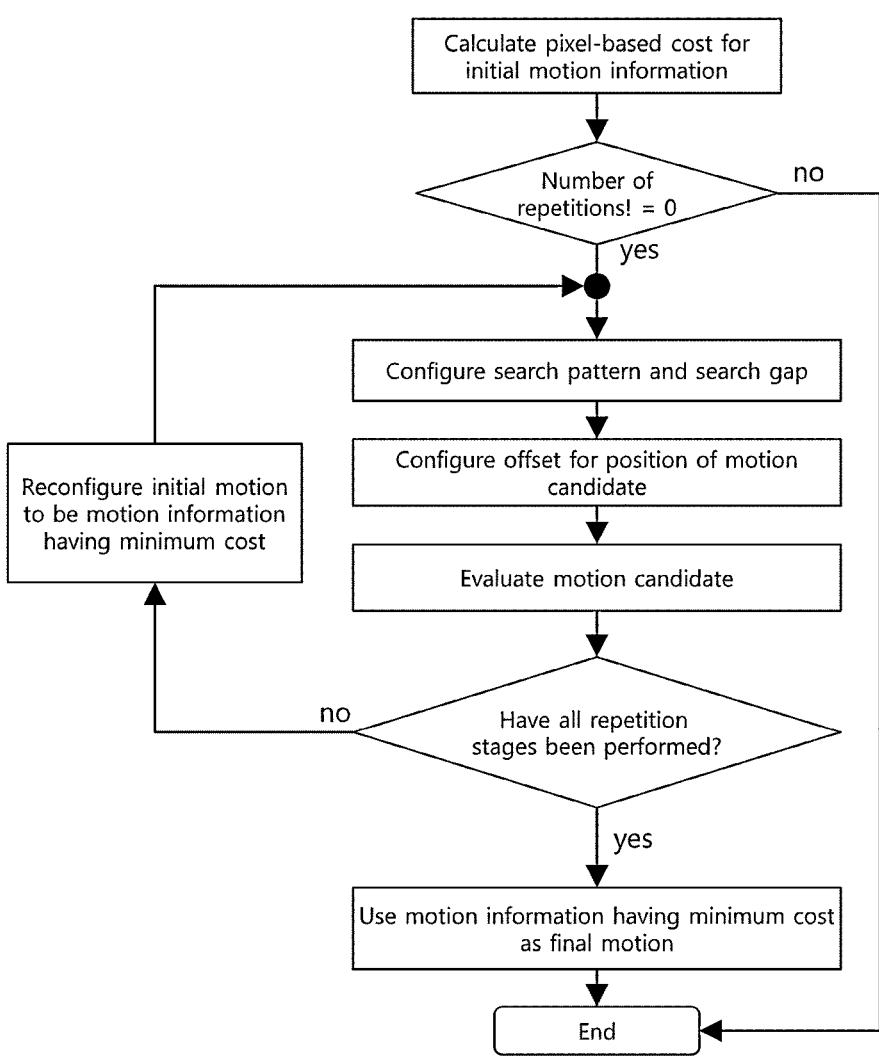
FIG. 13 is a diagram illustrating a process of searching for the position of a motion candidate according to an embodiment of the present disclosure.

FIG. 13 is a diagram illustrating a process of searching for the position of a motion candidate according to an embodiment of the present disclosure.

Specifically, FIG. 13 is a flowchart showing a searching process related to a position at which a motion candidate for a TM method is searched for. Referring to FIG. 13, a decoder may obtain (calculate) a pixel-based cost value for initial motion information. The decoder may terminate a TM method without performing same if the number of repetitions of searching is "0". Otherwise (i.e., the number of repetitions of searching is not "0"), the decoder may perform the TM method. The number of repetitions may be a random integer equal to or greater than 1. In addition, the number of repetitions, an initial search pattern, and an initial search gap may be configured before a searching process described with reference to FIG. 13. For example, the number of repetitions may be configured to be "375", an initial search pattern may be configured to be "diamond", and an initial search gap may be configured to be "6".

Next, a search pattern and a search gap may be reconfigured. The search pattern and the search gap may be determined on the basis of at least one of the size of a current block, whether the current block is a luma component block or a chroma component block, a current motion resolution, the number of repetitions, and the distribution of cost values of motion candidate positions calculated in a previous repetition stage. Hereinafter, a method of configuring the search pattern and the search gap is described.

A search gap may be determined according to a motion information resolution of a current block. The motion information resolution may be a unit of 1-integer pixels, 4-integer pixels, ½-integer pixels, ¼-integer pixels, and ¹⁄₁₆-integer pixels. If the motion information resolution is ¼-integer pixels, an initial search gap may be configured to be 6, and otherwise, an initial search gap may be configured to be 4.

A search pattern may be determined to be a diamond pattern or a cross pattern. A search gap may be adjusted to be decreased or increased from an initial search gap by a random gap. For example, the search pattern and the search gap may change according to a repetition stage. The repetition stage may indicate how many times reconfiguration of the search pattern and the search gap is repeated, if the number of repetitions is not 0. That is, the search pattern and the search gap may vary according to the ordinal number of a repetition stage. For example, in a first repetition stage, the search pattern and the search gap may be configured to be a diamond search pattern and an initial search gap. In a second stage, the search pattern and the search gap may be configured to be a cross pattern and a search gap obtained by reducing the initial search gap by 1. In a stage after the second stage, the search pattern and the search gap may be configured to be a cross pattern and a search gap obtained by reducing the gap of the previous stage by 1.

A search pattern and a search gap may be configured according to a color component of a current block. A search pattern and a search gap for a chroma component may be configured to be wider than those for a luma component. This is because a chroma component (signal) has a higher spatial correlation than a luma component (signal). Alternatively, a search pattern and a search gap for a chroma component may be configured to be shorter than those for a luma component so as to increase performance.

A search pattern and a search gap may be configured on the basis of the size of a current block. If the size of the current block is greater than a predetermined random value, a cross pattern is used as the search pattern and the search gap may be configured to be wider than an initial search gap. For example, the search gap may be "7". If the size of the current block is greater than a predetermined random number in order to increase performance, a diamond pattern is used as the search pattern and the search gap may be configured to be shorter than an initial search gap. For example, the search gap may be "5". The size of the current block may be 16×16 or 32×32, and the search pattern and the search gap may be configured on the basis of the sum of the width and the height of the current block.

Next, the decoder may configure a correction value (offset) relating to the position of a motion candidate at which same is searched for using a search pattern and a search gap, and evaluate discovered motion candidates. Evaluating in the present specification may indicate obtaining a cost value. The position at which a motion candidate is searched for may change according to a search pattern. For example, if a search pattern is a cross pattern, a correction value is (0, 1), (1, 0), (0, −1), or (−1, 0), and a search pattern is a diamond pattern, a correction value is (0, 2), (1, 1), (2, 0), (1, −1), (0, −2), (−1, −1), (−2, 0), and (−1, 1). The correction value (x, y) denotes (horizontal, vertical), and x may be a correction value in a horizontal direction, and y may be a correction value in a vertical direction.

The method described with reference to FIG. 13 may be recursively performed a predetermined random number of times. For example, the number of repetitions is 1, the method may be performed one or more times. If the decoder has searched for motion candidates and has evaluated all discovered motion candidates, the decoder may use motion information of a motion candidate corresponding to the smallest cost value as final motion information.

An initial motion candidate of FIG. 13 may be reconfigured on the basis of the smallest cost value in a previous repetition stage. An initial motion candidate of a next stage may be reconfigured on the basis of a motion candidate corresponding to the smallest cost value in a first stage. For example, if the motion candidate corresponding to the smallest cost value in the first stage is a motion candidate positioned at the upper left, the decoder may evaluate a motion candidate adjacent to the motion candidate positioned at the upper left in the next repetition stage.

The searching process described with reference to FIG. 13 may proceed differently according to whether a current block is a coding unit (block) or a subblock (sub-coding block).

If a current block is a coding block and an AMVP mode is applied to the current block, an L0 motion candidate list for L0 prediction of the current block and an L1 motion candidate list for L1 prediction may be derived. A searching process is performed for some or all motion candidates of the derived candidate lists so that corrected motion information may be derived. If a current block is a coding block and a merge mode is applied to the current block, one motion candidate list for L0 and L1 prediction of the current block may be derived. A searching process may be performed for some or all motion candidates in the derived one candidate list. L0 described in the present specification may indicate L0 prediction, and L1 may denote L1 prediction.

L0 uni-directional prediction or L1 uni-directional prediction or bi-directional prediction may be applied to a current block. Which prediction, among L0 uni-directional prediction and L1 uni-directional prediction or bi-directional prediction, to be applied to a current block may be indicated by reference direction indication information. The reference direction indication information may be reconfigured on the basis of a cost value. For example, motion information and reference direction indication information may be reconfigured for a current block, the motion information and reference direction indication information corresponding to the smallest cost value among a cost value of a prediction block generated using initial motion information of L0, a cost value of a prediction block generated using initial motion information of L1, a cost value of a prediction block generated by weighted-averaging two prediction blocks through bi-directional prediction using initial motion information of L0 and L1, a cost value of a prediction block generated using corrected motion information of L0, a cost value of a prediction block generated using corrected motion information of L1, and a cost value of a prediction block generated by weighted-averaging two prediction blocks through bi-directional prediction using corrected motions of L0 and L1.

A current coding block may be partitioned into several subblocks. Initial motion information of each subblock may be reconfigured to be corrected motion information according to a searching process. A template may differ for each subblock, and a pixel of an adjacent subblock may be used as a template. However, the decoder is able to search for a next subblock only when an adjacent subblock is reconstructed, and thus there is a problem in that a searching process is not performed in parallel for subblocks. To solve this problem, a searching process may be performed only for a subblock positioned on the boundary of a current block. Alternatively, the decoder may derive corrected motion information of a subblock positioned on the boundary of a current block by a TM method, and derive corrected motion information of a subblock not positioned on the boundary of a current block by one or more of BM, optical flow-based TM, and multi-pass DMVR methods.

If a current block is processed as a coding block, the decoder may calculate a cost value for the entirety of the current block by using initial motion information for L0 and L1, and derive corrected motion information on the basis of the calculated cost value. A motion of a lower-right partial area in the block processed as a coding block may be slightly different from the motion of the entirety of the coding block. A searching process may vary according to how a template is configured, and corrected motion information may also vary. Therefore, even when a current block is processed as a coding block, corrected motion information may be derived in a unit of subblocks on the basis of a cost value of a template configured on the basis of subblocks.

Figure 14:
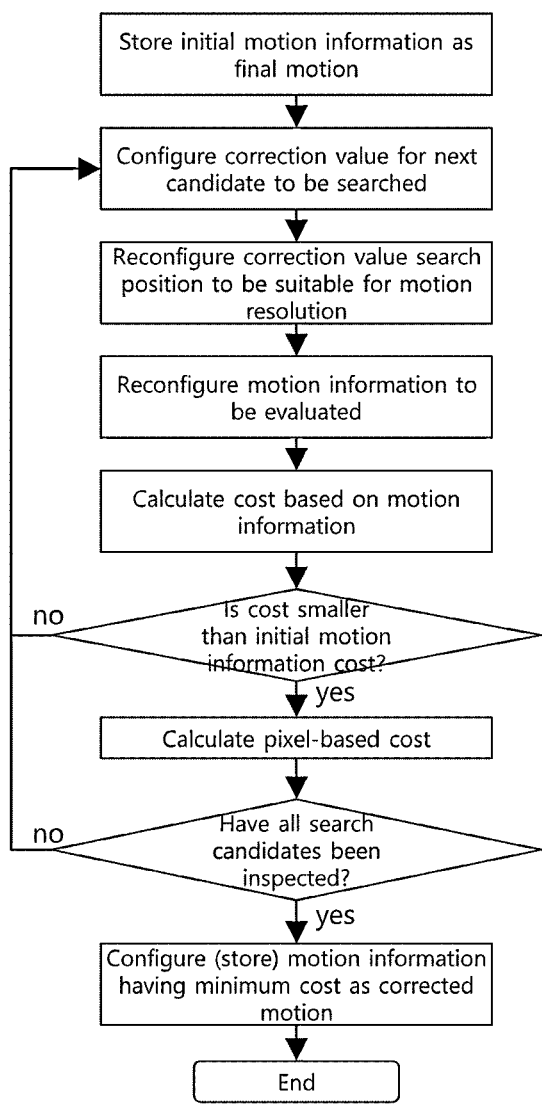
FIG. 14 is a diagram illustrating a process of evaluating a search candidate according to an embodiment of the present disclosure.

FIG. 14 is a diagram illustrating a process of evaluating a search candidate according to an embodiment of the present disclosure.

Specifically, FIG. 14 is a flowchart showing a process of evaluating a search candidate by using correction values for a candidate position selected according to a search pattern and a search gap described with reference to FIG. 13. A decoder may store initial motion information as final motion information. Then, the decoder may perform a process described below for correction values for all search candidates.

The decoder may select one from among correction values for a candidate position to be searched. The correction value may be reconfigured to be suitable for a motion resolution to be used in a current block. The decoder may reconfigure motion information to be evaluated, by adding the reconfigured correction value to the initial motion information. The decoder may obtain a cost value on the basis of the reconfigured motion information. The cost value obtained on the basis of the motion information may be calculated by adding the differences between the absolute values of horizontal components between the initial motion information and the reconfigured motion information and the differences between the absolute values of vertical components, and then multiplying the added differences by a random weight value. The random weight value may be "4". The decoder may calculate a pixel-based cost value of the reconfigured motion information only when a cost value obtained on the basis of motion information is smaller than a cost value of the initial motion information obtained on the basis of pixels.

The decoder may evaluate correction values for all search candidates, and then configure motion information corresponding to the smallest cost value as final motion information.

Each cost value obtained on the basis of motion information may be obtained through difference values between pieces of motion information obtained by adding multiple correction values to motion candidates corresponding to a position selected according to initial motion information. The cost value obtained on the basis of motion information may vary according to the size of a correction value. That is, the smaller the correction value, the smaller the cost value. Motion information corresponding to the smallest cost value is configured as final motion information, and thus evaluation may be performed only for a neighboring motion candidate at a position indicated by initial motion information and having a small correction value. However, a motion candidate having a large correction value may be an optimal motion candidate. Therefore, in order to evaluate various motion candidates to select an optimal motion candidate, a cost value may be obtained using a method described below. A cost value may be obtained using the difference between motion information values of neighboring blocks, a quantization parameter, and the size of a current block.

A cost value may be obtained using the distribution of motion information of neighboring blocks. For evaluation for various motion candidates, the decoder may obtain a cost value by using a difference value between corrected motion information and motion information of a neighboring block. For example, the decoder may compare, with a predetermined random value, a difference value between corrected motion information and motion information of a neighboring block, and obtain a cost value according to a result of the comparison.

Specifically, if a difference value between corrected motion information and motion information of a neighboring block is greater than (or smaller than, or equal to) a predetermined random value, the decoder may obtain a cost value. The neighboring block may be a neighboring block adjacent to a current block or a temporal neighboring block at the same position as the current block in a collocated picture.

A cost value may be obtained on the basis of the size of a current block. For example, a weight for obtaining the cost value may be configured according to the size of the current block. The weight may be configured to be in inverse proportion to the size of the current block. That is, the larger the size of the current block, the lower the weight may be configured. This configuration allows evaluation of a motion candidate in a wider range for selection of a suitable motion candidate. The weight may be configured to be in proportion to the size of the current block. That is, the larger the size of the current block, the higher the weight may be configured. This configuration may lower complexity. For example, the size of the current block may be 16×16 or 32×32 and may be configured to be the sum of the width and the height of the current block. The weight may be an integer value such as 1, 2, 3, 4, 5, 6, etc. In addition, the greater the weight, the higher the cost value, and thus if the weight is equal to or greater than a particular value, the decoder may not perform evaluation for acquisition of a cost value.

Using a method for correcting motion information based on a cost value described in the present specification has the effect of increasing the prediction efficiency of motion information of a current block and reducing a bit rate for a motion difference value signaled in a bitstream. A difference value may be configured in the form of "x, y", wherein x may be a difference value in the horizontal direction and y may be a difference value in the vertical direction. With the increased prediction efficiency of motion information, there may be many occurrences wherein the difference value of motion information is "0, 0". When the difference value is "0, 0", the encoder may select a merge mode as a final encoding mode for the current block. In the merge mode, one motion candidate list is used, and thus L0 prediction motion information and L1 prediction motion information are combined together to process a motion candidate list. However, in an AMVP mode, a motion candidate list for L0 prediction and motion candidate list for L1 prediction may be processed independently of each other. Therefore, in the TM method, the AMVP may be more effective. That is, in the method for correcting motion information of a current block based on a cost value, the encoder may select the AMVP mode as an encoding mode of the current block. In encoding a difference values of motion information, the encoder may separate a horizontal difference value from a vertical difference value and signal the difference values with respective codewords. In addition, the encoder may integrate the horizontal and vertical difference values into one codeword for signaling. For example, when the difference value of motion information is less than or equal to a predetermined value, the difference values in the horizontal and vertical directions may be integrated into one codeword and signaled. Conversely, when the difference value of motion information is greater than the predetermined value, the difference values in the horizontal and vertical directions may be signaled with respective codewords. In this case, the predetermined value may be an integer. In particular, in the AMVP mode, when the difference value of motion information is "0, 0", difference values of the motion information in the horizontal and vertical directions may be integratedly signaled by one syntax element (flag) instead of being separately signaled. In the present specification, a syntax element may have the same meaning as a flag.

FIG. 15 illustrates a method for signaling a difference value of motion information according to an embodiment of the present disclosure.

FIG. 15 illustrates a method for signaling a difference value of motion information when the difference value is "0, 0". Referring to FIG. 15, a decoder may parse "mvd_zero_flag". The "mvd_zero_flag" may be a syntax element indicating whether a difference value of motion information of the current block is "0, 0". When the value of "mvd_zero_flag" is "1", the difference value of the motion information of the current block may be set to "0, 0", and the parsing process for a difference value of subsequent motion information may be omitted. When the value of "mvd_zero_flag" is "0", the difference value of the motion information of the current block is not "0, 0", so the decoder may parse "abs_mvd_greater0_flag[0]". "abs_mvd_greater0_flag[0]" may be a syntax element indicating the horizontal direction of a motion difference value of the current block. When the value of "abs_mvd_greater0_flag[0]" is 0, a difference value of the motion information in the horizontal direction may be 0. When the difference value of the motion information in the horizontal direction is 0, a difference value in the vertical direction must be greater than or equal to 1. Therefore, when the value of "abs_mvd_greater0_flag[0]" is 0, the decoder may infer the value of "abs_mvd_greater0_flag[1]" to be 1 without parsing "abs_mvd_greater0_flag[1]". When the value of "abs_mvd_greater0_flag[0]" is "1", the difference value in the vertical direction may be "0" or "1". Therefore, when the value of "abs_mvd_greater0_flag[0]" is "1", the decoder may parse "abs_mvd_greater0_flag[1]". "abs_mvd greater0_flag[1]" may be a syntax element indicating the difference value of the motion information in the vertical direction. When the value of "mvd_zero_flag" is not parsed, the value of "mvd_zero_flag" may be inferred to be "0". Whether "mvd_zero_flag" is parsed may be signaled through specific syntax elements at a SPS level, a PPS level, a picture header level, etc. The specific syntax elements at the levels may be described as sps_mvd_zero_enabled_flag, pps_mvd_zero_flag, and ph_mvd_zero_enabled_flag, respectively. When "mvd_zero_flag" is not parsed, the value of "mvd_zero_flag" may be set to a value indicated by the specific syntax element signaled at the SPS level, the PPS level, the picture header level, etc.

FIG. 16 illustrates the result of entropy coding of "mvd_zero_flag" using CABAC according to an embodiment of the present disclosure.

Referring to FIG. 16, "mvd_zero_flag" may be entropy-coded using context adaptive binary arithmetic coding (CABAC). As shown in FIG. 16, a context model for "mvd_zero_flag" may be defined by a value obtained through an experiment. In FIG. 16A, "initValue" represents contextual models for "mvd_zero_flag", and "shiftIdx" may be used for probability update of "mvd_zero_flag". "initValue" is determined based on the type of current slice. Specifically, "initValue" may be determined based on whether the current slice is an I slice, a P slice, or a B slice. FIG. 16B illustrates a context model that may be used for each slice type. Referring to FIG. 16B, when the type of current slice is an I slice, "mvd_zero_flag" may have values of 0 to 2, and "initValue" may have a value of 17, 42, or 36 depending on the value of "mvd_zero_flag" (referring to FIG. 16A, the corresponding values of initValue when ctxidx of mvd_zero_flag has values of 0 to 2). When the type of current slice is a P slice, "mvd_zero_flag" may have values of 3 to 5, and "initValue" may have a value of 0, 57, or 44 depending on the value of "mvd_zero_flag" (referring to FIG. 16A, the corresponding values of initValue when ctxidx of mvd_zero_flag has values of 3 to 5). When the type of current slice is a B slice, "mvd_zero_flag" may have values of 6 to 8, and "initValue" may have a value of 0, 43, or 35 depending on the value of "mvd_zero_flag" (referring FIG. 16A, the corresponding values of initValue when ctxidx of mvd_zero_flag has values of 6 to 8).

There may be at least one "initValue" used for each slice type. Only one "initValue" may be defined per slice type. For example, when the type of current slice is an I slice, the value of "mvd_zero_flag" may be 0, and "initValue" may be 17. When the type of current slice is a P slice, the value of "mvd_zero_flag" may be 3, and "initValue" may be 0. When the type of current slice is a B slice, the value of "mvd_zero_flag" may be 6, and "initValue" may be 0. In addition, "initValue" may be selectively applied to each slice. For example, the order of use of "initValue" values may vary depending on the value of "sh_cabac_init_flag" which is a syntax element defined in a slice header. When the value of "sh_cabac_init_flag" is "1" and when the type of current slice is a P slice, the value of "mvd_zero_flag" may be 6, and "initValue" may be 0. When the value of "sh_cabac_init_flag" is "1" and when the type of current slice is a B slice, the value of "mvd_zero_flag" may be 3, and "initValue" may be 0. When the value of "sh_cabac_init_flag" is "0" and when the type of current slice is a P slice, the value of "mvd_zero_flag" may be 3, and "initValue" may be 0. When the value of "sh_cabac_init_flag" is "0" and when the type of current slice is a B slice, the value of "mvd_zero_flag" may be 6, and "initValue" may be 0.

Hereinafter, a description will be made of a method for selecting a context index representing one context context for model from among multiple models a "mvd_zero_flag" symbol that is to be currently coded.

i) A context index may selected via be "mvd_zero_flag" information of neighboring blocks of a current block. For example, the context index may be determined through the sum of "mvd_zero_flag" information of a left neighboring block adjacent to the current block and "mvd_zero_flag" information of an above neighboring block adjacent to the current block. That is, the context index may have values of 0 to 2. On the other hand, when neighboring blocks of a current block are in positions wherein the neighboring blocks are unavailable (i.e., when the neighboring blocks are not available), 0 may be added to the context index, or the neighboring blocks may not be used to derive the context index.

ii) A context index may be selected based on whether neighboring blocks of a current block have used template matching. For example, when both a left neighboring block and an above neighboring block adjacent to the current block used template matching, the context index may be determined to be "2". When template matching was used in only one of the left neighboring blocks and the above neighboring block adjacent to the current block, the context index may be determined to be "1". When both the left neighboring block and the above neighboring block adjacent to the current block did not use template matching, the context index may be determined to be "0".

iii) A context index may be selected based on the size (the sum of the horizontal and vertical sizes or the number of pixels) of a current block. When the size of the current block is larger than a predetermined first value, the context index may be 2. When the size of the current block is smaller than a predetermined second value, the context index may be 0. In all other cases, the context index may be 1. The first value may be 32×32, and the second value may be 16×16. Furthermore, the first value and the second value may be values that are set based on the sum of the horizontal and vertical sizes of the current block. Furthermore, the first value and the second value may be values that are set based on the number of pixels in the current block.

iv) A context index may be determined based on at least one of a color component of a current block and a tree structure. For example, when the current block is a chroma component block and is encoded in a dual-tree approach, the context index may be determined based on a "mvd_zero_flag" value of a luma component block. When the "mvd_zero_flag" value of the luma component block is "0", the context index of the chroma component block may be "0". When the "mvd_zero_flag" value of the luma component block is "1", the context index of the chroma component block may be "1". In this case, the context index of the chroma component block may be the same as or different from the context index of the luma component block. Furthermore, the context index value for the chrominance component block may be acquired through the above-described methods i) to iii).

An encoder may perform bypass binary arithmetic coding using a fixed probability interval, rather than performing binary arithmetic coding via a context model for "mvd_zero_flag". The bypass binary arithmetic coding may be selectively applied to a luma component block and a chroma component block. For example, binary arithmetic coding via a context model may be performed in a luma component block, and bypass binary arithmetic coding may be performed in a chroma component block. Conversely, binary arithmetic coding via a context model may be performed in a chroma component block, and bypass binary arithmetic coding may be performed in a luma component block. Also, the encoder may perform binary arithmetic coding of "mvd_zero_flag" by using only one context model. In this case, since each slice type has only one context model, a context model index may be not derived, and a fixed context model may be used for all blocks in the slice.

In the merge mode, when a motion difference value is coded, a method for signaling the index of a table including predefined distances and information about one of horizontal and vertical directions is used. When using the template matching method described in the present specification, the distribution of motion difference values may be more concentrated around 0. Accordingly, one table integrating distance information and direction information may be constructed, and distance information and direction information may be obtained using only one index in the one integrated table. In coding the difference value of motion information, a method for separating distance information and direction information and signaling the distance information and the direction information with respective indexes and a method for signaling distance information and direction information with only one index may be used. For example, when a motion difference value is equal to or less than a predetermined value, distance information and direction information may be signaled with only one index, and when a motion difference value is greater than the predetermined value, distance information and direction information may be signaled with different indices. In this case, the predetermined value may be an integer such as 1, 2, 3 . . . .

FIG. 17 illustrates a method for signaling an MMVD difference value according to an embodiment of the present disclosure.

Referring to FIG. 17, a decoder may parse "mmvd_one_distance_direction_idx" which is a syntax element. "mmvd_one_distance_direction_idx" may be a syntax element indicating an index that indicates an MMVD difference value. When the value of "mmvd_one_distance_direction_idx" is 4, the decoder may additionally parse "mmvd_distance_idx", which is a syntax element indicating an index indicating the distance of the MMVD difference value, and "mmvd_direction_idx", which is a syntax element indicating the direction of the MMVD difference value. In this case, the absolute value of a difference value of motion information may be greater than or equal to "2" in the horizontal or vertical direction.

FIG. 18 illustrates signs for the horizontal and vertical directions of an MMVD difference value according to an index of a syntax element indicating the MMVD difference value according to an embodiment of the present disclosure. Referring to FIG. 18, when "mmvd_one_distance_direction_ idx" has a value of "0", a motion difference value may be (+1, 0). When "mmvd_one_distance_direction_idx" has a value of "1", a motion difference value (−1, 0). When "mmvd_one_distance_direction_idx" has a value of "2", a motion difference may be (0, +1). When "mmvd_one_distance_direction_idx" has a value of "3", a motion difference may be (0, −1). When "mmvd_one_distance_direction_idx" is not parsed, the value of "mmvd_one_distance_direction_ idx" may be inferred to be 4. Whether "mmvd_one_distance_direction_idx" is parsed may be signaled by a syntax element at an SPS level, a PPS level, or a picture header level. When "mmvd_one_distance_idx" is not parsed, the value of "mmvd_one_distance_direction_idx" may be inferred to be a value obtained by summing a value signaled at the SPS level, the PPS level, or the picture header level and a value corresponding to a predefined ESCAPE index. Syntax elements at the SPS level, the PPS level, and the picture header level may be described as sps_mmvd_one_enabled_flag, pps_mmvd_one_flag, and ph_mmvd_one_enabled_flag.

FIG. 19 illustrates probability initialization information according to an embodiment of the present disclosure.

FIG. 19A illustrates a context model for the value of "mmvd_one_distance_direction_idx", and FIG. 19B illustrates a table for deriving initType. The method described with reference to FIG. 16 may be used as a method for selecting one from among multiple context models for a "mmvd_one_distance_direction_idx" symbol to be currently coded.

Figure 20:
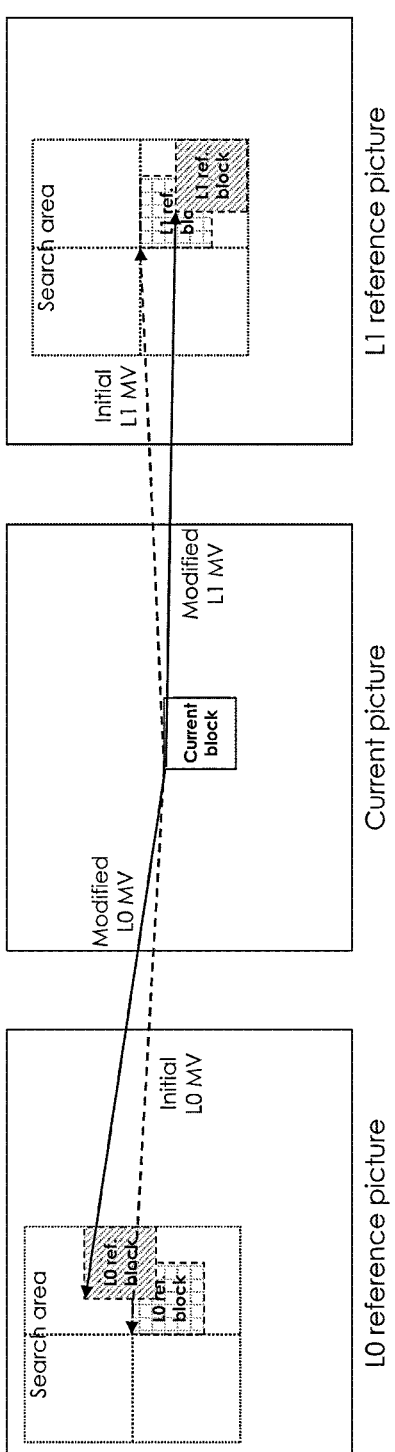
FIGS. 20 and 21 illustrate a method for correcting motion information by using DMVR according to an embodiment of the present disclosure.
Figure 21:
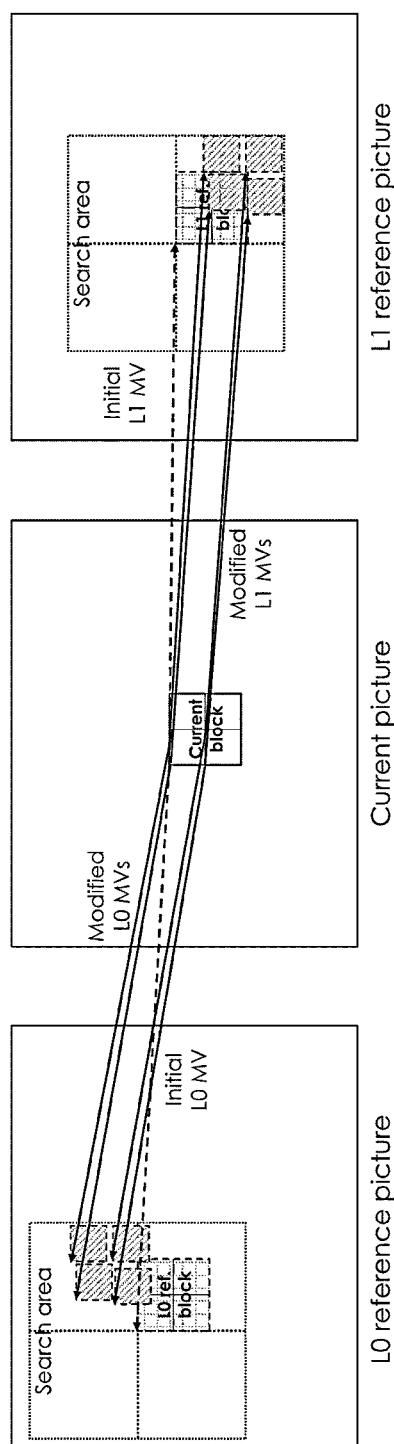

FIGS. 20 and 21 illustrate a method for correcting motion information by using DMVR according to an embodiment of the present disclosure.

The DMVR is a method for acquiring corrected motion information of a current block by using a bilateral matching (BM) method. The bilateral matching (BM) method is a method that corrects initial motion information by finding most similar parts in a neighboring search area of an L0 reference block and a neighboring search area of an L1 reference block in a block with bilateral motion, and uses the corrected motion information for the prediction of a current block. The size of the search area may be configured to be a predetermined (m×n) size based on a specific point in the reference blocks. For example, the specific point may be a top left position in a reference block or a center position in a reference block, and the predetermined size may be 16×16. The most similar parts may be points that correspond to smallest cost values obtained by calculating cost values in the units of pixel between the blocks. The cost value may be calculated using the Sum of Absolute Differences (SAD) or Mean-Removed SAD (MRSAD). Depending on the search area the cost value may vary, and the corrected motion information may also vary. The decoder may divide a current block into multiple sub-blocks and may correct motion information by using DMVR with respect to each sub-block. This is because motion information of small blocks is more accurate compared to large blocks. In this case, DMVR may not be performed on large blocks, but only on partitioned small blocks (e.g., sub-blocks). Referring to FIG. 21, one block may be partitioned into four sub-blocks. The decoder may acquire corrected motion information by using DMVR for each partitioned sub-block. Alternatively, the decoder may use a multi-DMVR method in which corrected motion information found through DMVR in a large block is used to derive more accurate motion information through DMVR in a partitioned smaller block.

Figure 22:
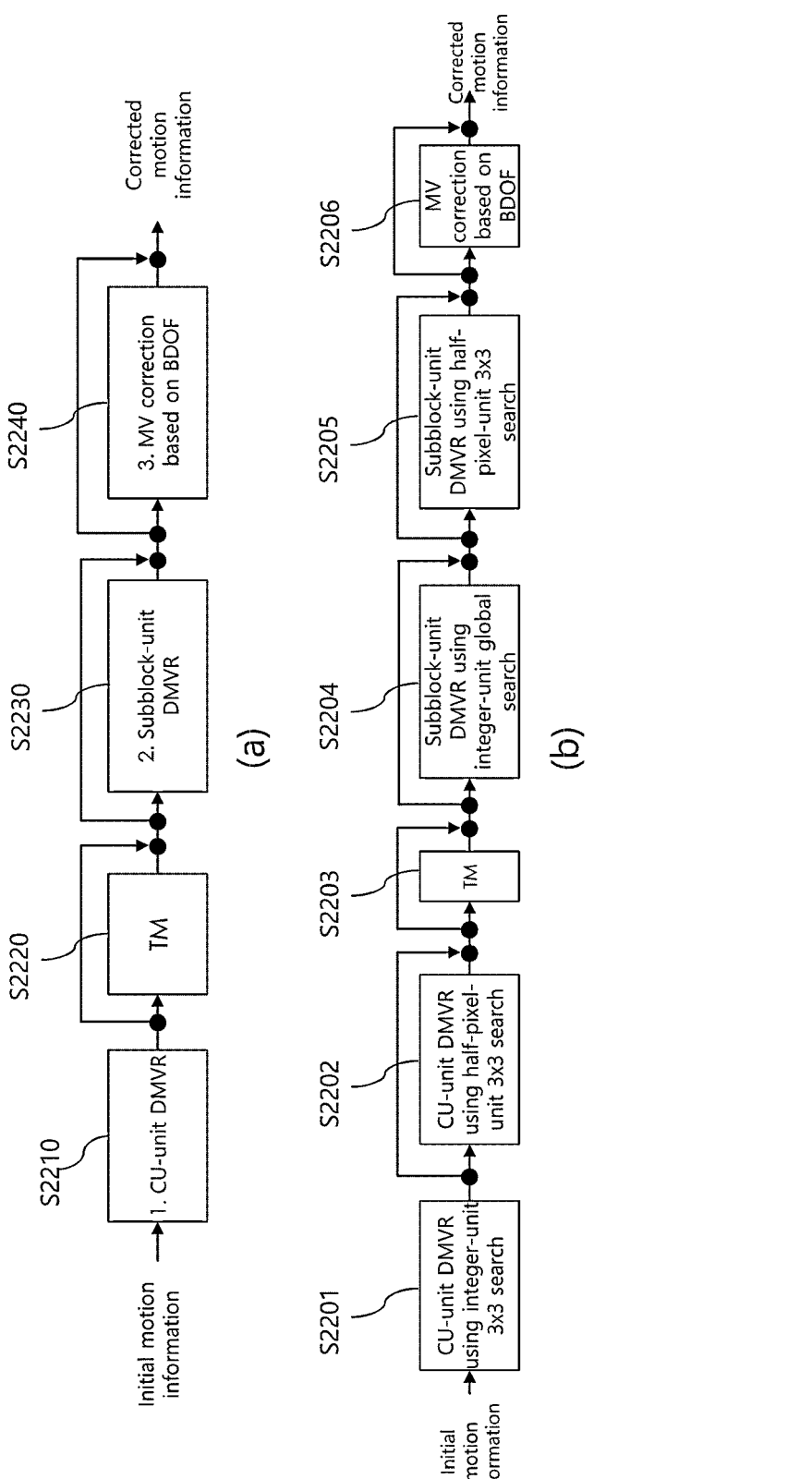
FIG. 22 illustrates a process of performing multi-DMVR according to an embodiment of the present disclosure.

FIG. 22 illustrates a process of performing multi-DMVR according to an embodiment of the present disclosure.

FIG. 22A illustrates a general process of performing multi-DMVR, and FIG. 22B illustrates the general process of multi-DMVR in more detail.

Referring to FIG. 22A, in relation to multi-DMVR, coding unit (block) DMVR is performed based on initial motion information to acquire one or more pieces of corrected motion information (S2210). When TM is applied to a current coding block, a decoder may perform the TM by using the one or more pieces of corrected motion information acquired in step S2210 (S2220). When corrected motion information of the current coding block determined by performing the TM has changed from being bidirectional to being unidirectional, the DMVR process cannot be performed, so steps (S2230 and S2240) after S2220 are not performed, and the motion of the current block is finally determined to be unidirectional. When, as a result of performing the TM, the corrected motion information of the current coding block is bidirectional, the decoder may perform sub-block DMVR to acquire sub-block-level corrected motion information of each sub-block (S2230). The decoder may recorrect, based on BDOF, the acquired sub-block-level corrected motion information in step S2240, and finally acquire the motion information corrected based on the BDOF.

Referring to FIG. 22B, step S2210 in FIG. 22A may be subdivided into step S2201 of performing a coding unit (block) DMVR by using integer-level search and step S2202 of performing a coding unit (block) DMVR by using a half-pixel-unit search. In this case, the motion resolution may be configured in integer units in step S2201 and in half-pixel units in step S2202. In step S2201, the decoder may acquire corrected motion information by using initial motion information and an integer-level correction value. In step S2202, the decoder may acquire corrected motion information by using the initial motion information and a half-pixel-unit correction value. The decoder may use the corrected motion information acquired in step S2201 as reference motion information for step S2202. That is, the decoder may generate a new motion candidate based on the corrected motion information acquired in step S2201 and evaluate the new motion candidate.

In step S2230, the decoder may divide the current coding block into multiple sub-blocks, and then steps S2204 and S2205 in FIG. 22B may be performed for each sub-block. In this case, the sub-block size may be configured to be a maximum of 16×16. Specifically, the decoder may configure the corrected motion information acquired by performing the TM in step S2220 (or S2203) as initial motion information for steps S2204 and S2205. The decoder may perform integer-level full search by using the initial motion information, and acquire optimal motion information of a current sub-block and a cost value for the optimal motion information (S2204). After step S2204, the decoder may perform half-pixel (½)-unit 3×3 square search (S2205). The motion information acquired through step S2204 may be used as reference motion information for step S2205. Steps S2204 and S2205 may be repeated for all sub-blocks. The sub-block DMVR process is advantageous in that there is no dependency between sub-blocks, and thus all sub-blocks may perform DMVR in parallel. Then, the decoder may correct, based on the BDOF, motion information of a new motion candidate acquired in step S2205 and finally acquire the motion information corrected based on the BDOF (S2206). Step S2206 may be the same as step S2240.

Figure 23:
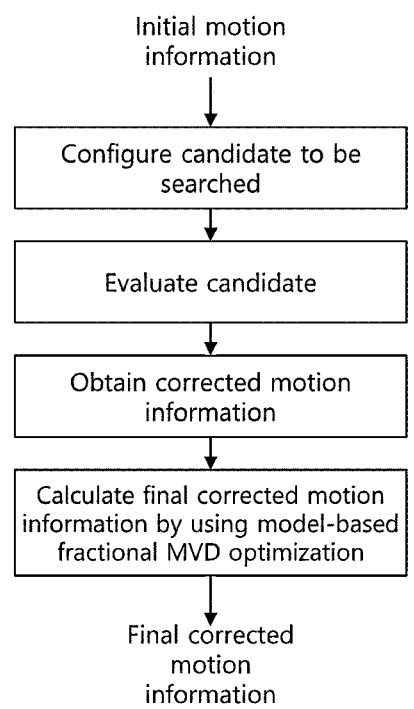
FIG. 23 illustrates a search method for acquiring a cost value related to corrected motion information of a coding block according to an embodiment of the present disclosure.

FIG. 23 illustrates a search method for acquiring a cost value related to corrected motion information of a coding block according to an embodiment of the present disclosure.

Referring to FIG. 23, a decoder may acquire initial motion information and configure, based on the acquired initial motion information, motion candidates to be found. The decoder may acquire motion information corrected based on cost values obtained by evaluating the configured motion candidates. The decoder may acquire final corrected motion information by using model-based fractional MVD optimization based on a motion information resolution of a current block. The corrected motion information acquired in steps S2201 and S2202 in FIG. 22B may be acquired by the method described with reference to FIG. 23.

In an AMVP mode, motion accuracy is higher than in a merge mode because a motion difference value is included in a bitstream. On the other hand, the merge mode has the advantage of signaling a reducing overhead in predetermined identical motion region because only information about the identity with previous motion needs to be included in a bitstream. To represent accurate motion, more information is required, and the information must be included in a bitstream. Thus, the total encoded bit rate inevitably increases. To overcome this increase in the bit rate, the decoder may use already recovered data to derive more accurate motion.

Figure 24:
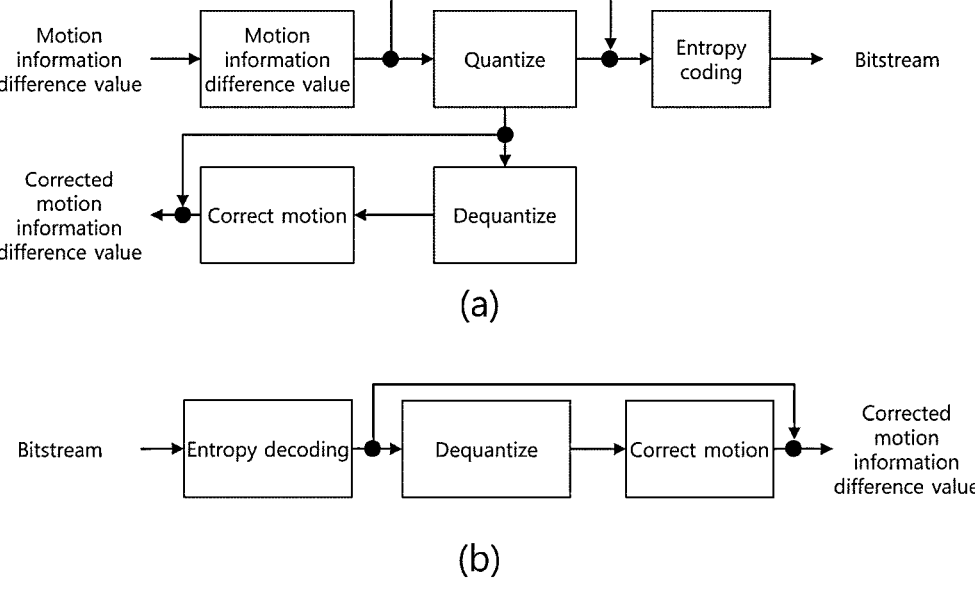
FIG. 24 illustrates a method for acquiring a difference value of corrected motion information according to an embodiment of the present disclosure.

FIG. 24 illustrates a method for acquiring a difference value of corrected motion information according to an embodiment of the present disclosure.

When a current block is encoded with AMVP, a significant bit rate may be included in a bitstream for a difference value of motion information. To reduce the bit rate for the difference value of the motion information, template matching or DMVR may be used to derive a predicted value of more accurate motion information. However, even when the predicted value of accurate motion information is derived, information about a difference value of motion information must be included in the bitstream in the AMVP mode.

Hereinafter, a description will be made of a method for reducing the bit rate for the difference value of motion information in the AMVP mode.

Referring to FIG. 24A, an encoder may quantize and signal a difference value of motion information, thereby reducing the bit rate for the difference value of the motion information. The quantized difference value of the motion information may be a value in which difference value information for a predetermined unit is removed from the existing motion difference value. For example, the quantized difference value of the motion information may be in a decimal or integer unit. In addition, a motion quantization parameter value indicating the type of quantization performed may be included in a bitstream. Referring to FIG. 24B, a decoder may de-quantize a quantized motion difference value to acquire a difference value of motion information. The decoder may sum the difference value of the motion information and a predicted value of the motion information to acquire motion information (e.g., motion vector) for a current block, and may perform template matching or DMVR using the acquired motion information. The decoder may perform template matching or DMVR using the acquired motion information to correct the difference value for any unit which has been removed by the quantization in FIG. 24(*a*).

FIG. 25 illustrates a method for acquiring a predicted value of motion information according to an embodiment of the present disclosure.

When quantization is performed on a difference values of motion information, information about a motion difference value within any unit may be removed depending on the quantization level. Hereinafter, a description will be made of a method for correcting for the removed information about the motion difference value.

Referring to FIG. 25, a decoder may dequantize a quantized motion difference value to acquire a dequantized difference value of motion information. In addition, the decoder may correct a predicted value of the motion information by using the method for correcting motion information described in the present specification (primary motion information correction of the predicted value). The decoder may acquire final motion information by summing the corrected predicted value of the motion information and the dequantized difference value of the motion information. The decoder may correct the final motion information by using the method for correcting motion information described in the specification (secondary motion correction of the final motion information). This allows the decoder to acquire the final corrected motion information. The final corrected motion information may be motion information in which the removed information about the motion difference value has been corrected.

AMVR is a method for adaptively configuring the resolution of motion information on a block-by-block basis, and for the AMVR, motion information for any one among a ¼-pixel unit, a ½-pixel unit, a 1-integer pixel unit, and a 4-integer pixel unit may be signaled for each block. When a current block is encoded in an affine mode, motion information for one among a ¼-pixel unit, a ⅟₁₆-pixel unit, and a 1-integer pixel unit may be signaled for each block. When the current block is encoded in an IBC mode, motion information for either a 1-integer pixel unit or a 4-integer pixel unit may be signaled for each block.

A quantization level for the difference value of the motion information may be inferred from the signaling information of the AMVR. The decoder may configure a block-wise motion resolution level of the AMVR as the quantization level. The decoder may configure the motion information of the current block as a predetermined motion resolution (an AMVR motion resolution for the current block), and may correct the motion information of the current block by using the motion correction method described in the present specification. The predetermined motion resolution may be one among a ¼-pixel unit, a ½-pixel unit, a 1-integer pixel unit, a 2-integer pixel unit, and a 4-integer pixel unit.

when the AMVR is a 1-integer pixel unit, the motion information of the current block may be calculated to a ¼-pixel unit through the motion correction method. In addition, when the AMVR is a ¼-pixel unit, the minimum motion resolution of the current block may be ¼. Therefore, the quantization method for a difference value of the motion information may not be applied to the corresponding block. Alternatively, the quantization level for the difference value of the motion information of the current block may be additionally signaled. The decoder parses both AMVR information and information (a syntax element) signaled in relation to the quantization level to dequantize the motion difference value of the current block, and may use the motion correction method to correct the motion information of the current block such that the motion information matches the motion resolution of the AMVR. In addition, the quantization level of the difference value of the motion information may not be signaled, and the motion resolution of the AMVR may be defined by the quantization level. That is, for each block, the motion resolution of the AMVR may be configured as any one among a ½-pixel unit, a 1-integer pixel unit, a 2-integer pixel unit, and a 4-integer pixel unit. In this case, the quantization level of the difference value of the motion information may be configured to match the motion resolution of the AMVR. In addition, when the motion resolution of the AMVR is a 2-integer pixel unit, the difference value of the motion information may also be quantized to a 2-integer pixel unit and included in a bitstream. The decoder may parse the information (the syntax element) signaled in relation to the motion resolution of the AMVR and the difference value of the motion information of the current block, and may dequantize (apply a multiple of 2) the difference value of the motion information such that the difference value matches the motion resolution. The decoder may acquire final motion information by summing the predicted value of the motion information and the difference value of the motion information. Then, the decoder may use the motion correction method to correct motion removed by quantization with respect to the final motion information.

The signaling of the quantization level may be included in at least one of an SPS level, a PPS level, a picture header level, a slice header level, a CTU level, and a CU unit level. For example, when the quantization level is signaled on a per-block basis, the quantization level may be signaled on a per-CU basis. In addition, when the same quantization level is configured for all CUs in a slice, the quantization level may be signaled at the slice header level and not at the CU level. The quantization level may be signaled when the current block is encoded in an AVMP mode. Also, when the current block is encoded in a merge mode, the quantization level may be signaled to configure a search area for motion correction.

FIGS. 26 and 27 illustrate a method for signaling information about a difference value of motion information according to an embodiment of the present disclosure.

FIG. 26 illustrates a method for signaling a quantization level for a difference value of motion information according to an embodiment of the present disclosure, and FIG. 27 illustrates a method for signaling information about a quantized difference value of motion information and an error value due to quantization.

Referring to FIG. 26, a syntax element (sps_mvd_quant_enabled_flag) regarding whether a quantization method for a difference value of motion is enabled at an SPS level may be signaled. When the sps_mvd_quant_enabled_flag is signaled, a decoder may determine whether to parse a syntax element (mvd_quant_minus1) regarding a quantization level for a difference value of motion information. When mvd_quant_minus1 has a value of "0", the quantization level may be set to "1". The quantization level of "1" may indicate that decimal difference values of motion information are all mapped to "0". In this case, the decimal difference values of the motion information may be corrected using the motion correction methods described in the present specification. The method described above with reference to FIG. 16 may be applied as a method for selecting a context and a context model for mvd_quant_minus1 may be applied using.

The range of a search area during motion correction may vary depending on a quantization level or the motion resolution of a current block.

When the quantization level is a 1-integer unit, the search range for correcting a difference value of motion information in a ¼-pixel unit may be (m, n) that has been predetermined. For example, the search range may be (16, 16). In addition, when the quantization level is a ½-pixel unit, the search range for correcting a difference value of motion information in the ½-pixel unit may be predetermined (m, n). (m, n) may indicate an area of size m×n. For example, the search range may be (8, 8). In addition, when the quantization level is a 4-integer pixel unit and when the motion resolution of a current block is a 1-integer pixel unit, the search range for correcting a difference value of motion information in 1-integer pixel unit within 4-integer pixels may be (m, n) that has been predetermined. For example, the search range may be (16, 16). In addition, the search range may vary depending on the AMVR resolution of the current block. For example, when the AMVR resolution of the current block is a ¼-pixel unit, the search range may be (16, 16), and when the AMVR resolution of the current block is a ½-pixel unit, the search range may be (8, 8).

When a current coding block is partitioned into multiple sub-blocks, the decoder may correct a difference value of motion information by applying the quantization level of the current coding block to each sub-block. Alternatively, the quantization level may be configured differently for each sub-block, and the decoder may correct the motion difference value by configuring a different quantization level for each sub-block. In this case, the correction value of the quantization level for each sub-block may be included in a bitstream and transmitted to the decoder. The decoder may configure the quantization level of a current sub-block by summing the quantization level of the current coding block and the quantization level correction value of the sub-block.

Hereinafter, a method for quantizing a motion difference value will be described.

Difference values adjacent to "0" may be reset to "0". The distribution of difference values becomes larger as the difference values approach "0". That is, when there are many difference values adjacent to "0", the decoder may reset difference values, which are within a certain range among the difference values adjacent to "0", to "0". The certain range may be positive integers which are 1, 2, 3, 4 . . . . For example, when the certain range is 1, the decoder may reset all of decimal difference values of motion information between −1 and 1 to "0". In this case, the difference values of the motion information may be signaled using mvd_zero_flag. In addition, the method of quantizing a difference value of motion information may be applied to at least one component of a horizontal direction or a vertical direction of the difference value of the motion information. For example, only a difference value of the motion information in the horizontal direction may be quantized. In addition, referring to FIG. 27, syntax elements regarding a quantized difference value of motion information and an error value due to quantization may be included in a bitstream. Including information about the quantized motion information in the bitstream may be effective when the complexity is high and thus the motion information correction method cannot used. When a difference value of motion information of a current block is "(13, 14)" and when a quantization level is a "4"-integer pixel unit, the quantized difference value of the motion information may be "(3, 3)", and the error value due to quantization may be "(1, 2)". In this case, the quantized motion difference value "(3, 3)" may be encoded as abs_mvd_minus2[0] or abs_mvd_minus2[1], and the error value due to quantization "(1, 2)" may be encoded as abs_dmvd_minus2[0] or abs_dmvd_minus2[1]. The decoder may acquire "(3, 3)" by parsing abs_mvd_minus2 [0] or abs_mvd_minus2[1] and then restore "(12, 12)" by dequantizing the same to match the quantization level. Next, the decoder may parse abs_dmvd_minus2[0] or abs_dmvd_minus2 [1] to acquire "(1, 2)", and then add "(1, 2)" to the dequantized "(12, 12)" to acquire a corrected value of final motion information. In this case, a sign of the quantized difference value of the motion information and an encoding value for the error value due to quantization may be encoded through mvd_sign_flag[0 or 1] and dmvd_sign_flag[0 or 1]. In this case, when an encoder encodes the error value due to quantization, secondary quantization may be applied by applying another quantization level. For example, a second quantization level "2" may be applied to "(1, 2)", which is an error value due to quantization, to produce a quantized error value "(1, 1)". The decoder may perform dequantization to acquire a dequantized error value "(2, 2)", which may be summed with the difference value of the motion information.

When inter prediction is performed for a current block, motion information of the current block may be derived from neighboring blocks of the current block. The motion information derived from the neighboring blocks may be used as a predicted value of the motion information of the current block. Optimal motion information of the current block may be different from the predicted value of the motion information. The encoder may generate a bitstream including a motion difference value, which is the difference between the optimal motion information and the predicted value of the motion information, and the decoder may receive signaling of the bitstream. The decoder may parse the motion difference value from the bitstream and use the parsed motion difference value to construct the motion information of the current block. In this case, the motion difference value may include absolute values and signs (+, −) of the motion information in the horizontal and vertical directions. Here, information about the signs is difficult to model probabilistically by using correlations between neighboring blocks, etc., so it may be difficult to construct a context model. Therefore, the encoder may entropy-code a sign of the motion difference value by equally setting the probability of occurrence of 0 or 1 to "0.5" without a context model. The method of performing entropy coding by equally setting the probability to "0.5" may be described as a bypass mode.

Figure 28:
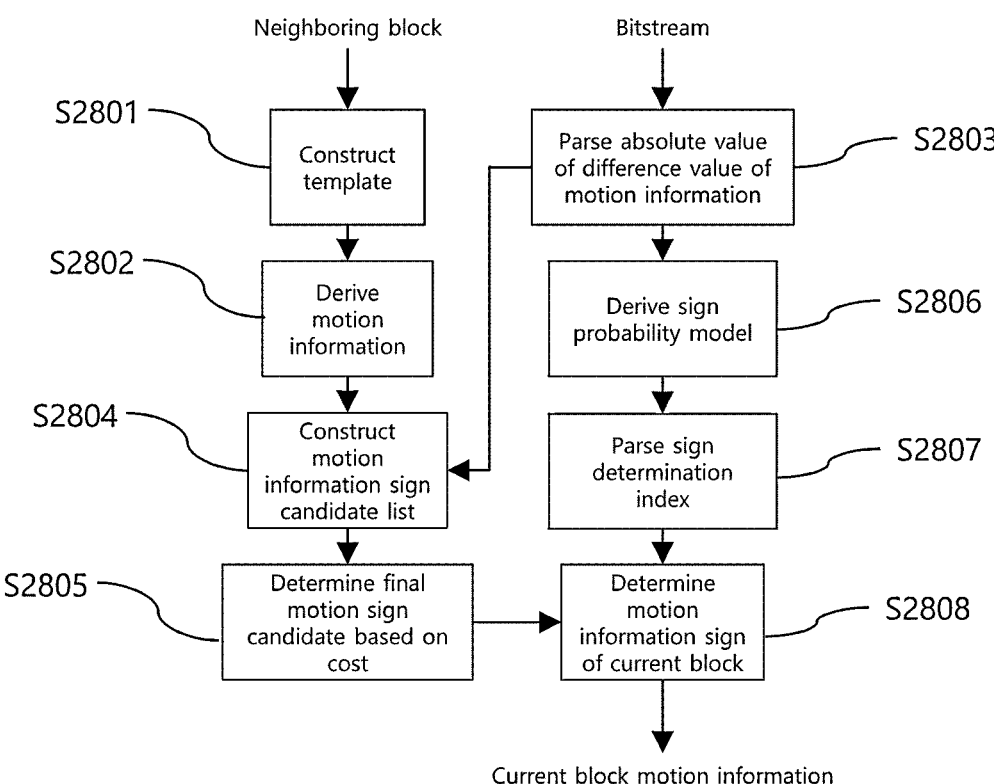
FIG. 28 illustrates a method for decoding information related to a sign of a motion difference value according to an embodiment of the present disclosure.

FIG. 28 illustrates a method for decoding information related to a sign of a motion difference value according to an embodiment of the present disclosure.

To increase the efficiency of entropy coding of a motion difference value, an encoder may perform entropy coding by predicting sign information of the motion difference value and then constructing a context model through the probability of prediction accuracy.

Hereinafter, the specific process of decoding sign information of an entropy-coded motion difference value is described.

A decoder may configure a template for a current block (S2801). The template may include restored pixels of neighboring blocks that are adjacent to the current block. The decoder may derive motion information of the current block from the neighboring blocks (S2802). Specifically, the decoder may derive a predicted value of the motion information of the current block from the neighboring blocks. The decoder may parse and acquire an absolute value of a difference value of the motion information of the current block from a bitstream (S2803). The decoder may use the absolute value of the difference value of the motion information of the current block and the predicted value of the motion information to construct a list of motion information sign candidates for the current block in all possible combinations (S2804). In this case, when the absolute value of the difference value of the motion information is "0", there is no sign, and thus the case in which the absolute value is "0" may be excluded from the motion information sign candidate list. The decoder may calculate cost values between the template for the current block and a reference template derived from all pieces of motion information corresponding to the motion information sign candidate list. All pieces of motion information corresponding to the motion information sign candidate list may be motion information of a reference block in a reference picture. The decoder may determine, based on the calculated cost values, a sign candidate of final motion information of the current block (S2805). In this case, the sign candidate of the final motion information may be the sign candidate of motion information corresponding to the smallest cost value among the calculated cost values. In order to parse a sign determination index indicating whether the sign candidate of the final motion information of the current block matches a sign of an actual motion difference value, the decoder may derive a context model for the sign determination index by using the magnitude of the absolute value of the motion information of the current block (S2806). For example, when the absolute value of the motion information of the current block is equal to or less than a predetermined threshold value, a first context model may be used. In this case, the predetermined threshold value may be an integer greater than or equal to 1. In addition, when the absolute value of the motion information of the current block is greater than a predetermined threshold value, a second context model may be used. In this case, the predetermined threshold value may be a value that is determined based on the characteristics of the motion information of the current block. The predetermined threshold value may be set differently depending on whether the motion information of the current block is an affine-based mode, an SMVD mode, or an MMVD mode. When the motion information of the current block is the affine-based modes, the predetermined threshold value may be configured to be smaller or larger than when the motion information of the current block is the SMVD or MMVD mode. The affine-based mode may be an affine mode and an affine MMVD mode. For example, when the motion information of the current block is the SMVD or MMVD mode, the predetermined threshold value may be set to "16", and when the motion information of the current block is the affine-based mode, the predetermined threshold value may be set to "4". The sign candidate for the final motion information of the current block may not match the sign of an actual motion information difference value. Therefore, the decoder may determine the sign of the final motion information after parsing the sign determination index, which is information about whether the sign candidate of the final motion information of the current block matches the sign of the actual motion information difference value, by using the derived context model (S2807). The decoder may use the sign determination index and the candidate sign of the final motion information of the current block to determine a sign of a difference value of motion information that is most appropriate for the current block (S2808). Then, the decoder may obtain the motion information of the current block based on the sign of the difference value of the most appropriate motion information.

Figure 29:
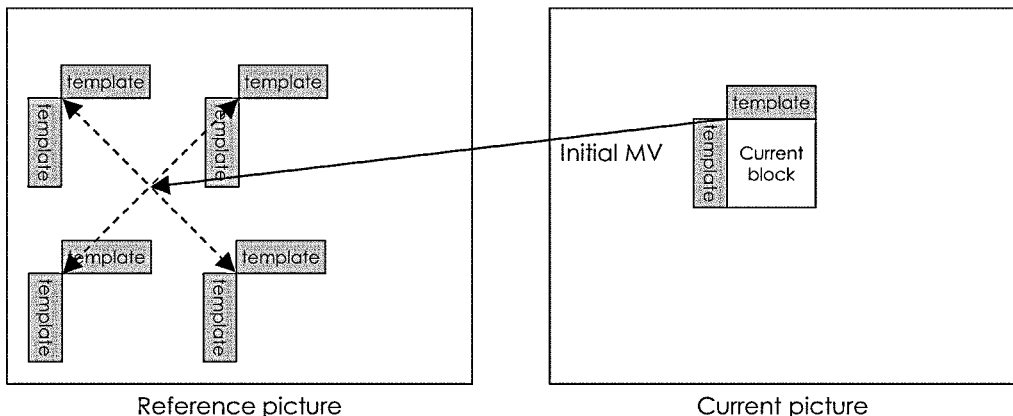
FIGS. 29, 30, and 31 illustrate a method for predicting a sign of motion information according to an embodiment of the present disclosure.
Figure 30:
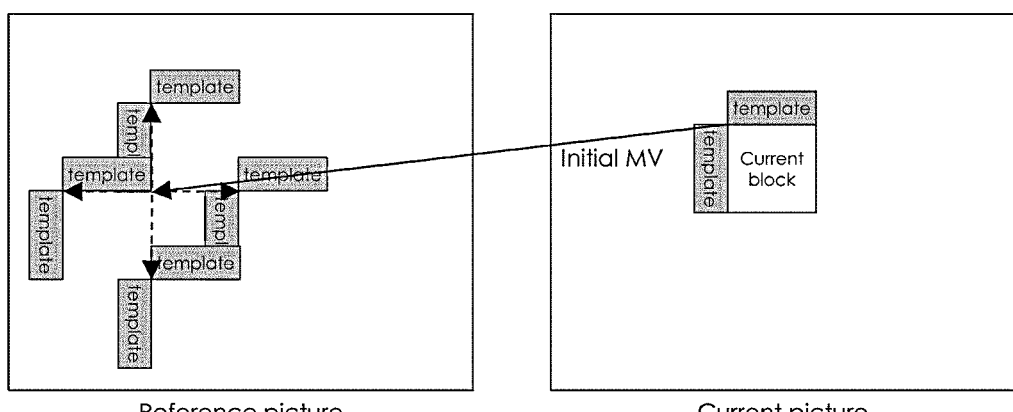
Figure 31:
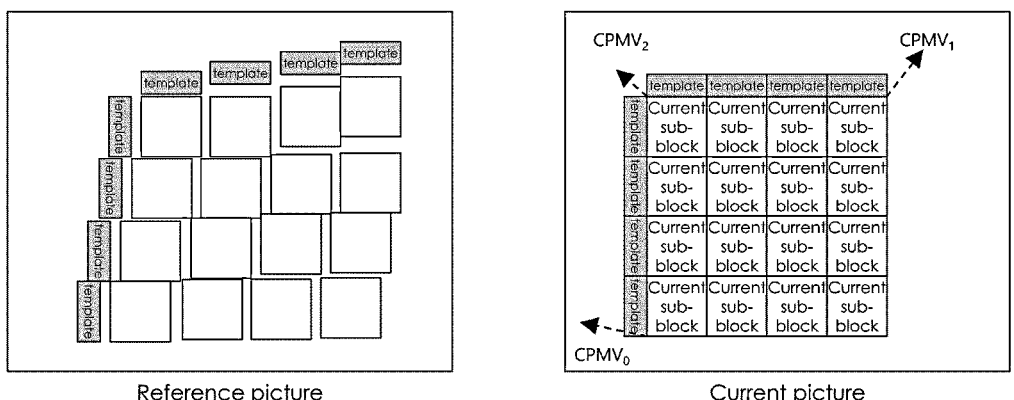

FIGS. 29, 30, and 31 illustrate a method for predicting a sign of motion information according to an embodiment of the present disclosure.

A method for predicting a sign of motion information may vary depend on a current block encoding mode. FIG. 29 illustrates a method for predicting a sign of a difference value of motion information when the current block encoding mode is an AMVP mode. FIG. 30 illustrates a method for predicting a sign of a difference value of motion information when the current block encoding mode is an MMVD mode. FIG. 31 illustrates a method for predicting a sign of a difference value of motion information when the current block encoding mode is an affine mode.

Referring to FIG. 29, the absolute value of a difference value of motion information in the horizontal direction may be equal to the absolute value of a difference value of motion information in the vertical direction. In this case, the difference values of motion information in the horizontal and vertical directions may not be "0". The difference values may be acquired when a current block is encoded in an AMVP mode, and may also be acquired when the current block is encoded in an SMVD mode. Referring to FIG. 30, when a current block is encoded in an MMVD mode, a difference value of motion information may correspond to only either the horizontal direction or the vertical direction.

When the current block is encoded in the MMVD mode, the difference value of the motion information may not present in the diagonal direction. Alternatively, when the difference value of the motion information in the diagonal direction is represented in the MMVD mode, index information and magnitude information regarding a predetermined angle may be used. In this case, a decoder may predict index information regarding an angle instead of predicting a sign of the difference value of the motion information. Referring to FIG. 31, when a current block is encoded in an affine mode, there may be a maximum of three pieces of motion information. Therefore, the maximum number of signs of a difference value of motion information may be six. To reduce the complexity of decoder operations, the number of allowable sign combinations in the affine mode may be configured to be limited. When the limited number of allowable sign combinations is greater than a predetermined value, the decoder may not use the motion sign prediction method. In this case, the predetermined value is an integer greater than or equal to 1, and may be 16. In addition, when a current block is encoded in the affine mode, the decoder divides the current block into multiple sub-blocks and performs prediction, so a template may be configured to be partitioned based on the position and size of each sub-block. Likewise, a template of a reference picture may be constructed based on motion information in the affine mode and the position and size of each sub-block.

There may be various embodiments of a method for predicting a sign of a difference value of motion information. Hereinafter, a method for constructing the templates described in FIGS. 28 to 31 will be described.

The decoder may use only some, but not all, of a left template constructed as a left block adjacent to the left side of a current block and a top template adjacent to the top side of the current block. A sign candidate of final motion information acquired based on a smallest cost value may only be a candidate appropriate for the template, and not a candidate appropriate for the current block. Therefore, to derive a template most appropriate for the current block, the decoder may use only one of the left template and the top template. Information about which of the left template and the top template is used may be included in a bitstream. That is, the decoder may parse the bitstream to identify which of the left template and the top template is used. In addition, the decoder may acquire a template and a motion information sign candidate, which have the smallest cost value, from a motion information sign candidate list constructed using only the left template, a motion information sign candidate list constructed using only the top template, and a motion information sign candidate list constructed using both the left and top templates, and use the template and the motion information sign candidate as a sign candidate of the final motion information.

The decoder may construct a template differently depending on the position of a neighboring block used to derive a predicted value of motion information of the current block. When the decoder derived a predicted value of motion information of the current block from a top neighboring block of the current block, the decoder may calculate a cost value by using only the top template. When the decoder derived a predicted value of motion information of the current block from a TMVP, the decoder may use both the left template and the top template to calculate a cost value. In other words, whether to use a method for constructing a template used or a method for prediction of a sign of motion information may depend on whether motion information derived from neighboring blocks is spatial neighboring block-derived motion information (SMVP) or temporal neighboring block-derived motion information (e.g., TMVP). When a TMVP is used to derive a predicted value of the motion information of the current block, the neighboring blocks that are spatially adjacent to the current block may have different characteristics from the motion information of the current block, resulting in a lower accuracy regarding a template. Therefore, when the TMVP is used to derive the predicted value of the motion information of the current block, the decoder may not use the method for predicting a sign of motion information. In addition, the decoder may perform the method for predicting a sign of motion information by using predefined motion information sign candidates without constructing a template. In the predefined motion information sign candidates, all signs may be configured to be "+" or "−".

The decoder may determine whether to use the method for predicting a sign of motion information, based on the position of a neighboring block used to derive the predicted value of the motion information of the current block. As the correlation between the current block and the neighboring block increases, the accuracy of the method for predicting a sign of motion information may increase. Thus, when the predicted value of the motion information of the current block is derived from an adjacent neighboring block, the method for predicting a sign of motion information may be used. Conversely, when the predicted value of the motion information of the current block is not derived from the adjacent neighboring block, the method of predicting a sign of motion information may not be used, and the decoder may parse the sign in a bypass mode. Further, the decoder may use predefined motion information sign candidates to perform the method of predicting a sign of motion information, wherein in the predefined motion information sign candidates, all signs may be configured to be "+" or "−". In the method of predicting a sign of motion information based on the position of a neighboring block used to derive the predicted value of the motion information of the current block, the sign of motion information may be predicted based on a predicted value of the motion information. In addition, when the value of an index indicating a prediction value in a motion information candidate list for deriving motion information of a current block is less than a predetermined value (i.e., when spatially adjacent neighboring blocks are in a predominantly assigned order), the decoder may use a method of predicting a sign of the motion information of the current block. When the value of the index indicating the prediction value in the motion information candidate list for deriving the motion information of the current block is greater than or equal to the predetermined value, the method of predicting the sign of the motion information is not used, and the decoder may parse the sign in a bypass mode. In this case, the predetermined value may be an integer greater than or equal to 0. In addition, the decoder may perform the method of predicting the sign of the motion information by using predefined motion information sign candidates, wherein in the predefined motion information sign candidates, all signs may be configured to be "+" or "−".

The decoder may determine whether to use the left template and the top template, based on information about neighboring blocks of a current block. The decoder may calculate a cost value by using a template in which motion information of the current block is most similar to motion information of the neighboring blocks. In other words, when motion information of the left template and the top template is similar to a predetermined candidate in a sign candidate list of the motion information of the current block, the decoder may use a template that is similar to the predetermined candidate. This may be applied differently depending on modes in which motion information of the current block is encoded. When the current block is encoded in an AMVP mode, the decoder may use a template, which is not similar to a predetermined candidate in the sign candidate list of the motion information of the current block, among motion information of the left template and the top template. This is because the AMVP mode is mainly selected when the motion information of neighboring blocks is significantly different from the motion information of the current block. In addition, when the current block is encoded in a merge mode, the decoder may use a template, which is most similar to a predetermined candidate in the sign candidate list of the motion information of the current block, among the motion information of the left template and the top template. This is because the merge mode is mainly selected when the motion information of neighboring blocks is similar to the motion information of the current block.

The decoder may configure a template based on the ratio of the horizontal and vertical sizes of the current block. For example, when the horizontal size of the current block is larger than the vertical size thereof, the decoder may calculate a cost value using only the top template.

The decoder may construct a template based on the position of the current block. When the current block is positioned on a picture, subpicture, slice, tile, or CTB boundary, the decoder may construct a template differently based on each thereof. For example, when the top boundary of the current block is a CTB boundary, the decoder may calculate a cost value by using only the left template without using the top template. When the left boundary of the current block is a CTB boundary, the decoder may calculate a cost value using only the top template without using the left template. When the current block is a first block of a CTB (i.e., when both the left and top boundaries are CTB boundaries), the decoder may parse a sign in a bypass mode without using the method for predicting the sign of motion information. Alternatively, the decoder may perform the method for predicting a motion sign by using predefined motion information sign candidates. Here, in the predefined motion information sign candidates, all signs may be configured to be "+" or "−".

When a neighboring block adjacent to the current block is a block encoded in an in-screen prediction mode, the decoder may not perform the method for predicting the sign of motion information. Alternatively, the decoder may perform the method of predicting the sign of the motion information by using predefined motion information sign candidates. Here, in the predefined motion information sign candidates, all signs may be configured to be "+" or "−". This is to increase the processing speed of the decoder.

When motion information in the motion information sign candidate list deviates beyond the picture, subpicture, slice, or tile boundary, the decoder may not construct a template for the deviating motion information. In this case, a cost value for the deviating motion information is set to a maximum, so the decoder may not select the cost value.

The decoder may determine whether to use a template, based on the horizontal and vertical sizes of a current block. For example, when the horizontal or vertical size of the current block is less than (or equal to or greater than) a predetermined value, the decoder may not use a method for predicting the sign of motion information. In this case, the predetermined value may be an integer greater than or equal to 1. Alternatively, the decoder may perform a method for predicting a motion sign by using predefined motion information sign candidates. Here, in the predefined motion information sign candidates, all signs may be configured to be "+" or "−".

A template may include restored blocks, and thus it is possible to use a template only when neighboring blocks of the current block are all restored. However, when using a template, there is a problem that the parallelism between blocks is weakened and the processing speed of the decoder is slow. Hereinafter, to solve this problem, a description will be made of a method for predicting a sign of motion information of the current block by using information about neighboring of the current block.

The decoder may predict the sign of the motion information of the current block by using, as reference motion information, motion information of a neighboring block that was not used to derive a predicted value of the motion information of the current block (at least one of SMVP, which is motion information of a spatial neighboring block, TMVP, which is motion information of a temporal neighboring block, or reconstructed motion information). For example, when a left neighboring block of the current block was used to derive the predicted value of the motion information of the current block, the decoder may use motion information of a top neighboring block of the current block as reference motion information. In this case, the decoder may select, from a motion information sign candidate list of the current block, a motion information sign candidate, which has a difference within a predetermined value from the reference motion information, as a final motion information sign candidate for the current block. The predetermined value may be an integer greater than or equal to 1. In addition, when the left neighboring block of the current block was used to derive the predicted value of the motion information of the current block, the decoder may predict the sign of the motion information of the current block by using motion information (TMVP) of a temporal neighboring block of the current block as reference motion information.

Figure 32:
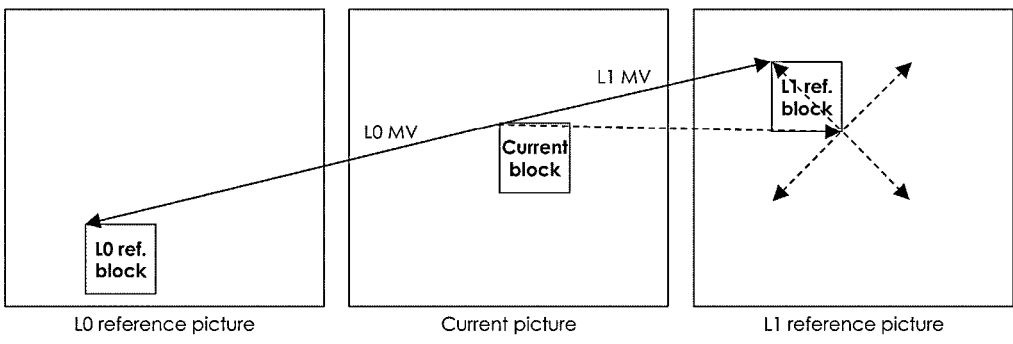
FIG. 32 illustrates a method for determining a motion information sign candidate of a current block based on a linear relationship according to an embodiment of the present disclosure.

FIG. 32 illustrates a method for determining a motion information sign candidate of a current block based on a linear relationship according to an embodiment of the present disclosure.

Motion information of a current block may be a motion using bidirectional prediction, or an MHP mode. When the motion information of the current block is the motion using bidirectional prediction, a decoder may predict a motion sign based on a template with respect to an L0 direction, and then predict signs for an L1 direction and additional motion information by using motion information determined in the L0 direction. That is, the decoder may predict a motion sign in the L1 direction based on the linearity of motion of L0 and L1. To determine the linearity, the decoder may identify whether the time sequence of an L0 reference picture and the time sequence of an L1 reference picture are in a linear relationship. For example, the decoder may determine the linearity by comparing the time sequences of the L0 and L1 reference pictures. In other words, the decoder may determine that there is linearity when the time sequences of the L0 and L1 reference pictures are different from each other. When the motion information of the current block is the MHP mode, the decoder may use at least one piece of motion information in the L0 or L1 direction to predict a sign of the additional motion information. The method of predicting a sign through a linear relationship may be a prediction method using the property that the motion of an object is linearly made. Referring to FIG. 32, the decoder may determine that a final L1 motion information sign candidate for the current block is an L1 motion information sign candidate, which is most linearly similar to an already determined L0 motion information sign candidate, among four L1 motion information sign candidates referring to the L1 reference picture. The method may also be used to predict a sign of additional motion information in the MHP mode.

The decoder may construct a list of all combinable information sign candidates for current blocks by using the absolute value of a difference value of the motion information of the current block, and a predicted value of the motion information. Hereinafter, a description will be made of a method for constructing the list of all combinable motion information sign candidates for the current blocks.

The motion information sign candidate list may be constructed based on a predefined sign pattern. In this case, the predefined sign pattern may be one of a pattern that preferentially changes the horizontal direction and a pattern that preferentially changes the vertical direction. Which pattern is used may depend on the characteristics of a video. Which pattern is used may be signaled at at least one of an SPS level, a PPS level, a picture header level, and a slice header level. A motion information sign candidate list based on the pattern preferentially changing the horizontal direction may be constructed in the order of (+, +), (−, +), (+, −), and (−, −). A motion information sign candidate list based on the pattern preferentially changing the vertical direction may be constructed in the order of (+, +), (+, −), (+, −), (−, +), and (−, −).

A sign of motion information, in which the absolute value of a difference value of the motion information is "0", may not be predicted. For example, when the absolute value of a difference value in the vertical direction is "0", a sign of the difference value in the vertical direction is not predicted, and a motion information sign candidate list may be constructed by changing a sign pattern for the horizontal direction. In this case, the sign candidate list may include (+, 0) and (−, 0).

When the motion information of the current block is a bidirectional motion, motion information sign candidate lists in the L0 and L1 directions may each be constructed. When the decoder considers the average of the bidirectional motion when calculating a cost value, more accurate sign prediction is possible. In addition, the motion information sign candidate lists in the L0 and L1 directions may be integrated into a single list. For example, the single list may include candidates having the form of (sign in L0 horizontal direction, sign in L0 vertical direction, sign in L1 horizontal direction, sign in L1 vertical direction). Specifically, the single list may be constructed in the order of (+, +, +, +), (+, +, +, −), (+, +, −, +), (+, +, −, −), (+, −, +, +), (+, −, +, −), (+, −, −, +), (+, −, −, −), (−, +, +, +), (−, +, +, −), (−, +, −, +), (−, +, −, −), (−, −, ++), (−, −, +, −), (−, −, −, +), and (−, −, −, −).

When the current block is encoded in an affine mode, the decoder has to predict signs of a maximum of three pieces of motion information. A sign for motion information, among the three pieces of motion information, in which the absolute value of a difference value of motion information in the horizontal or vertical direction is "0" may be placed at the beginning of the motion information sign candidate list. This is for the purpose of determining the sign of the motion information, among the three pieces of motion information, in which the absolute value of the difference value of the motion information in the horizontal or vertical direction is "0". Signs for the remaining two pieces of motion information in the motion information sign candidate list may be resorted based on the motion information, among the pieces of motion information, in which the absolute value of the difference value of the motion information in the horizontal or vertical direction is "0".

Figures 33, 34:
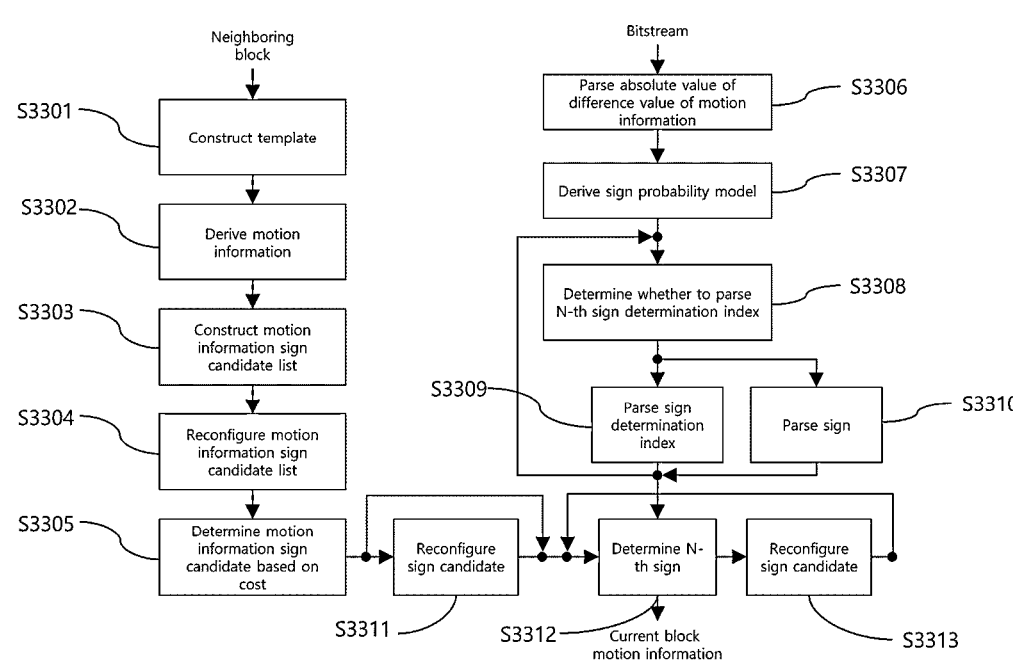
FIGS. 33 and 34 illustrate a method for reconfiguring a motion information sign candidate list according to an embodiment of the present disclosure.

FIGS. 33 and 34 illustrate a method for reconfiguring a motion information sign candidate list according to an embodiment of the present disclosure.

Hereinafter, a method for acquiring motion information of a current block will be described with reference to FIG. 33.

Referring to FIG. 33, motion information of a current block may be acquired by resorting a motion information sign candidate list. Some of the processes illustrated in FIG. 33 may be identical to the processes described with reference to FIG. 28, and descriptions of the identical processes will be omitted.

Steps S3301, S3302, S3303, and S3305 in FIG. 33 may be the same as steps S2801, S2802, S2804, and S2805 in FIG. 28. In addition, steps S3306, S3307, and S3309 in FIG. 33 may be the same as steps S2803, S2806, and S2807 in FIG. 28.

A decoder may exclude a specific candidate from the motion information sign candidate list constructed in step S3303, and resort the motion information sign candidate list (S3304). For example, when a motion information candidate corresponding to a random motion information sign candidate in the motion information sign candidate list constructed in step S3303 deviates beyond a picture, sub-picture, slice, or tile boundary, the decoder may exclude the sign candidate corresponding to the deviating motion information candidate from the list. In addition, when the motion information is bidirectional motion prediction or an MHP mode, there may be multiple pieces of motion information of the current block. In this case, an already determined motion information sign shall be excluded from a next motion information sign candidate list to be determined. That is, the decoder may identify whether an already determined sign of motion information in an L0 direction is present in an L1 direction motion information sign candidate list (or an additional motion information sign candidate list in MHP), and when the already determined motion information sign is present, the already determined motion information sign may be excluded from the motion information sign candidate list.

The decoder may derive a reference template by performing inter prediction of motion information candidates corresponding to candidates in the motion information sign candidate list reconfigured in step S3304. The decoder may then calculate cost values between the reference template and neighboring templates of the current block. The decoder may resort, based on the calculated cost values, motion information sign candidates in the motion information sign candidate list. The decoder may determine one of the resorted motion information sign candidates to be an initial motion information sign candidate (S3305). In this case, a sign of a motion information candidate corresponding to the smallest cost value among the calculated cost values may be at the beginning of the list. That is, the sign of the motion information candidate corresponding to the smallest cost value may be an initial motion information sign candidate for the current block.

When an initial motion information sign candidate is determined using only a cost value, there may be a problem of low accuracy due to the different characteristics between the current block and a template. Therefore, when resorting motion sign candidates, not only the cost value, but also the positions of the motion sign candidates (initial motion sign candidates) before being reordered may be additionally considered for the resorting. For example, a weight for a cost value may be set such that as an index of an initial motion candidate in a list decreases, the influence on the cost value is reduced. That is, a final cost value of each motion candidate may be determined as a value obtained by multiplying a per-pixel cost value by a weight based on the index. In this case, the weight may be configured to be lower for lower indexes of the initial motion candidate and higher for higher indexes. It may be optional to calculate the cost value based on the weight.

Hereinafter, a description will be made of a method for reducing the complexity of inter prediction. A method described below may be used to calculate a cost value based on inter prediction. The method described below may be selectively performed.

To reduce complexity, inter prediction may be performed by clipping the precision of existing motion information to a predetermined range. The predetermined range may be integer units, half-pixel units, quarter units, etc. In addition, to reduce complexity, a low-complexity interpolation filter, instead of a high-complexity interpolation filter, may be used for decimal motion prediction. For example, a filter with a smaller number of taps may be used. Specifically, a 4-tap or 2-tap filter may be used instead of an existing 6-tap filter. In this case, the 2-tap filter may be a bi-linear filter. In addition, to reduce complexity, the decoder may not calculate cost values for all candidates in a motion information sign candidate list, and when a cost value of a specific candidate is within a predetermined value, may set cost values of the remaining candidates to a maximum value without calculating the cost values of the remaining candidates. In this case, the predetermined value may be a value that varies depending on the horizontal and vertical sizes of the current block. For example, when the horizontal and vertical sizes of the current block are 8×8, the predetermined value may be 64.

Predicting a motion information sign by using a cost value of a template may have low accuracy because the characteristics of the template are different from the characteristics of the current block. Therefore, the initial motion information sign candidate may be reset to be another motion information sign candidate based on the motion information of neighboring blocks. Hereinafter, a description will be made of a method for resetting the initial motion information sign candidate to another motion information sign candidate.

The decoder may reset a motion information sign candidate by using, as a reference motion information, motion information of a neighboring block that was not used to derive a predicted value of motion information of a current block (at least one of SMVP, which is motion information of a spatial neighboring block, TMVP, which is motion information of a temporal neighboring block, or reconstructed motion information). In other words, the decoder may reset an initial motion information sign candidate to a candidate, which is most similar to the reference motion information, in a motion information sign candidate list for the current block. For example, when a left neighboring block of the current block was used to derive a predicted value of motion information of the current block, the decoder may use motion information of a top neighboring block of the current block as a reference motion information. In this case, the decoder may select, from the motion information sign candidate list of the current block, a motion information sign candidate, which has a difference within a predetermined value from the reference motion information, as a final motion information sign candidate for the current block. In this case, the predetermined value may be an integer greater than or equal to 1.

The motion information of the current block may be a bidirectional motion or an MHP mode. When the motion information of the current block is the bidirectional motion, the decoder may predict a motion sign based on a template with respect to an L0 direction, and then reset signs for an L1 direction and additional motion information by using motion information determined in the L0 direction. That is, the decoder may predict a motion sign for the L1 direction based on the linearity of the motion of L0 and L1, and reset, based on the prediction result, the signs for the L1 direction and the additional motion information. To determine the linearity, the decoder may identify whether the time sequence of an L0 reference picture and the time sequence of an L1 reference picture are in a linear relationship. For example, the decoder may determine the linearity by comparing the time sequences of the L0 and L1 reference pictures. In other words, the decoder may determine that there is linearity when the time sequences of the L0 and L1 reference pictures are different from each other. When the motion information of the current block is the MHP mode, the decoder may use at least one piece of motion information in the L0 or L1 direction to reset the sign of the additional motion information. The method of predicting a sign through a linear relationship may be a prediction method using the property that the motion of an object is linearly made. Referring to FIG. 32, the decoder may determine that a final L1 motion information sign candidate for the current is block an L1 motion information sign candidate, which is most linearly similar to an already determined L0 motion information sign candidate, among four L1 motion information sign candidates referring to the L1 reference picture. The method may also be used to predict a sign of additional motion information in the MHP mode.

The final motion information sign candidate for the current block may not match a sign for a difference value of an actual motion information. Accordingly, a sign determination index, which indicates whether the final motion information sign candidate for the current block matches the sign for the difference value of the actual motion information, may be signaled. The decoder may parse the sign determination index to determine a sign (S3309). The sign determination index, which is information about the matching, may be parsed and used to determine the sign of the final motion information. Hereinafter, a description will be made of a context model used to parse the sign determination index.

The magnitude of the absolute value of a difference value of motion information may be differently set depending on the motion information resolution of a current block. For example, when the current block is encoded in an affine mode, the AMVR resolution may be a 1/16-pixel unit. In this case, a context model may be determined based on the result of comparison between the magnitude of the absolute value of the difference value of the motion information and a predetermined value. The predetermined value may be an integer greater than or equal to 1, such as 16 or 32. When the current block is encoded in the affine mode and when the AMVR resolution is a 1/16-pixel unit, a first context model may be selected if the absolute value of the difference value of the motion information is equal to or less than 32. Referring to FIG. 35, the first context model may be a model that uses first initValue, 20, as an initialization value.

Conversely, when the current block is encoded in the affine mode and when the AMVR resolution is a 1/16-pixel unit, a second context model may be selected if the absolute value of the difference value of the motion information is greater than 32. Referring to FIG. 35, the second context model may be a model that uses second initValue, 43, as an initialization value.

Whether to use a context model may be determined based on the result of comparison between the magnitude of the absolute value of the difference between the motion information and a predetermined value. In this case, the predetermined value may be an integer greater than or equal to 1. For example, when the magnitude of the absolute value of the difference value of the motion information is less than or equal to 16, the context model may be used, and when the magnitude of the absolute value of the difference value of the motion information is greater than 16, a bypass mode may be performed.

The context model may be selected based on at least one among the size of the current block, a ratio of the horizontal and vertical sizes of the current block, and an encoding mode of the current block. This is because a cost value may vary as the size of the current block increases or depending on the encoding mode of the current block.

Whether to use a context model may be determined based on the size (horizontal or vertical size, or the number of pixels) of the current block. Whether a context model is used or a bypass mode is used may be determined based on the result of comparison between the horizontal and vertical sizes of the current block and a predetermined value may determine. In this case, the predetermined value may be an integer greater than or equal to 1. For example, when the horizontal or vertical size of the current block is less than or equal to 4, entropy coding may be performed in the bypass mode, and when either the horizontal or vertical size of the current block is greater than 4, the context model may be used.

When there is only one candidate in the motion information sign candidate list for the current block, the decoder determine a candidate in the motion information sign candidate list as a final sign without parsing the sign determination index.

The sign determining index may be divided into a sign determination index for the horizontal direction and a sign determination index for the vertical direction. The decoder may determine which of the sign determination index for the horizontal direction and the sign determination index for the vertical direction to parse first. For example, the decoder may first parse the sign determination index for the horizontal direction and then parse the sign determination index for the vertical direction. However, for a video with many vertical motions, the decoder may first parse the sign determination index for the vertical direction. The decoder may determine which directional index to parse first, based on information (e.g., a syntax element) signaled at at least one among an SPS level, a PPS level, a picture header level, and a slice header level.

Hereinafter, a method for parsing a motion sign determination index for the current block may be variously applied as follows.

The decoder may divide signs of motion information into horizontal and vertical directions, and may group the signs of motion information into one group to parse a flag (sign_pred_flag) indicating whether the signs of the motion information match predicted values of the signs of the motion information. When the value of sign_pred_flag is 0, a motion sign candidate for the current block obtained in a previous step (S2805 or S3305) may be determined as a final motion sign for the current block. In this case, the motion information sign candidate may be a candidate that includes both horizontal and vertical directions. When the value of sign_pred_flag is 1, at least one of signs in the horizontal and vertical directions in the motion sign candidate for the current block obtained in the previous step (S2805 or S3305) may different, and thus the decoder may additionally parse information about each of actual signs in the horizontal and vertical directions. For example, when the current block is encoded in an affine mode, there may be a maximum of three pieces of motion information. In this case, the signs in the horizontal and vertical directions for each of the three pieces of motion information may be grouped into one group, and thus a total of three groups may be constructed. Alternatively, the signs in the horizontal direction for the three pieces of motion information may be grouped into one group, and the signs in the vertical direction may be grouped into another group. That is, the sign information may be constructed in two groups and signaled.

When the current block is encoded in the affine mode, the decoder may parse sign_pred_flag. When the value of sign_pred_flag is 0, a motion sign candidate for the current block obtained in the previous step (S2805 or S3305) may be determined to be a final motion sign for the current block. This is not the case when the value of sign_pred_flag is 1. When the value of the corresponding flag information is "1", at least one of motion sign candidates for the current block obtained in the previous step may be different. Thus, the decoder may additionally parse information about each of the signs of the maximum of three pieces of motion information candidates.

When the current block is encoded in the affine mode, there may be a maximum of three pieces of motion information, and thus the decoder must predict signs for a maximum of six pieces of motion information. In this case, only a sign of one of the six pieces of motion information codes may be different. When only the sign of one piece of motion information is different, position information (sign_diff_idx) indicating which sign is different may be signaled. For example, the decoder may parse sign_pred_flag, and when the result of the parsing is that a sign of motion information does not match a predicted value of the sign of the motion information, the decoder may parse sign_diff_1_flag and sign_diff_idx sequentially. That is, the decoder may parse sign_pred_flag to identify whether the sign of the motion information matches the predicted value of the sign of the motion information, and if not, the decoder may parse sign_diff_1_flag to identify whether only a sign of one piece of motion information is different. When only the sign of one piece of motion information is different, the decoder may parse sign_diff_idx to identify which sign is a different sign. When the decoder may parse sign_diff_1_flag to identify whether signs of one or more pieces of motion information are different, the decoder may parse information about signs of a maximal of six pieces of motion information.

Whether to parse a sign determination index of each component (horizontal and vertical direction components) may be applied differently depending on the magnitude of the absolute value of a motion difference value of each component. Before parsing the sign determination index based on the magnitude of the absolute value of a motion difference value of each component, the decoder may determine which motion information candidate's sign determination index to parse within the motion information candidate list. For example, when the absolute value magnitude of the difference value of the motion information of each component is less than a predetermined magnitude, the decoder may parse the sign determination index (S3309). That is, the decoder may determine whether to parse an N-th sign determination index in the motion information sign candidate list prior to step S3308 (S3308). The decoder may parse the N-th sign determination index determined in step S3308 (S3309). Conversely, when the absolute value magnitude of the difference values of the motion information of each component is equal to or greater than the predetermined magnitude, the decoder may parse an actual sign of each component (S3310). This process may be selectively performed. In this case, N may be a value from 0 to the maximum number of signs (i.e., twice (+, –) the number of candidates in the motion information sign candidate list). The decoder may determine a N-th positioned motion information sign through steps S3309 and S3310 (S3312). The decoder may then reset a motion information sign candidate based on the N-th positioned motion information sign determined in step S3312 (S3313).

Hereinafter, a description will be made of a method for resetting the motion information sign candidate in step S3313.

Referring to FIG. 34, a first sign of a first component, determined through the sign determination index of the first component, may be "–". In this case, a (1-1)th sign of the first component of index (i) 0 at the earliest position in the motion information sign candidate list may be +. When the first sign is different from the (1-1) the sign, the decoder may delete all sign candidates in the motion information sign candidate list that are different from the first sign. That is, the decoder may delete motion information sign candidates at indices (i) 0, 3, 6, and 7 in FIG. 34 from the motion information sign candidate list. Thus, the remaining motion information signs in the motion information sign candidate list may be candidates having the same sign as the first sign. The decoder may reset one candidate among the remaining pieces of motion information candidates in the motion information sign candidate list to be a motion candidate of the current block. That is, the decoder may reset a motion information sign candidate at index (i) 1 in FIG. 34 to be a motion candidate of the current block. In this case, the pieces of motion information in the motion information sign candidate list may be sorted in ascending order based on cost values. The decoder may determine a sign of the next component based on the reset motion information sign candidate. The decoder may repeat the above-described process up to a sign of an N-th component. The N-th component may refer to a direction correction to an N-th value when the values of the vertical and horizontal directions of the pieces of motion information in one group are sequentially listed. For example, referring to FIG. 34, a first component may be the horizontal direction (Hor) of CPMV0, a second component may be the vertical direction (Ver) of CPMV0, a third component may be the horizontal direction of CPMV1, and a sixth component may be the vertical direction of CPMV2. Whether the decoder resets the motion information sign candidate may be determined based on at least one of the horizontal or vertical magnitude of the current block and the absolute value magnitude of a difference value of motion information of the current block.

Inter prediction is a method capable of generating various prediction blocks through various types of motion information and then improving encoding efficiency by using weighted averaging. In the inter prediction, there may be not only bidirectional prediction but also an MHP mode in which additional motion information is transmitted. To improve the encoding efficiency by using the weighted averaging, even when a sign determined through a sign determination index is different from a sign of a candidate at the beginning of the motion information sign candidate list, the different candidates may not be excluded. In this case, candidates that are different from the reset motion sign candidate may be used as additional motion information. Whether to use candidates different from signs determined through the sign determination index as additional motion information may be determined based on at least one among the size of the current block, the magnitude of the absolute value of a motion difference value of the current block, and cost values of candidates in the motion information sign candidate list. Hereinafter, a description will be made of a method for determining whether candidates that differ from the sign determined by the sign determination index are used as additional motion information of the current block.

Both motion information acquired through the sign candidate acquired in step S3311 and motion information acquired through the sign candidate acquired in step S3313 may be used as motion information of the current block. That is, the decoder may generate a prediction block based on the two types of motion information to generate a prediction block for the current block through weighted prediction.

The decoder may select additional motion information based on at least one among the size of the current block, the magnitude of the absolute value of the motion difference value of the current block, and the cost values of candidates in the motion information sign candidate list. That is, there may be cases where the cost values of the candidates in the motion information sign candidate list are the same or the difference in cost values is within a certain range. When all of the candidates in the motion information sign candidate list are used, the encoding efficiency may be increased. That is, when the cost values of the candidates in the motion information sign candidate list are the same or when the difference in cost values is within a certain range, the decoder may use the candidates in the motion information sign candidate list as additional motion information of the current block.

FIGS. 35, 36, and 37 illustrate a context model of syntax elements related to encoding motion information according to an embodiment of the present disclosure.

Signs of motion information may be not divided into horizontal and vertical directions, but may be grouped into one group and entropy-coded. In this case, an encoder may entropy-code sign_pred_flag, sign_diff_1_flag, and sign_diff_idx by using context adaptive binary arithmetic coding (CABAC). Context models for sign_pred_flag, sign_diff_1_flag, and sign_diff_idx may be defined as values obtained from the experiment.

initValue in FIGS. 35A, 36A, and 37A represents context models for sign_pred_flag, sign_diff_1_flag, and sign_diff_idx. shiftIdx in FIGS. 35A, 36A, and 37A is used during probability updates for sign_pred_flag, sign_diff_1_flag, and sign_diff_idx. initValue may be determined by the type of a current slice. Specifically, initValue may be determined based on whether the current slice is an I slice, a P slice, or a B slice. FIGS. 35B, 36B, and 37B show context models that can be used depending on the type of a current slice. Referring to FIGS. 35B, 36B, and 37B, when the type of the current slice is an I slice, the values of sign_pred_flag, sign_diff_1_flag, and sign_diff_idx may be 0 to 2. When the type of the current slice is a P slice, the values of sign_pred_flag, sign_diff_1_flag, and sign_diff_idx may be from 3 to 5. When the type of the current slice is a B slice, the values of sign_pred_flag, sign_diff_1_flag, and sign_diff_idx may be 6 to 8. initValue may be determined to be values corresponding to FIGS. 35A, 36A, and 37A based on the values of sign_pred_flag, sign_diff_1_flag, and sign_diff_idx determined based on each type of the current slice.

For each slice type, "initValue" may be determined as one value. For example, when the type of the current slice is an I slice, the values of sign_pred_flag, sign_diff_1_flag, and sign_diff_idx may be 0. When the type of the current slice is a P slice, the values of sign_pred_flag, sign_diff_1_flag, and sign_diff_idx may be 3. When the current slice is a B slice, the values of sign_pred_flag, sign_diff_1_flag, and sign_diff_idx may be 6. initValue may be determined as values corresponding to FIGS. 35A, 36A, and 37A based on the values of sign_pred_flag, sign_diff_1_flag, and sign_diff_idx, which are each determined as one value for each type of the current slice.

In addition, the order of use of initValue based on the slice type may be determined based on a syntax element, sh_cabac_init_flag, signaled in a slice header. For example, when the value of sh_cabac_init_flag is 1 and when the current slice type is a P slice, the values of sign_pred_flag, sign_diff_1_flag, and sign_diff_idx may be 6. The value of initValue may be determined based on the values of sign_pred_flag, sign_diff_1_flag, and sign_diff_idx. When the value of sh_cabac_init_flag is 1 and when the type of the current slice is B slice, the values of sign_pred_flag, sign_diff_1_flag, and sign_diff_idx may be 3. The value of initValue may be determined based on the values of sign_pred_flag, sign_diff_1_flag, and sign_diff_idx. When the value of sh_cabac_init_flag is 0 and when the type of the current slice is a P slice, the values of sign_pred_flag, sign_diff_1_flag, and sign_diff_idx may be 3. The value of initValue may be determined based on the values of sign_pred_flag, sign_diff_1_flag, and sign_diff_idx. When the value of sh_cabac_init_flag is 0 and when the type of the current slice is a B slice, the values of sign_pred_flag, sign_diff_1_flag, and sign_diff_idx may be 6. The value of initValue may be determined based on the values of sign_pred_flag, sign_diff_1_flag, and sign_diff_idx.

Hereinafter, a description will be made of a specific method for determining a context index.

sign_pred_flag, sign_diff_1_flag, and sign_diff_idx may be coded or parsed using a context model determined using at least one among the horizontal or vertical size (or ratio or difference) of the current block, the magnitude of the absolute value of a difference value of motion information of the current block, the difference in motion information between the current block and neighboring blocks, and a quantization parameter. In this case, sign_diff_idx may include two or more bins, and a selected context model may be used for the first bin, and from the second bin onwards, bypass binary arithmetic coding or a preconfigured context model may be used.

Context indices of sign_pred_flag, sign_diff_1_flag, and sign_diff_idx may be selected based on the size of the current block. For example, when the size of the current block is greater than a first value, the context index may be 2. When the size of the current block is less than a second value, the context index may be 0. Otherwise, the context index may be 1. The first value may be 32×32, and the second value may be 16×16. In addition, the context index may be determined based on the sum of the horizontal and vertical sizes of the current block. When the size of the current block is less than (or equal to or greater than) a predetermined value, the context model may not be derived and entropy coding may be performed in bypass mode. The comparison related to the size of the current block, described in the present specification, may be a comparison of the horizontal size of the current block, a comparison of the vertical size of the current block, or a comparison of the sum of the horizontal size and the vertical size of the current block.

sign_pred_flag, the sign_diff_1_flag, and the sign_diff_idx may be coded or parsed according to a context index determined based on the magnitude of the absolute value of a difference value of motion information of the current block. When the magnitude of the absolute value of the difference value of the motion information of the current block is within a predetermined value, the context index may be 0. When the magnitude of the absolute value of the difference value of the motion information of the current block is equal to or greater than the predetermined value, the context index may be 1. In this case, the predetermined value is an integer greater than or equal to 1, which may be 4 or 16. When the current block is encoded in an affine mode, the AMVR resolution may be a $\frac{1}{16}$-pixel unit. In this case, the predetermined value may be configured to be different from the predetermined value previously used for setting (e.g., the predetermined value may become larger or smaller). When the current block is encoded in an affine mode, the predetermined value is an integer greater than or equal to 1, which may be 16 or 32. When the magnitude of the absolute value of the difference value of the current block's motion is less than (or greater than) a specific value, the context model may not be derived and entropy coding may be performed in a bypass mode.

sign_pred_flag, sign_diff_1_flag, and sign_diff_idx may be coded or parsed based on a context index determined based on the difference between motion information of a current block and motion information of neighboring blocks of the current block. When the difference between the motion information of the current block and the motion information of the neighboring blocks of the current block is less than a predetermined value, the context index may be 0. When the difference between the motion information of the current block and the motion information of the neighboring blocks of the current block is equal to or greater than the predetermined value, the context index may be 1. In this case, the arbitrary value is an integer greater than or equal to 1, which may be 4 or 16. In the case of the current affine mode, the AMVR resolution may be a $\frac{1}{16}$-pixel unit, and when the current block is encoded in the affine mode, the AMVR resolution may be a $\frac{1}{16}$-pixel unit. In this case, a predetermined value may be configured to be different from the predetermined value previously used for setting (e.g., the predetermined value may become larger or smaller). When the current block is encoded in the affine mode, the predetermined value may be an integer greater than or equal to 1, which may be 16 or 32. When the magnitude of the absolute value of the difference value of the current block's motion is less than (or greater than) a specific value, the context model may not be derived and entropy coding may be performed in a bypass mode. In this case, the neighboring blocks of the current block may be at least one of blocks located to the left of, above, above the left of, above the right of, and below the right of the current block.

sign_pred_flag, sign_diff_1_flag, and sign_diff_idx may be coded or parsed based on a context index that is selected based on information of sign_pred_flag, sign_diff_1_flag, and sign_diff_idx of neighboring blocks of the current block. For example, the context index may be determined based on the sum of a value of sign_pred_flag of a left neighboring block adjacent to the current block and a value of sign_pred_flag of a right neighboring block adjacent to the current block. That is, the context index may have values of 0 to 2.

When a neighboring block of the current block is positioned to be unavailable, the value of information of the neighboring block may be 0.

sign_pred_flag, sign_diff_1_flag, and sign_diff_idx may be coded or parsed based on a context index determined based on the difference between a horizontal size and a vertical size of the current block. For example, when the horizontal size and vertical size of the current block are the same, the context index may be 0. When the horizontal size of the current block is greater than the vertical size, the context index may be 1. When the horizontal size of the current block is less than the vertical size, the context index may be 2.

With respect to sign_pred_flag, sign_diff_1_flag, and sign_diff_idx, the encoder may not perform binary arithmetic coding through context models, but may perform bypass binary arithmetic coding using a fixed probability interval.

The encoder may perform binary arithmetic coding for sign_pred_flag, sign_diff_1_flag, and sign_diff_idx through only one context model. In this case, since each slice type has only one context model, a context model index may not be derived, and a fixed context model may be applied to all blocks in a slice.

A decoder may predict a sign of motion information in AMVP, MMVD, affine mode, or MHP mode by using the method for predicting the sign of motion information described in the present specification.

In addition, the decoder may predict a motion resolution for AMVR by using the method for predicting a sign of motion information. The motion resolution may be configured differently depending on an encoding mode. When the neighboring block adjacent to the current block. The final reconstruction block may be generated by summing the current block and a difference block of a prediction block which is generated using all pieces of motion information generated through a motion resolution candidate. In another method, the encoder may construct a list of all motion candidates using the AMVR motion resolution, calculate cost values for all the motion candidates in the list, and then resort all the motion candidates in ascending order based on the cost values. The encoder may generate a bitstream including information about an index representing an optimal candidate among all the resorted motion candidates. The decoder may determine an AMVR motion resolution and a motion candidate for the current block, based on the index acquired by parsing the information about the index included in the bitstream.

The method for predicting a motion sign, described in the present specification, may be used to predict a partition index in a GPM mode. The GPM mode refers to a method for partitioning a current block into two blocks based on reference lines in various directions (angles) and performing a prediction for each block. A syntax element (merge_gpm_partition_idx) that indicates which direction (angle) of a reference line is used and how far the reference line is from the center of the current block may be included in a bitstream and signaled. merge_gpm_partition_idx may have values of 0 to 63. In the GPM mode, the position and direction of the reference line may be derived based on a predetermined angle table. Table 1 shows an angle table in the GPM mode according to an embodiment of the present disclosure.

TABLE 1

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |

| merge_gpm_partition_idx | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |

| merge_gpm_partition_idx | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |

| merge_gpm_partition_idx | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 | current block is encoded in an affine mode, the AMVR motion resolution may be one of ¹⁄₁₆-, ¼-, and 1-pixel units. The decoder may generate a prediction block for a reference template by using motion information of a ¹⁄₁₆-, ¼-, or 1-pixel unit, acquire cost values between a template of the current block and the reference template, and select a pixel unit of AMVR motion resolution corresponding to the smallest cost value among the cost values. When the current block is encoded in a mode other than an affine mode or an IBC mode, the decoder may select a pixel unit of the AMVR motion resolution based on the cost value described above. In this case, the cost value may be the cost value between the template of the current block and the reference template. In addition, the cost value may be calculated by the difference between a pixel of the boundary portion of a final reconstruction block and a pixel of the boundary portion of a Hereinafter, a description will be made of a method for reducing a bit rate according to encoding of merge_gpm_partition_idx.

FIG. 38 illustrates partitioning of a current block in a GPM mode according to an embodiment of the present disclosure. FIG. 39 illustrates a context model in a GPM mode according to an embodiment of the present disclosure.

In a GPM mode, a decoder may calculate cost values between a template of a current block and a reference template which is constructed using 63 partition methods. The decoder may use motion information corresponding to a smallest cost among the cost values to determine a partition prediction value. Alternatively, the decoder may calculate a cost value based on the difference between a pixel boundary portion of a final reconstruction block and a pixel value of a boundary portion of a neighboring block adjacent to the current block. In this case, the final reconstruction block may be a block generated by summing a prediction block generated using the 63 partition methods and a difference block of the current block. When the partition prediction value matches actual GPM partition information, an encoder may generate flag information, which is included in a bitstream and indicates the presence or absence of the matching, to increase the encoding efficiency. The decoder may parse the flag information included in the bitstream to set a partition mode. The encoder may construct a candidate list for the 63 partition methods (or some thereof), and then calculate cost values for all partition candidates in the list. The encoder may resort all motion candidates in ascending order based on the cost values and generate a bitstream that includes information about an index indicating an optimal candidate among all of the resorted motion candidates. The decoder may determine a partition method for the current block based on the index acquired by parsing the information about the index included in the bitstream.

FIG. 38A shows an angle, angleIdx, defined in Table 1. FIG. 38B shows the distance distanceIdx between the center of a current block and a reference line, defined in Table 1. FIG. 38C shows a syntax structure related to partition information prediction in a GPM mode. Referring to FIG. 38C, the decoder may parse a syntax element (merge_gpm_pred_flag) that indicates whether a partition prediction value matches actual GPM partition information. When the value of merge_gpm_pred_flag is 1, the decoder may use the partition prediction value to configure the GPM partition information. When the value of merge_gpm_pred_flag is 0, this implies that the partition prediction value is different from the actual GPM partition information, so the decoder may parse a syntax element (merge_gpm_partition_idx) that indicates additional GPM partition information. merge_gpm_partition_idx may indicate indexes for angleIdx and distanceIdx in Table 1. Alternatively, merge_gpm_partition_idx may indicate a value of the difference between the partition prediction vale and the actual partition information. merge_gpm_pred_flag may be coded or parsed using the context model in FIG. 39. In this case, the contextual model may be derived using the methods described with reference to FIGS. 35 to 37.

FIG. 40 is a flowchart illustrating a method for generating a prediction block for a current block according to an embodiment of the present disclosure.

FIG. 40 illustrates a method for generating a prediction block for a current block based on the methods described with reference to FIGS. 1 to 39.

Referring to FIG. 40, a decoder may acquire first motion information of a current block (S4010). The decoder may acquire second motion information of the current block (S4020). The decoder may construct a first template set including neighboring blocks of the current block (S4030). The decoder may acquire a first cost value by comparing the first template set with a second template set including neighboring blocks of a first reference block corresponding to the e first motion information (S4040). The decoder may acquire a second cost value by comparing the first template set with a third template set including neighboring blocks of a second reference block corresponding to the second motion information (S4050). Motion information corresponding to the smaller of the first cost value and the second cost value may be configured to be final motion information (S4060). The decoder may generate a prediction block for the current block based on the final motion information (S4070).

The decoder may acquire a difference value of the final motion information by parsing a syntax element included in a bitstream. In this case, the prediction block for the current block may be generated by additionally considering the difference value. In this case, the syntax element may include information about a difference value in a horizontal direction and a difference value in a vertical direction of the final motion information. Both the difference value in the horizontal direction and the difference value in the vertical direction of the final motion information may be 0.

An encoding mode of the current block may be an AMVP mode.

The first reference block and the second reference block may be blocks in pictures that are included in different picture lists.

The current block may be partitioned into a first block and a second block based on a first reference line, the first template set may be partitioned into a third template and a fourth template based on the first reference line, the current block may be partitioned into a third block and a fourth block based on a second reference line, and the first template set may be partitioned into a fifth template and a sixth template based on the second reference line. The decoder may acquire a third cost value by comparing the third template with a template, which corresponds to the third template, in the second template set partitioned based on the first reference line. The decoder may acquire a fourth cost value by comparing the fourth template with a template, which corresponds to the fourth template, in the third template set partitioned based on the first reference line. The decoder may acquire a first intermediate cost value based on the third cost value and the fourth cost value. The decoder may acquire a fifth cost value by comparing the fifth template with a template, which corresponds to the fifth template, in the second template set partitioned based on the second reference line. The decoder may acquire a sixth cost value by comparing the sixth template with a template, which corresponds to the sixth template, in the third template set partitioned based on the second reference line. The decoder may acquire a second intermediate cost value based on the fifth cost value and the sixth cost value. The prediction block for the current block may be acquired based on templates partitioned by a reference line corresponding to a smaller cost value among the first intermediate cost value and the second intermediate cost value.

When the smaller cost value is the first intermediate cost value, the prediction block for the current block may be acquired based on the first reference line, and when the smaller cost value is the second intermediate cost value, the prediction block for the current block may be acquired based on the second reference line.

The first intermediate cost value may be a value obtained by summing the third cost value and the fourth cost value, and the second intermediate cost value may be a value obtained by summing the fifth cost value and the sixth cost value.

The decoder may parse a syntax element indicating whether the reference line corresponding to the smaller cost value matches a preconfigured reference line. When the reference line corresponding to the smaller cost value matches the preconfigured reference line, the prediction block for the current block may be acquired based on the templates partitioned by the reference line corresponding to the smaller cost value among the first intermediate cost value and the second intermediate cost value.

The first cost value may be a value related to a similarity between the first template set and the second template set, and the second cost value is a value related to a similarity between the first template set and the third template set.

In the present specification, the third cost value is a value related to a similarity between the third template and a template, which corresponds to the third template, in the second template set partitioned based on the first reference line. The fourth cost value is a value related to a similarity between the fourth template and a template, which corresponds to the fourth template, in the third template set partitioned based on the first reference line. The fifth cost value is a value related to a similarity between the fifth template and a template, which corresponds to the fifth template, in the second template set partitioned based on the second reference line. The sixth cost value is a value related to a similarity between the sixth template and a template, which corresponds to the sixth template, in the third template set partitioned based on the second reference line.

The above methods described in the present specification may be performed by a processor in a decoder or an encoder. Furthermore, the encoder may generate a bitstream that is decoded by a video signal processing method. Furthermore, the bitstream generated by the encoder may be stored in a computer-readable non-transitory storage medium (recording medium).

The present specification has been described primarily from the perspective of a decoder, but may function equally in an encoder. The term "parsing" in the present specification has been described in terms of the process of obtaining information from a bitstream, but in terms of the encoder, may be interpreted as configuring the information in a bitstream. Thus, the term "parsing" is not limited to operations of the decoder, but may also be interpreted as the act of configuring a bitstream in the encoder. Furthermore, the bitstream may be configured to be stored in a computer-readable recording medium.

The above-described embodiments of the present invention may be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code may be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

The invention claimed is:

1. A video signal decoding apparatus comprising a processor, wherein the processor is configured to:

obtain first motion information of a current block, wherein the first motion information corresponds to a first reference block, obtain second motion information of the current block, wherein the second motion information corresponds to a second reference block, obtain a first template set comprising neighboring samples of the current block, obtain a second template set comprising neighboring samples of the first reference block, obtain a third template set comprising neighboring samples of the second reference block, obtain partition information for a GPM (Geometric Partitioning Mode) by comparing the first template set with the second template set and the third template set, and reconstruct the current block using the GPM based on the partition information.

2. The video signal decoding apparatus of claim 1, wherein the first template set is partitioned into a first template and a second template based on a first reference line, wherein the first template set is partitioned into a third template and a fourth template based on a second reference line, wherein the second template set is partitioned into a first plurality of templates based on the first reference line, wherein the second template set is partitioned into a second plurality of templates based on the second reference line, wherein the third template set is partitioned into a third plurality of templates based on the first reference line, wherein the third template set is partitioned into a fourth plurality of templates based on the second reference line, wherein the processor is configured to:

obtain a first cost value by comparing the first template with a first corresponding template, wherein the first corresponding template is a template corresponding to the first template among the first plurality of templates, obtain a second cost value by comparing the second template with a second corresponding template, wherein the second corresponding template is a template corresponding to the second template among the third plurality of templates, obtain a first intermediate cost value based on the first cost value and the second cost value, obtain a third cost value by comparing the third template with a third corresponding template, wherein the third corresponding template is a template corresponding to the third template among the second plurality of templates, obtain a fourth cost value by comparing the fourth template with a fourth corresponding template, wherein the fourth corresponding template is a template corresponding to the fourth template among the fourth plurality of templates, obtain a second intermediate cost value based on the third cost value and the fourth cost value, and obtain the partition information based on at least one of the first intermediate cost value or the second intermediate cost value.

3. The video signal decoding apparatus of claim 2, when the partition information for the current block is obtained based on the first intermediate cost value:

the current block is partitioned into a first plurality of sub-blocks, a prediction block for the current block is obtained based on the first plurality of sub-blocks, when the partition information for the current block is obtained based on the second intermediate cost value:

the current block is partitioned into a second plurality of sub-blocks, a prediction block for the current block is obtained based on the second plurality of sub-blocks.

4. The video signal decoding apparatus of claim 2, wherein the first intermediate cost value is a value obtained by summing the first cost value and the second cost value, wherein the second intermediate cost value is a value obtained by summing the third cost value and the fourth cost value.

5. The video signal decoding apparatus of claim 2, wherein the processor is configured to:

parse a syntax element related to the partition information.

6. A video signal encoding apparatus comprising a processor, wherein the processor is configured to obtain a bitstream to be decoded by a decoding method, the decoding method comprising:

obtaining first motion information of a current block, wherein the first motion information corresponds to a first reference block;

obtaining second motion information of the current block, wherein the second motion information corresponds to a second reference block;

obtaining a first template set comprising neighboring samples of the current block;

obtaining a second template set comprising neighboring samples of the first reference block;

obtaining a third template set comprising neighboring samples of the second reference block;

obtaining partition information for a GPM (Geometric Partitioning Mode) by comparing the first template set with the second template set and the third template set; and reconstructing the current block using the GPM based on the partition information.

7. The video signal encoding apparatus of claim 6, wherein the first template set is partitioned into a first template and a second template based on a first reference line, wherein the first template set is partitioned into a third template and a fourth template based on a second reference line, wherein the second template set is partitioned into a first plurality of templates based on the first reference line, wherein the second template set is partitioned into a second plurality of templates based on the second reference line, wherein the third template set is partitioned into a third plurality of templates based on the first reference line, wherein the third template set is partitioned into a fourth plurality of templates based on the second reference line, the decoding method comprising:

obtaining a first cost value by comparing the first template with a first corresponding template, wherein the first corresponding template is a template corresponding to the first template among the first plurality of templates;

obtaining a second cost value by comparing the second template with a second corresponding template, wherein the second corresponding template is a template corresponding to the second template among the third plurality of templates;

obtaining a first intermediate cost value based on the first cost value and the second cost value;

obtaining a third cost value by comparing the third template with a third corresponding template, wherein the third corresponding template is a template corresponding to the third template among the second plurality of templates;

obtaining a fourth cost value by comparing the fourth template with a fourth corresponding template, wherein the fourth corresponding template is a template corresponding to the fourth template among the fourth plurality of templates;

obtaining a second intermediate cost value based on the third cost value and the fourth cost value; and obtaining the partition information based on at least one of the first intermediate cost value or the second intermediate cost value.

8. The video signal encoding apparatus of claim 7, when the partition information for the current block is obtained based on the first intermediate cost value:

the current block is partitioned into a first plurality of sub-blocks, a prediction block for the current block is obtained based on the first plurality of sub-blocks, when the partition information for the current block is obtained based on the second intermediate cost value:

the current block is partitioned into a second plurality of sub-blocks, a prediction block for the current block is obtained based on the second plurality of sub-blocks.

9. The video signal encoding apparatus of claim 7, wherein the first intermediate cost value is a value obtained by summing the first cost value and the second cost value, wherein the second intermediate cost value is a value obtained by summing the third cost value and the fourth cost value.

10. The video signal encoding apparatus of claim 7, the decoding method comprising:

parsing a syntax element related to the partition information.

11. A non-transitory computer-readable storage medium storing a bitstream, wherein the bitstream is to be decoded by a decoding method, and the decoding method comprising:

obtaining first motion information of a current block, wherein the first motion information corresponds to a first reference block;

obtaining e-second motion information of the current block, wherein the second motion information corresponds to a second reference block;

obtaining a first template set comprising neighboring samples of the current block;

obtaining a second template set comprising neighboring samples of the first reference block;

obtaining a third template set comprising neighboring samples of the second reference block;

obtaining partition information for a GPM (Geometric Partitioning Mode) by comparing the first template set with the second template set and the third template set; and reconstructing the current block using the GPM based on the partition information.

12. The non-transitory computer-readable storage medium of claim 11, wherein the first template set is partitioned into a first template and a second template based on a first reference line, wherein the first template set is partitioned into a third template and a fourth template based on a second reference line, wherein the second template set is partitioned into a first plurality of templates based on the first reference line, wherein the second template set is partitioned into a second plurality of templates based on the second reference line, wherein the third template set is partitioned into a third plurality of templates based on the first reference line, wherein the third template set is partitioned into a fourth plurality of templates based on the second reference line, the decoding method comprising:

obtaining a first cost value by comparing the first template with a first corresponding template, wherein the first corresponding template is a template corresponding to the first template among the first plurality of templates;

obtaining a second cost value by comparing the second template with a second corresponding template, wherein the second corresponding template is a template corresponding to the second template among the third plurality of templates;

obtaining a first intermediate cost value based on the first cost value and the second cost value;

obtaining a third cost value by comparing the third template with a third corresponding template, wherein the third corresponding template is a template corresponding to the third template among the second plurality of templates;

obtaining a fourth cost value by comparing the fourth template with a fourth corresponding template, wherein the fourth corresponding template is a template corresponding to the fourth template among the fourth plurality of templates;

obtaining a second intermediate cost value based on the third cost value and the fourth cost value; and obtaining the partition information based on at least one of the first intermediate cost value or the second intermediate cost value.

13. The non-transitory computer-readable storage medium of claim 12,

:

the current block when the partition information for the current block is obtained based on the first intermediate cost valueis partitioned into a first plurality of sub-blocks, a prediction block for the current block is obtained based on the first plurality of sub-blocks, when the partition information for the current block is obtained based on the second intermediate cost value:

the current block is partitioned into a second plurality of sub-blocks, a prediction block for the current block is obtained based on the second plurality of sub-blocks.

14. The non-transitory computer-readable storage medium of claim 12, wherein the first intermediate cost value is a value obtained by summing the first cost value and the second cost value, wherein the second intermediate cost value is a value obtained by summing the third cost value and the fourth cost value.

15. The non-transitory computer-readable storage medium of claim 12, the decoding method comprising:

parsing a syntax element related to the partition information.

* * * * *